US012453546B2

(12) United States Patent
Housman et al.

(10) Patent No.: US 12,453,546 B2
(45) Date of Patent: Oct. 28, 2025

(54) KNOTLESS SOFT ANCHOR SYSTEM

(71) Applicants: Smith & Nephew, Inc., Memphis, TN (US); Smith & Nephew Orthopaedics AG, Zug (CH); Smith & Nephew Asia PAcific Pte. Limited, Singapore (SG)

(72) Inventors: Mark E. Housman, North Attleboro, MA (US); Marc J. Balboa, Hopkinton, MA (US); Benjamin M. Hall, Roslindale, MA (US); Jay A. Shah, Brighton, MA (US); Jon-Paul Rogers, North Smithfield, RI (US); Nehal N. Patel, Boston, MA (US)

(73) Assignees: Smith & Nephew, Inc., Memphis, TN (US); Smith & Nephew Orthopaedics AG, Zug (CH); Smith & Nephew Asia Pacific Pte. Limited, Singapore (SG)

( * ) Notice: Subject to any disclaimer, the term of this patent is extended or adjusted under 35 U.S.C. 154(b) by 0 days.

(21) Appl. No.: 18/705,028

(22) PCT Filed: Nov. 2, 2022

(86) PCT No.: PCT/US2022/048644
§ 371 (c)(1),
(2) Date: Apr. 26, 2024

(87) PCT Pub. No.: WO2023/081171
PCT Pub. Date: May 11, 2023

(65) Prior Publication Data
US 2024/0415505 A1     Dec. 19, 2024

Related U.S. Application Data

(60) Provisional application No. 63/357,181, filed on Jun. 30, 2022, provisional application No. 63/342,843,
(Continued)

(51) Int. Cl.
*A61B 17/04* (2006.01)
(52) U.S. Cl.
CPC .... *A61B 17/0401* (2013.01); *A61B 2017/042* (2013.01); *A61B 2017/0445* (2013.01); *A61B 2017/0458* (2013.01)
(58) Field of Classification Search
CPC .......... A61B 17/0401; A61B 17/0485; A61B 17/06166; A61B 2017/0409;
(Continued)

(56) References Cited

U.S. PATENT DOCUMENTS 8,088,130 B2  1/2012  Kaiser et al.
8,828,053 B2  9/2014  Sengun et al.
(Continued)

FOREIGN PATENT DOCUMENTS

CN    216021207 U    3/2022
EP    2662031 B1     4/2015
(Continued)

OTHER PUBLICATIONS

Arthrex, Knotless 1.8 FiberTak Soft Anchor for Glenoid Labrum Repair, 2021, Arthrex.com.
(Continued)

*Primary Examiner* — Dianne Dornbusch
(74) *Attorney, Agent, or Firm* — Kate Ryland Tetzlaff; Norman F. Hainer, Jr.

(57) ABSTRACT

A knotless tissue repair construct is disclosed herein. The construct includes a soft anchor body, with a proximal end, a distal end, and a longitudinal axis extending therebetween. The construct also includes a repair suture fixedly coupled to the anchor body. The construct also includes a transfer suture interwoven repeatedly through and along the anchor body defining a transfer path. Tension on at least one of the repair suture and transfer suture may deploy the anchor
(Continued)

body. A transfer suture first end may transfer the repair suture through the anchor body to form a repair loop that may knotless lock the tissue repair construct.

18 Claims, 33 Drawing Sheets

Related U.S. Application Data filed on May 17, 2022, provisional application No. 63/317,673, filed on Mar. 8, 2022, provisional application No. 63/317,671, filed on Mar. 8, 2022, provisional application No. 63/275,491, filed on Nov. 4, 2021.

(58) Field of Classification Search
CPC .... A61B 2017/0445; A61B 2017/0458; A61B 2017/0464; A61B 2017/0414; A61B 2017/042; A61B 2017/0424; A61B 2017/06185

See application file for complete search history.

(56) References Cited

U.S. PATENT DOCUMENTS

| | | | |
|---|---|---|---|
| 8,881,635 | B2 | 11/2014 | Martin |
| 9,107,653 | B2 | 8/2015 | Sullivan |
| 9,247,936 | B2 | 2/2016 | Sengun et al. |
| 9,320,512 | B2* | 4/2016 | Dooney, Jr. ............ A61F 2/0811 |
| 9,855,029 | B2 | 1/2018 | Sullivan |
| 9,867,607 | B2 | 1/2018 | Sullivan |
| 10,004,489 | B2 | 6/2018 | Kaiser et al. |
| 10,098,629 | B2 | 10/2018 | Kaiser et al. |
| 10,271,833 | B2 | 4/2019 | Sengun |
| 10,376,259 | B2 | 8/2019 | Bonutti et al. |
| 10,441,269 | B1 | 10/2019 | Bonutti et al. |
| 10,492,776 | B2 | 12/2019 | Dreyfuss et al. |
| RE47,811 | E | 1/2020 | Sullivan et al. |
| 10,542,967 | B2 | 1/2020 | Kaiser et al. |
| 10,575,842 | B2 | 3/2020 | Lund |
| 10,595,845 | B2 | 3/2020 | Burkhart et al. |
| 10,595,851 | B2 | 3/2020 | Kaiser et al. |
| 10,973,622 | B2 | 4/2021 | Mackay |
| 11,116,498 | B2 | 9/2021 | Martin |
| 11,219,446 | B2 | 1/2022 | Bonutti et al. |
| 11,259,794 | B2 | 3/2022 | Stone et al. |
| 11,457,958 | B2 | 10/2022 | Bonutti |
| 11,471,147 | B2 | 10/2022 | Kaiser et al. |
| 11,471,266 | B2 | 10/2022 | Mackay |
| 11,497,484 | B2 | 11/2022 | Lund |
| 2011/0098727 | A1* | 4/2011 | Kaiser ................ A61B 17/0401 606/228 |
| 2012/0290002 | A1 | 11/2012 | Astorino |
| 2013/0029693 | A1 | 1/2013 | Bradley, Jr. |
| 2013/0096612 | A1 | 4/2013 | Zajac |
| 2013/0296934 | A1* | 11/2013 | Sengun ............ A61B 17/06166 606/232 |
| 2014/0121700 | A1 | 5/2014 | Dreyfuss |
| 2014/0257384 | A1 | 9/2014 | Dreyfuss |
| 2014/0277133 | A1* | 9/2014 | Foerster ............ A61B 17/0401 606/232 |
| 2015/0173739 | A1* | 6/2015 | Rodriguez ......... A61B 17/0401 606/232 |
| 2019/0247039 | A1 | 8/2019 | Gregoire |
| 2019/0365366 | A1 | 12/2019 | Petry |
| 2020/0022701 | A1 | 1/2020 | Crook |
| 2020/0138429 | A1 | 5/2020 | Dreyfuss et al. |
| 2020/0187933 | A1 | 6/2020 | Kaiser et al. |
| 2020/0205799 | A1 | 7/2020 | Burkhart et al. |
| 2021/0137672 | A1 | 5/2021 | Mackay |
| 2021/0244401 | A1 | 8/2021 | Burkhart et al. |
| 2022/0008069 | A1 | 1/2022 | Martin |
| 2022/0015757 | A1 | 1/2022 | Stone et al. |
| 2022/0175514 | A1 | 6/2022 | Verma et al. |
| 2022/0218341 | A1 | 7/2022 | Martin |

FOREIGN PATENT DOCUMENTS

| | | |
|---|---|---|
| EP | 2774546 B1 | 2/2017 |
| WO | 2015095524 A2 | 6/2015 |
| WO | 2020252372 A1 | 12/2020 |

OTHER PUBLICATIONS

Arthrex, Knotless SutureTak Anchor for Instability Repair, 2021, Arthrex.com.

* cited by examiner

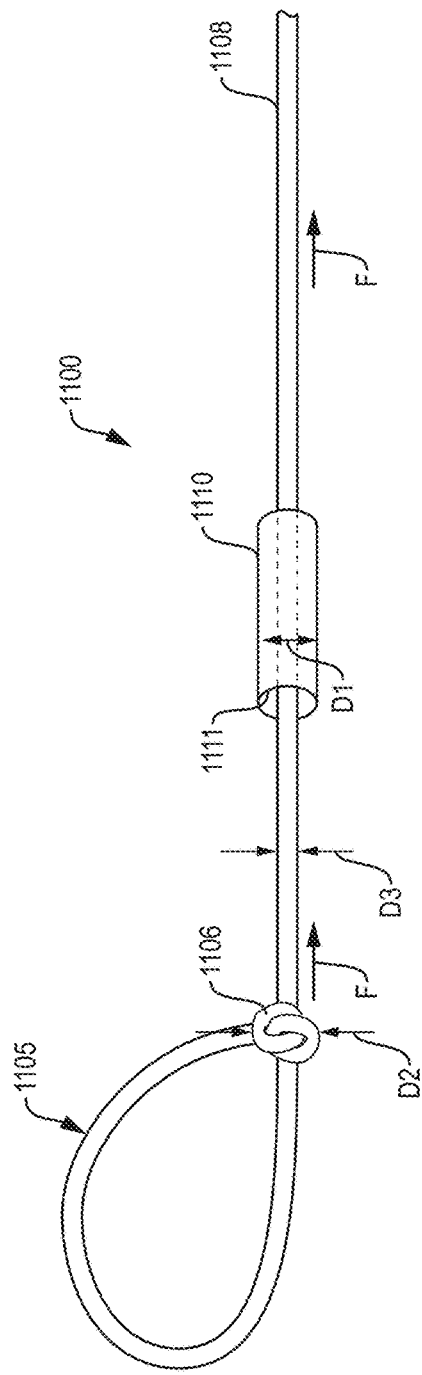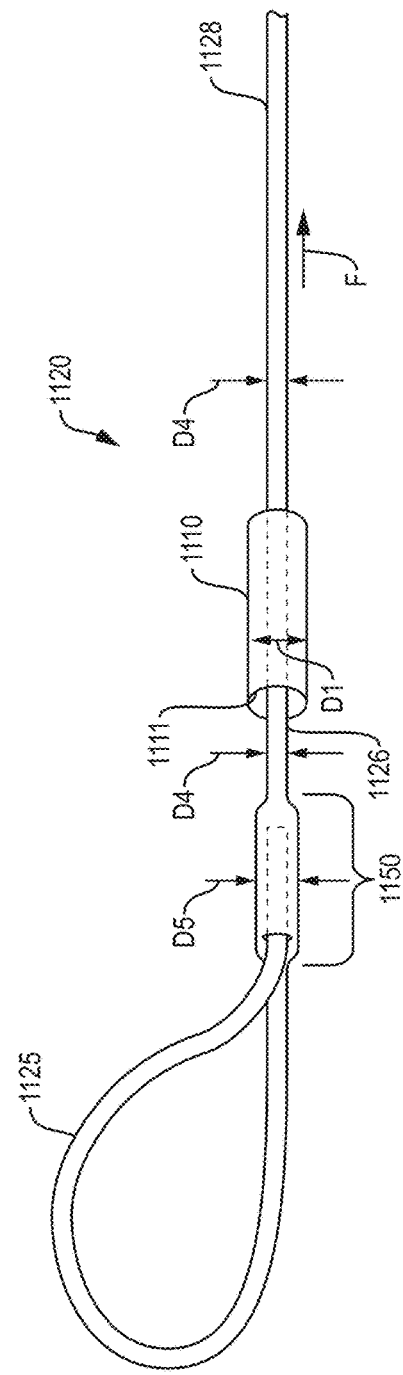

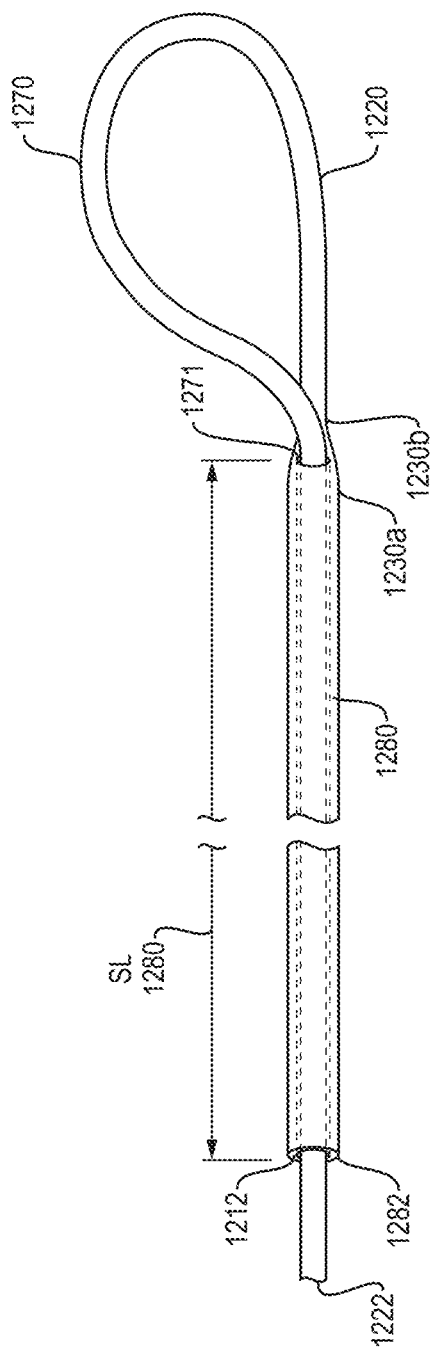
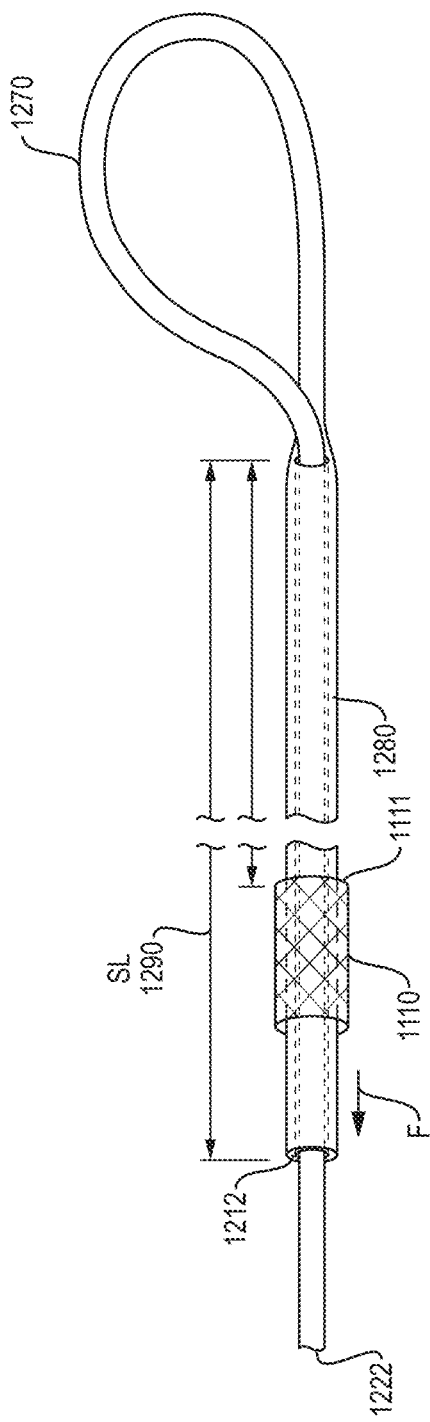
FIG. 11C
FIG. 11D

KNOTLESS SOFT ANCHOR SYSTEM

CROSS-REFERENCE TO RELATED APPLICATIONS

This application is a US National application of PCT application serial number PCT/US2022/048644 filed Nov. 2, 2022, titled "Knotless Soft Anchor System: which claims the benefit of U.S. provisional application Ser. No. 63/275,491 filed Nov. 4, 2021, and titled, "Knotless Soft Anchor System"; and U.S. provisional application Ser. No. 63/357,181 filed Jun. 30, 2022, and titled, "Knotless Soft Anchor System." This application also claims the benefit of U.S. provisional application Ser. No. 63/317,671 filed Mar. 8, 2022, titled "Smooth Transfer Suture Loop"; and U.S. provisional application Ser. No. 63/342,843 filed May 17, 2022, titled "Transfer Suture Loop". This application also claims the benefit of U.S. provisional application Ser. No. 63/317,673 filed Mar. 8, 2022, titled "Q-fix Knotless with Tape". These provisional applications are all incorporated by reference herein, in their entirety as if reproduced in full below.

FIELD

The present disclosure relates to systems and methods associated with a repair system that may include a knotless soft anchor system.

BACKGROUND

Many orthopedic surgeries involve the use of anchoring devices in procedures for attaching tissues, such as soft tissue to bone. Such procedures include, for example, attaching tendons to bone, bone to bone, tendon to tendon, ligaments or grafts to bone, as well as augmenting a primary repair and ligament reconstruction. Generally, these procedures rely on the use of polymeric, metal, or biodegradable rigid anchors with suture attached. The suture is passed through the tissue and a knot secures the anchor and tissue together. However, the use of these anchors often requires rigid, hard materials to be placed in tissue such as bone. If the anchors loosen, a surgeon or surgical technician is faced with the problem of having a potentially hard device migrate into a patient's joint, placing the patient at risk for arthritis. Accordingly, an anchor that uses only soft materials may pose less risk of anatomical damage in a joint or body cavity, should they be dislodged post-operatively.

Existing soft material anchors available today may be formed with suture or soft flexible material and may include a braided body. Soft anchors may anchor with tissue by deforming or, in some cases, simply relaxing to a radially or laterally expanded state which may be locked in this anchored state by tying knots. Knot-tying may however add complexity to the procedure, may require a higher level of expertise, may be time consuming, and/or be more anatomically disruptive to surrounding structures. Adding knots may also tend to form what is called a knot stack, which may add bulk and palpability to the repair site. Therefore, there is a need for a soft anchor system that includes a knotless locking construct, avoiding the step of tying a knot and addressing the issues listed herein.

In addition, not all soft anchors are created equal. They may differ in a variety of ways including their deployment consistency, the volume of bone removal required and their fixation strength, depending on the soft anchor construct and mechanisms for deployment. Therefore, there is a need for an improved knotless anchor system that includes a high fixation strength soft anchor, that may be consistently deployed, remove minimal amounts of bone tissue and reliably knotlessly lock. Knotlessly locking may fix the soft anchor in the deployed configuration and/or may knotlessly couple a repair tissue to the soft anchor.

Sutures are used throughout many surgical procedures for a variety of functions, including but not limited to repairing tissue, actuating a surgical device or snaring. Snaring may draw another suture or equivalent flexible member, or a tissue/graft into a target tissue and/or through a surgical device; surgical devices including but not limited to other sutures or equivalent flexible members, or implants, or surgical tools. In some embodiment at least one end of the suture may be formed in a loop. This loop may provide a means of snaring. This loop may provide a means of coupling the suture to a surgical tool. This loop may provide a means for the user to hold the suture. Related art suture loops may be formed with a knot or with a spliced portion. Both a knot or spliced portion however form a discontinuity or bulge along the suture, with a local increase in cross section. As surgical devices continue to evolve towards smaller and reduced profiles, so too do any openings therethrough; openings such as apertures, tunnels or shaft bores. While smaller suture sizes exist that may fit through these smaller apertures and tunnels, these smaller sutures also have shortcomings. For example, they may be more likely to break under load. They may also be more prone to cutting (cheese wiring) into the repair tissues and may also be more difficult to handle. The addition of a loop to an end of the suture may further complicate the shortcomings. Forces to draw a suture loop, (with inherently larger cross section via formation of this suture loop), through these openings with the associated bulge/discontinuity may be higher. This higher force may require extra tools, and/or larger than desired openings through the surgical device, and/or may apply an uncomfortable force on the user's hand. Therefore, there is a need for a suture loop construct that addresses these shortcomings. There is a need for a suture loop construct that is formed such that drawing the loop through an opening of a surgical device avoids significant increases in required force or mitigates these forces. In addition, there may be a need for these smaller sutures to withstand increased loads.

Definitions

Described herein are tissue repair systems, which use a soft anchor. The tissue repair systems of this disclosure provide a high fixation strength, fixing the soft anchor within bone. The tissue repair systems preferably knotlessly lock in a repaired configuration, avoiding the need for the surgeon to tie a knot. The tissue repair systems may include at least one suture. The term "suture" may include traditional sutures, that may be either hollow or may include braids along their core, unless were specified. The term "suture" may include equivalent flexible members, such as but not limited to suture tape or flattened suture and may in some cases be cable, ribbon or wire, where appropriate.

"Soft Anchor" is intended to mean a flexible and/or deformable anchor, formed of soft, flexible material, that changes to a more laterally expanded configuration upon deployment. A tensioning member that is operatively coupled through a portion of the soft anchor may be tensioned to laterally expand the soft anchor. The term "soft anchor" does not preclude it from including some select portions that are rigid; only that the soft anchor body is substantially formed from a flexible soft material such as suture or suture tape. In some embodiments, the soft anchor is formed entirely of braided suture. Soft anchors deform to a deployed configuration that changes the soft anchor to a laterally or radially expanded configuration and may also include a longitudinal contraction.

"Deploy" is intended to mean to change the shape of the body of the soft anchor (the "anchor body") such that the anchor body is set, fixed or anchored with/within a tissue. Deploying may increase a lateral dimension of the anchor body to secure it with a tissue. For example, this may fix the soft anchor within a bone hole. To deploy an anchor body changes the anchor to a deployed configuration.

"Lock" or "locked configuration" with respect to a suture construct is intended to mean locking a suture such that the suture may no longer slide in at least one direction. Sliding in this at least one direction for example may loosen a repair tissue that is secured in place. The suture may form a loop including a tissue coupled thereto and the loop perimeter is prevented from sliding and increasing in perimeter size. With respect to an anchor body, a locked configuration is intended to mean locking the anchor body in a deployed configuration to inhibit the anchor body from relaxing/moving out of the deployed configuration.

"Knotlessly locking" or a word stemming derivative therefrom such as knotless locking for example is intended to mean a lock in a surgical construct or anchor system formed without having the tie a knot. A system provided with a pre-formed knot may be defined as knotlessly locking. A system configured to route the suture during operation of the surgical construct to form a knot, is also defined as knotlessly locking. Knotlessly locking may also be achieved by passing at least one suture along a tortuous route through small openings, or through a suture locking passage construct, may also be called Chinese finger traps, finger cinches or locking splices for example. To knotlessly lock the system, some of the sutures may extend through the suture locking passage of either the same suture or another suture, to form a self-locking adjustable suture construct as described herein. Suture locking passage may be selectively elongated, by applying tension to the locking passage to cinch around the suture disposed therein, thereby locking a portion of the adjustable suture construct.

"Transfer member" is a construct or suture that transfers a flexible member, such as a suture through the knotless anchor construct. Transfer member may be a suture or wire.

"Deploying member" is intended to mean an elongate member that may be a suture(s) (or equivalent as defined herein) that deploys the soft anchor body, usually upon tension being applied to the deploying member. In some embodiments, the deploying member may also provide other functions.

"Repair Suture" is the suture (or equivalent as defined herein) passed through the target soft tissue and used to affix the target tissue to bone.

"Static loop" shall mean a loop that has a perimeter that is not adjustable under normal operating load conditions.

"Working opening" shall mean an opening through a surgical device that is limited in size, so that it presents a challenging force to draw a suture construct including a discontinuity, such as a knot or a splice end of a suture loop therethrough. The "working opening" may be designed to receive the loop of the suture construct therethrough during normal operation of the surgical device and suture construct. The "working opening" may be an aperture, tunnel, cannulation, passage or shaft bore of a surgical device or devices. The "working opening" has an opening size that may be a diameter, or an equivalent width should the opening be a shape other than a circle. This "working opening" may be minimized in opening size, to generally contribute towards an overall smaller profile surgical device for surgical repair. The surgical device may include openings of varying opening sizes, and some of the openings may not present a challenging force and therefore some of the openings but not all may be "working openings" as defined herein.

"Surgical device" is intended to include at least one of a surgical tool or instrument, such as an insertion instrument; an implant such as a tissue anchor that may be rigid or soft; and/or a flexible member such as suture, suture tape, cable, wire, flexible spring, ring or tube.

"Working length" shall mean an entire axial length of the suture loop splice extending from the entrance of the suture through itself at a loop end, through to the splice end.

SUMMARY

Described herein are various improved methods and devices for tissue repair with a knotlessly locking construct, including a soft anchor. These and other features and advantages will be apparent from a reading of the following detailed description and a review of the associated drawings. It is to be understood that both the foregoing general description and the following detailed description are explanatory only and are not restrictive of aspects as claimed.

Disclosed herein is a knotless tissue repair construct that includes an anchor body formed of a soft material, the anchor body having a proximal end, a distal end, and a longitudinal axis extending therebetween. The anchor body may be formed with braided strands. The construct also includes a repair suture having a first end, a second end and a cannulated length therebetween, the first end fixedly coupled to the anchor body. The repair suture first end may be fixedly coupled to an external portion of the anchor body, at a distal end of thereof. The repair suture may have a cannulated length therealong, the cannulated length interweaving along and through a first sidewall of the anchor body. The repair suture second end may extend proximally from the anchor body proximal end. The knotless tissue repair construct may also include a deploying suture interwoven repeatedly through and along the anchor body and also through and along the cannulated length of the repair suture. The deploying suture may be interwoven through and along the cannulated length that is also coextensively interwoven through and along the anchor body, defining a longitudinal suture-locking passage. Tension on the deploying suture is configured to change the anchor body from an elongate configuration to a deployed configuration. The deploying suture is configured to operatively couple to the repair suture second end and draw the repair suture second end through the anchor body and through the longitudinal locking passage portion defining a knotlessly locked configuration of the knotless tissue repair construct.

In some embodiments, in the knotlessly locked configuration, the deploying suture may be removed from the knotless tissue repair construct. In some example embodiments, the repair suture may be fixedly coupled to the anchor body distal end with two axially overlapping knots that may be half hitch knots, disposed externally to the anchor body. In some embodiments, tension is applied via an instrument actuating means to both the repair suture second end and the deploying suture ends simultaneously to deploy the anchor body. In some embodiments, the anchor body includes an inner lumen with an opening at the anchor body proximal end, the repair suture and deploying suture both interwoven through the anchor body such that they both extend proximally from the anchor body proximal end, directly from the inner lumen opening. The anchor body may be tubular with an open proximal lumen for example.

In some embodiments, the repair suture includes a tape length segment extending from the cannulated length, the tape length segment disposed along a segment of the repair suture that is external to the anchor body. The repair suture may also include a tapered suture segment that may extend from the tape length segment on an opposing end of the repair suture to the cannulated length. The tape length segment may have a length sufficient to extend through the anchor body and cannulated length when in the knotlessly locked configuration.

In some embodiments, the deploying suture may include a spliced loop at a first end of the deploying suture, the spliced loop having a splice length that extends through all working openings of the tissue repair construct. The splice length may extend through the entire anchor body and the entire suture-locking passage. The splice length may extend through the entire anchor body, cannulated length and may also be operatively coupled to a tensioning actuation means of the knotless tissue repair construct, such that tensioning the deploying suture applies tension to a continuous uninterrupted length of the deploying member splice length. The deploying suture may include a first length segment that is cannulated and a second length segment that is smaller in diameter than the first length segment and wherein the loop portion of the spliced loop may include the second length segment, and the splice length may include both the first and second length segment coaxially disposed.

Another example embodiment of a knotless tissue repair construct is disclosed, the construct including a soft anchor body having a proximal end, a distal end, and a longitudinal axis extending therebetween and formed with braided strands. The construct also includes a repair suture having a first end, a second end and a cannulated length therebetween, the first end fixed to the distal end of the anchor body, the cannulated length interweaving along and through a first sidewall of the anchor body and the second end extending proximally from the anchor body proximal end. The construct also includes a deploying suture interwoven repeatedly between the braided strands, through and along a second sidewall of the anchor body and also though and within the cannulated length of the repair suture that is interwoven along and through the first sidewall. Tension on both the deploying suture and repair suture second end is configured to change the anchor body to a deployed configuration. The deploying suture is configured to operatively couple to the repair suture second end after the repair suture has been coupled to a repair tissue and draw the repair suture second end back through the anchor body that is in the deployed configuration, and also through the cannulated length interwoven through the first sidewall, defining a knotlessly locked configuration.

In some embodiments, the repair suture includes a tape length segment extending from the cannulated length, at a location along the repair suture external to the anchor body. A tapered suture segment may extend from the tape length segment on an opposing end of the repair suture to the cannulated length. The tape length segment may have a length sufficient to extend through the repair tissue, the anchor body and cannulated length when in the knotlessly locked configuration. The deploying suture may include a spliced loop at a first end of the deploying suture, the spliced loop being a static loop and configured to operatively receive the repair suture second end therethrough. The spliced loop may define a splice length that extends through the entire anchor body and cannulated length while deploying the anchor. The splice length may extend through the entire anchor body, cannulated length and may be operatively coupled to a tensioning actuation means of the knotless tissue repair construct, such that tensioning the deploying suture applies tension to a continuous uninterrupted length of the deploying member splice length.

An example method of constructing a knotless tissue repair construct is disclosed including obtaining a soft anchor body having a proximal end, a distal end, and a longitudinal axis extending therebetween, the anchor body being tubular and formed with braided strands. The method also includes obtaining a repair suture, the repair suture having a braided wall defining a cannulated length therealong. A first snaring tool may be inserted through the braided walls of the repair suture, defining an entrance aperture, then along the cannulated length and then through the braided walls again defining an exit aperture. The entrance and exit apertures are axially spaced along the repair suture defining a longitudinal suture-locking passage axial length. A transfer suture may then be obtained and drawn through the suture-locking passage, such that a first end of transfer suture extends from the entrance aperture and a second end of transfer suture extends from the exit aperture. An interweaving pathway may then be formed through and along a first sidewall of the anchor body with a second snaring tool. The repair suture second end and transfer suture second end may then be drawn along the interweaving pathway through the anchor body with the second snaring tool, to place the suture-locking passage with the transfer suture disposed therein along the interweaving pathway. The repair suture second end and transfer suture second end may now extend from the anchor body proximal end. The transfer suture first end may be drawn along another interweaving pathway disposed through the anchor body, on an opposing side of the anchor body, so that the transfer suture first end extends from the anchor body proximal end.

In some example methods, the method may include fixedly coupling the repair suture to the anchor body distal end. This may include forming axially overlapping half hitch knots at a terminal end of the repair suture before inserting the first snaring tool through the braided walls of the repair suture. The first snaring tool may be inserted directly adjacent the axially overlapping half hitch knots.

In some example methods, suture-locking passage may be formed that is approximately equal in axial length to a maximum axial length of the anchor body. The maximum axial length extending from a proximal end edge to a distal end edge of the anchor body while the anchor body is in an elongate or non-deployed configuration.

Drawing the repair suture second end and transfer suture second end along the interweaving pathway with the second snaring tool may place the locking passage entrance aperture directly adjacent the anchor body distal end. The anchor body may be tubular and defining a lumen therealong, and the lumen may be open at the anchor body proximal end and wherein forming an interweaving pathway through and along a first sidewall of the anchor body with a second snaring tool may extend a leading end of the second snaring tool first directly into the open lumen end, along the lumen for a first axial distance then between the braided strands of the first sidewall to an external surface of the anchor body, along the external surface for a second axial distance and then back through between the braided strands of the first sidewall into the lumen. The first axial distance may be a length that includes at least 2 braided strands of the anchor body. The first axial distance and the second axial distance may be equivalent in axial length. The method may also include operatively coupling the transfer suture first and second ends and the repair suture second end to a deployment actuator of an insertion instrument.

An example method of tissue repair with a knotless tissue repair construct is also disclosed, the method including obtaining a knotless tissue repair construct as disclosed herein. The knotless tissue repair may include an anchor body formed of a soft material, the anchor body having a proximal end, a distal end, and a longitudinal axis extending therebetween. The anchor body may be formed with braided strands. The construct also includes a repair suture having a first end, a second end and a cannulated length therebetween, the first end fixedly coupled to the anchor body. The first end may be fixedly coupled to an external portion of the anchor body. The repair suture cannulated length may interweave along and through a first sidewall of the anchor body. The repair suture second end extends proximally from the anchor body proximal end. The construct also includes a deploying suture interwoven repeatedly through and along the anchor body and through and along the cannulated length of the repair suture. The deploying suture may be interwoven through and long the cannulated length that is interwoven through and along the anchor body, defining a longitudinal locking passage portion that interweaves through and along the anchor body. Tension on the deploying suture is configured to change the anchor body from an elongate configuration to a deployed configuration. The deploying suture is configured to operatively couple to the repair suture second end and draw the repair suture second end through the deployed anchor body and through the longitudinal locking passage portion defining a knotlessly locked configuration of the knotless tissue repair construct. The knotless tissue repair construct may be inserted into a target tissue and the soft anchor body deployed by tensioning on at least the deploying suture. The repair suture may be coupled to a repair tissue after the soft anchor body has been deployed. The repair suture is then coupled to the deploying suture, after the anchor has been deployed. The deploying suture may be withdrawn through the soft anchor body while the anchor is in a deployed configuration, to withdraw the repair suture second end through the deployed anchor body and through the cannulated length interweaving along and through the first sidewall. Tensioning the repair suture may then knotlessly locking the construct.

In some example methods, withdrawing the deploying suture may remove the deploying suture from the knotless tissue repair construct. Deploying the soft anchor body may include tensioning the repair suture second end. The repair suture may include a tape length segment and a tapered suture segment that extends from the tape length segment on an opposing end of the repair suture to the cannulated length, and wherein coupling the repair suture to the repair tissue after the soft anchor body has been deployed, may engage the repair tissue with the tape length segment and wherein withdrawing the deploying suture through the soft anchor body may place the tape length segment through and along the anchor body and the cannulated length. In the knotlessly locked configuration the locking passage may include the tape length segment.

Also disclosed herein is a suture loop construct for assembly with a surgical device. The suture construct includes a first length portion with a first diameter, the first length portion having a cannulation. The suture construct also includes a second length portion extending from the first length portion, wherein the second length portion forms a static loop at a single end of the first length portion formed by extending the second length portion into and along the first length portion cannulation defining a splice, the splice having a working length that has a static loop end and an opposing end. In an assembled configuration, the splice is disposed through and along the surgical device including through and along a working opening of the surgical device, and wherein while the surgical device and suture construct change to a repaired configuration the suture construct including the static loop is translated through the working opening, without introducing the splice opposing end into the working opening.

In some example embodiments, the second length portion is smaller in diameter than the first length portion. The second length portion may have a braided core. The surgical device may include an all-suture of soft anchor and a repair suture, the repair suture separately formed from the suture loop construct. The repair suture may have a hollow passage portion and the splice may extend along the hollow passage portion; the hollow passage portion may define at least one of the working openings. The splice may extend along and through the soft anchor from a proximal end of the anchor to a distal end thereof, and also from the distal end to the proximal end. The surgical device may include an insertion instrument for an implant such as the soft anchor, the surgical device including a shaft bore that defines one of the working openings. The splice may extend along an entire length of the first length portion, up to an open end of the first length portion cannulation.

An example tissue repair assembly is disclosed including a suture loop construct formed of a suture with a first length portion and a second length portion, the suture formed with braided strands. The first length portion defines a longitudinally formed hollow passage. The suture construct includes a splice loop formed by passing the second length portion through the braided body and along the longitudinally formed hollow passage defining a splice having a working length along the braided body, the working length defining a loop end and a splice end. The tissue repair assembly also includes a surgical device with at least one working opening. The splice working length is threaded along the surgical device and through the at least one working opening; and the splice working length is configured so that while drawing the splice loop through the at least one working opening the suture construct is removed from the surgical device without the splice end entering the at least one working opening.

In some example constructs, the second length portion extends directly from the first length portion and defines a portion of the braided body that is smaller in cross section than the first length portion. The second length portion may include a braided core. The surgical device may include a soft anchor and a repair suture, the repair suture separately formed from the suture loop construct and operatively coupled to the soft anchor. The repair suture may also define a braided body with a hollow passage therealong, the hollow passage defining a working opening of the at least one working openings. The splice may extend continuously along and through the soft anchor from a proximal end of the soft anchor to a distal end thereof, and also from the distal end to the proximal end. The surgical device may include an insertion instrument for an implant, the surgical device including a shaft bore that defines a working opening of the at least one working openings. The loop may be a static loop. The splice may extend along an entire length of the first length portion, the second length portion extending along the first length hollow passage up to an open end of the first length portion hollow passage.

Another example tissue repair assembly is disclosed herein, including a transfer construct comprising a suture being formed by braided strands as a braided body, and having a first length portion of the suture that includes a longitudinal hollow passage. The suture construct includes a splice loop, the splice loop formed by passing a second length portion of the suture between the braided strands and along the longitudinal hollow passage defining a splice working length along the first length portion. The assembly also includes a soft anchor with a repair suture operatively coupled thereto, the repair suture also formed from a braided body with a longitudinal hollow passage. In the assembled configuration, the splice loop is disposed proximally from the soft anchor and the splice is threaded along the soft anchor and also along the repair suture longitudinal hollow passage device.

In some embodiments the transfer construct including the splice loop is configured to be drawn through the soft anchor and longitudinal hollow passage of the repair suture to remove the transfer construct from the repair suture longitudinal hollow passage, without drawing a splice end of the working length into either the soft anchor or the repair suture longitudinal hollow passage. The splice loop may be formed entirely of the second length portion of the suture, the second length portion having a smaller cross section than a corresponding cross section of the first length portion.

Disclosed herein is a knotless tissue repair construct that includes an anchor body formed of a soft flexible material and including a proximal end, a distal end, and a longitudinal axis extending therebetween. The construct also includes a repair suture with a first end that is fixedly coupled to the anchor body and a second end extending proximally from the anchor body proximal end, with a length of the repair suture between the first and second end extending along and through the anchor body. A transfer member interweaves repeatedly through and along the anchor body defining a transfer path. Both a first and a second end or limb of the transfer suture extends from the anchor body proximal end. The transfer member first end may include a loop that may operatively couple to the repair suture second end. Tension on at least one of the repair suture and transfer suture deploys the anchor body to a deployed configuration. Tension on the transfer member second end with the repair suture coupled to the transfer member first end slides the transfer member and repair suture through the anchor body to replace the transfer member with the repair suture, along the transfer path through and along the anchor body.

In some embodiments the transfer member also extends through and along a cannulation of the repair suture. The transfer member may extend through and along the cannulation of a portion of the repair suture disposed along a lumen of the anchor body. The transfer member may enter the cannulation outside of the anchor body and may enter the anchor body lumen while within the cannulation. The transfer member may enter the cannulation of the repair suture at a distal end of the anchor body and may exit the cannulation of the repair suture at a proximal end of the anchor body. The repair suture second end may extend from an open lumen at the anchor body proximal end. The transfer member may include a snare tool configured to draw the repair suture second end into and along a cannulation of the transfer member and thereby couple the transfer member first end to the repair suture second end.

An example method of routing a repair suture to a surgical construct is also disclosed, the surgical construct including a transfer member extending through the surgical construct. The method includes coupling a transfer member first limb to a repair suture limb by drawing the repair suture limb into and along a core of the transfer member first limb, such that the repair suture limb, including a terminal end of the repair suture limb, is coaxially disposed within the transfer suture first limb, and thereby defining a coupling length with the transfer suture extending from a first end of the coupling length and the repair suture extending from an opposing end of the coupling length. The method may also include tensioning the transfer suture to cinch the coupling length and tensioning the transfer member to draw the transfer member followed by the coupling length through the surgical construct and thereby placing the repair suture extending from the opposing end of the coupling length into the surgical construct.

Another example knotless tissue repair construct is disclosed that includes an anchor body formed of a soft material having a proximal end, a distal end, and a longitudinal axis extending therebetween. The construct also includes a repair suture having a first end fixedly coupled to the distal end of the anchor body and a second end extending proximally from the anchor body proximal end, a length of the repair suture between the first and second end extending along the anchor body. The construct also includes a transfer member interwoven repeatedly through and along the anchor body defining a transfer path, a first and a second end of the transfer member extending from the anchor body proximal end, and wherein the transfer suture first end is configured to operatively couple to the repair suture second end. Tension on at least one of the repair suture second end, the transfer member first end, and/or the transfer member second end is configured to change the anchor body to a deployed configuration. Tension on the transfer member second end with the repair suture coupled to the transfer member first end, is configured to slide the transfer member first end through the anchor body along the transfer path and remove the transfer suture from the anchor body.

In some embodiments, the transfer path may also extend thorough and along a cannulation of the repair suture. The transfer member may extend through and along the cannulation of the repair suture, the cannulation disposed along a lumen of the anchor body and also repeatedly between strands of the anchor body. The transfer member may enter the cannulation of the repair suture at a distal end of the anchor body and exits the cannulation of the repair suture at a proximal end of the anchor body. The repair suture second end may extend directly from an open lumen at the anchor body proximal end. The anchor body may define a sealed distal end and an annular and heat sealed open proximal end.

Suture constructs are disclosed that include a suture loop, formed to control the size and location of any cross-sectional alteration as a result of forming the loop. Suture constructs may also be configured to increase the ultimate strength of the suture construct. Suture constructs may be operatively coupled to surgical devices such as surgical tools, implants or sutures (or equivalent thereof) and at least one suture loop of the suture construct may be configured to be passed through openings through the surgical device. The suture loop is preferably formed to limit any increased forces required to translate the suture loop through the surgical device. The surgical device inter alia may be an insertion instrument, and the opening may be a shaft bore thereof. The surgical device may interalia be an implant such as a tissue anchor, and the opening may a lumen, cannulation, hole or tunnel therethrough. The tissue anchor may be an all-suture tissue anchor, and the opening or openings may an entrance between braids of the all-suture tissue anchor. The surgical device may inter alia be another suture or equivalent flexible member with a hollow passage therethrough, and the opening may the hollow passage.

BRIEF DESCRIPTION OF THE DRAWINGS

The disclosure will be more fully understood by reference to the detailed description, in conjunction with the following figures, wherein:

FIGS. 10A and 10B illustrate prior art suture loop constructs, for reference purposes;

FIGS. 11A-11C illustrate a method of formation of a transferring member construct, in accordance with this disclosure;

FIG. 11D illustrates the transferring member construct relative to a device, in accordance with this disclosure;

DETAILED DESCRIPTION

Figure 1A:
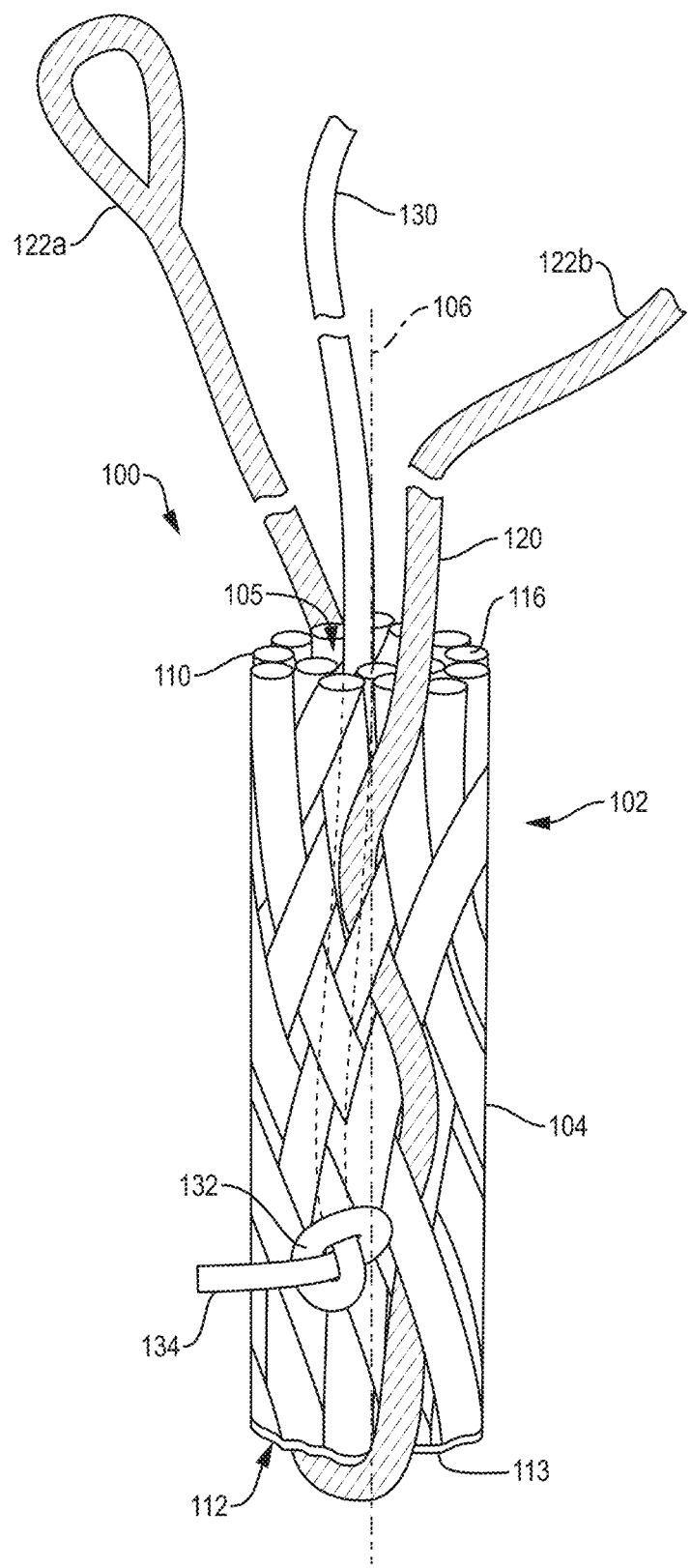
FIG. 1A illustrates a knotlessly locking soft anchor construct of this disclosure, in an undeployed (elongate) configuration, in accordance with this disclosure.

In the description that follows, like components have been given the same reference numerals, regardless of whether they are shown in different examples. To illustrate example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As used in the specification and claims, for the purposes of describing and defining the invention, the terms "about" and "substantially" are used to represent the inherent degree of uncertainty that may be attributed to any quantitative comparison, value, measurement, or other representation. The terms "about" and "substantially" are also used herein to represent the degree by which a quantitative representation may vary from a stated reference without resulting in a change in the basic function of the subject matter at issue. "Comprise," "include," and/or plural forms of each are open ended and include the listed parts and can include additional parts that are not listed. "And/or" is open-ended and includes one or more of the listed parts and combinations of the listed parts. Use of the terms "upper," "lower," "upwards," and the like is intended only to help in the clear description of the present disclosure and are not intended to limit the structure, positioning and/or operation of the disclosure in any manner.

A first example knotlessly locking soft anchor construct 100 and method of use is illustrated in FIGS. 1A-1E. Construct 100 includes a soft anchor 102, that may be like the Q-fix◊ offered for sale by Smith and Nephew. Soft anchor 102 may be like anchors disclosed in at least U.S. Pat. No. 9,962,149, titled "Tissue Repair Assembly"; commonly owned and herein incorporated by reference in its entirety. Soft anchor 102 may be obtained operatively coupled with an insertion system that actively deploys anchor 102, producing a deployed anchor with a strong fixation strength within or with tissue when deployed. Active deployment as disclosed in U.S. Pat. No. 9,962,149, titled "Tissue Repair Assembly" provides a back stop to hold the anchor 102 in place while deploying the anchor 102 via a high tensioning load on the deploying members, to produce a high fixation strength deployed anchor configuration.

Soft anchor 102 may define a tubular braided body 104, that may include a closed or sealed distal end 112. Tubular body 104 may be formed of braided strands 110. Closed distal end 112 may be sealed and may define a linear edge 113, that may be formed using adhesive or heat sealing.

Figure 1B:
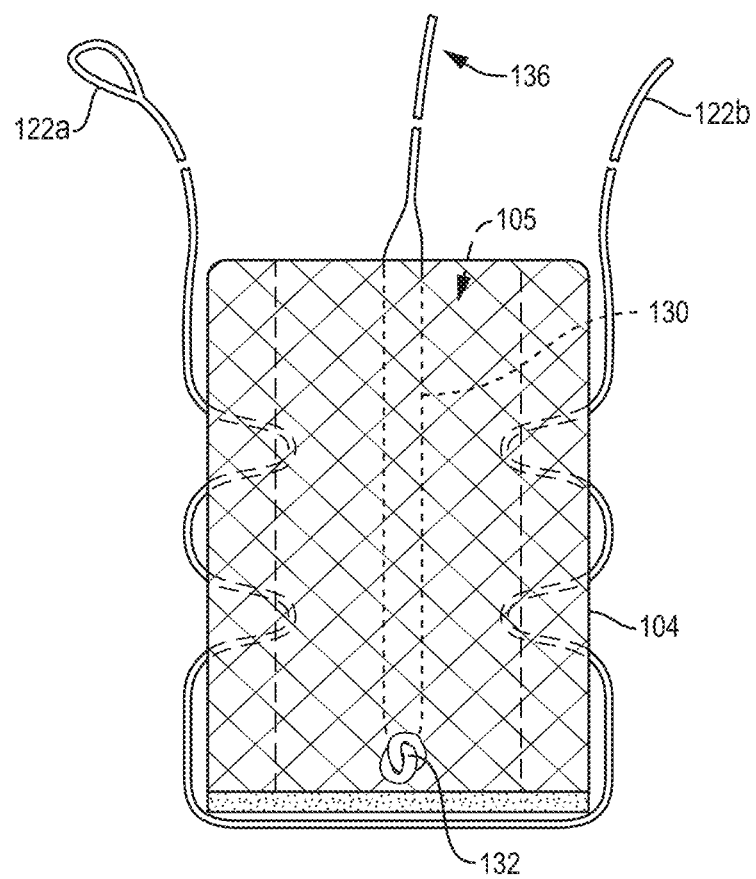
FIG. 1B schematically shows the knotlessly locking soft anchor construct in FIG. 1A in simplified form to better show the routing of the sutures, in accordance with this disclosure.
Figure 1C:
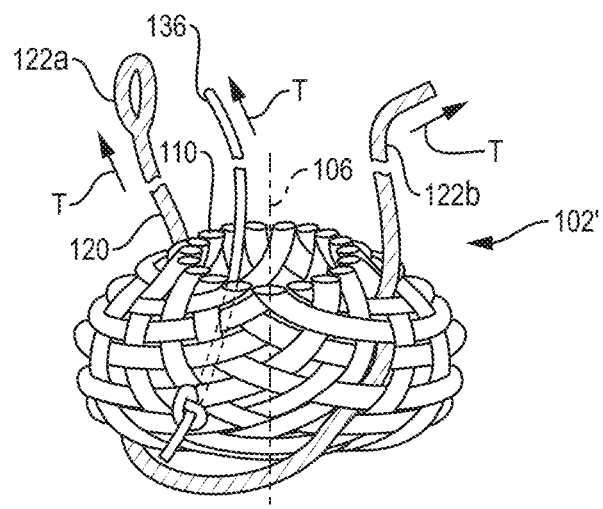
FIG. 1C illustrates the knotlessly locking soft anchor construct of FIGS. 1A and 1B, in a deployed configuration.

Knotlessly locking soft anchor construct 100 may be provided in an elongate configuration is illustrated in both FIGS. 1A and 1B, that may a preferred configuration during storage within the insertion instrument and also during insertion into or through a bone hole. A first suture 120 may extend along the anchor 102 and interweave repeatedly through walls of the anchor 102. First suture 120 may extend along a first side of the longitudinal axis 106 of the anchor 102, around the linear distal edge 113 and return on an opposing side of the axis 106. Two limbs 122a, 122b of first suture 120 may extend from a proximal end 116 of anchor 102. A first limb 122a may terminate include a snare loop that may be a static loop, as defined herein. First suture 120 may be slidingly coupled to anchor 102.

Construct 100 may also include a second suture 130, separately formed from the first suture 120 and fixedly coupled to anchor 102. Second suture 130 may be fixedly coupled to anchor 102 to preclude it from being removed from anchor 102, as the second suture may be the repair suture, that permanently couples the repair tissue to the anchor, as explained in more detail hereafter. Second suture 130 may extend along lumen 105 of tubular body 104. Second suture 130 may enter an open end of lumen 105 at the anchor proximal end 116. Second suture 130 may fixedly couple at a location along the anchor 102, that may be adjacent distal end 112. Second suture 130 may extend from within lumen 105 between the braided strands 110 and include a knot 132 external to anchor 102. Knot 132 may fix second suture 130 to the anchor 102. Knot 132 may be at terminal end 134 of second suture 130. While forming the knot 132 suture 130 may be looped around and between several braided strands 110, forming multiple passes through the tubular body wall. Knot 132 may be a stopping knot, which is a knot large enough that resists being pulled back through between the braided strands 110.

In some embodiments, knot 132 may extend through and beyond anchor distal end 112 and knot 132 may be disposed external to the anchor 102 and distal from the entire anchor 102. In other embodiments, terminal end 134 may be fixedly coupled with adhesives or heat sealing in addition to or instead of a knot 132. In some embodiments the terminal end 134 could be coextensive with distal end 112 and could be fixedly coupled while forming the closed sealed linear edge 113 at distal end 112. Terminal end 134 of suture 130 may therefore be sealed within seal of linear edge 113. A proximal end 136 of second suture 130 may extend from anchor proximal end 116. Suture 130 may extend along lumen 105 and exit a proximal opening of lumen 105.

FIG. 1B is a simplified schematic illustration of the construct 100 shown in FIG. 1A for better understanding of the internal suture routing (120, 130). The anchor 102 may be provided in this first elongate configuration, housed within an insertion and deployment device, similar to device disclosed in at least U.S. Pat. No. 9,962,149, titled "Tissue Repair Assembly"; commonly owned and herein incorporated by reference in its entirety. Upon insertion of the anchor 102 into or through the target tissue, tension on at least one of the first or second suture (120, 130) may deploy the anchor 102, to a deployed state, illustrated in FIG. 1C. First and/or second suture (120, 130) may therefore act as a deploying member. In some embodiments, tension T may be applied to all proximally extending limbs (122a, 122b, 136) to deploy the anchor 102. Since the superior fixation strength of the anchor is achieved at least partially by applying high tensioning loads to the anchor 102, (between 100-150N, and up to 200N), the inventors have found that application of this high load across three suture limbs allows the sutures (120, 130) to be smaller in size while not breaking under these high loads. Tensioning the three limbs (122a, 122b, 136) bunches up the anchor 102, changing the anchor to a deployed configuration 102' and fixes the anchor 102 within the target tissue, depicted in FIG. 1C.

Applicants have found that it is preferable that deploying members are formed with suture material, including sutures, suture tapes or flattened suture that are both flexible enough to bend around and through the anchor 102 and may take the high deploying loads. Flexible wires, especially nitinol wires may frustrate the purpose of the deploying member. Flexible wires or cables may not bend readily around and through these small anchors without kinking. Wires may also elongate under these high-tension loads, especially nitinol wires. Flexible wires may cut braided strands 110 under these high-tension loads. The first suture 120 may be a polyester size #0suture. The second suture 130 may be an ULTRABRAID #2.

Figure 1D:
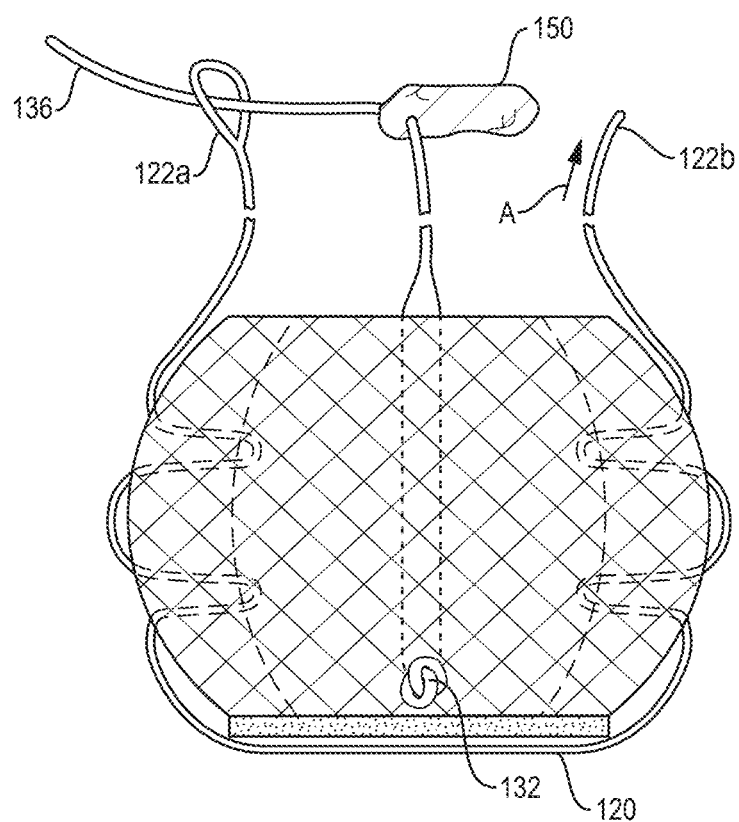
FIG. 1D schematically shows a method of tissue repair with the knotlessly locking soft anchor construct of this disclosure.
Figure 1E:
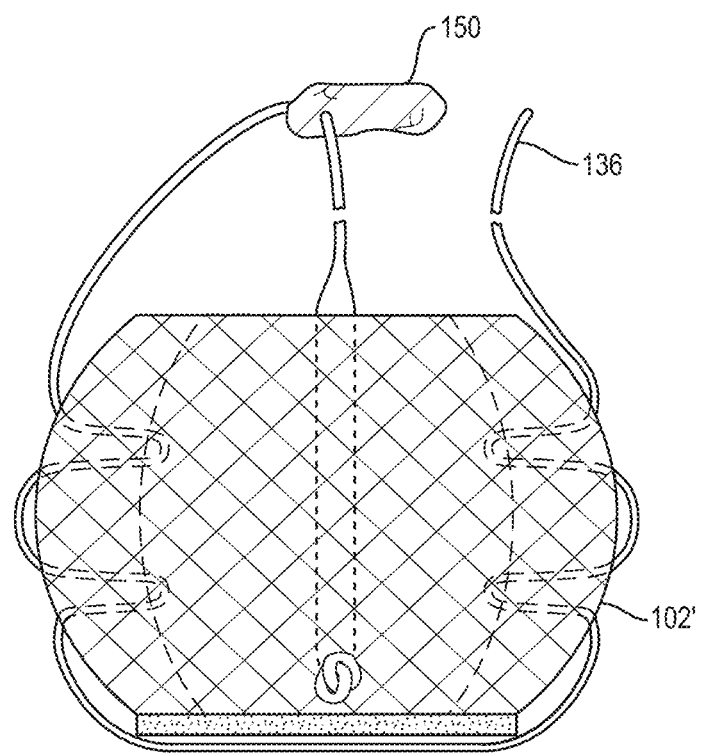
FIG. 1E schematically shows a further step in the method of tissue repair the knotlessly locking soft anchor construct of this disclosure, with the construct in a knotlessly locked configuration, in accordance with this disclosure.

Turning now to FIGS. 1D-1E, the second suture 130 may also act as a repair suture and during the repair may be operatively coupled to tissue 150 before being coupled to limb end 122a. Second suture 130 may therefore act first as a deploying member and then as a repair member. After coupling to the tissue 150, second suture 130 may be threaded through snare loop at limb end 122a, as illustrated in FIG. 1D. With the second suture end 136 snared, drawing on first suture end 122b may then slide first suture 120 through deployed anchor 102' and remove first suture 120 from the deployed anchor 102' replacing the first suture 120 with the second suture end 136/suture 130. First suture 120 therefore may be defined as a deploying member and also a transfer member. Withdrawing suture end 122b in the direction of arrow "A" may transfer the repair suture 130 into and along the deployed anchor 102', so that the repair suture 130 traces the same path defined by the first suture 120, as the construct 100 was provided (FIG. 1A, 1B). The resulting configuration is a second suture/repair suture 130 that is fixedly coupled at one end 134, coupled to a repair tissue 150 and woven around and through the deployed anchor 102', as illustrated in FIG. 1E. This configuration may be defined as a deployed knotlessly locked configuration. The tortuous path that the second/repair suture 130 takes through the anchor, in its deployed and bunched up state, may provide sufficient friction to lock the second suture 130 in place and prevent it from sliding or loosening. The anchor 102 is deployed and locked in the deployed configuration (102'). The construct 100 is coupled to a repair tissue 150 and prevented from moving.

Coupling the second suture 130 to the first suture limb 122a may occur outside the patient body, with the anchor inserted and deployed. The inventors have found that deploying the anchor 102 first, followed by coupling a repair tissue to the deployed anchor 102' makes the method more streamlined, than for example repairing the tissue before embedding the anchor within the bone tissue. This allows the repair suture 130 to be provided or obtained preassembled to any deploying actuation means on the insertion instrument such that the anchor deploying members may include both sutures (120, 130) and thereby improve the fixation strength. This may align better with the surgical flow. If the repair suture 130 was not employed as a deploying member and was attached to a repair tissue 150 before deploying the soft anchor 102, an extra pair of hands or means of holding the instrument near the target treatment site may be required while the repair suture was attached to the tissue within the patient. This would not be preferable.

Figure 2A:
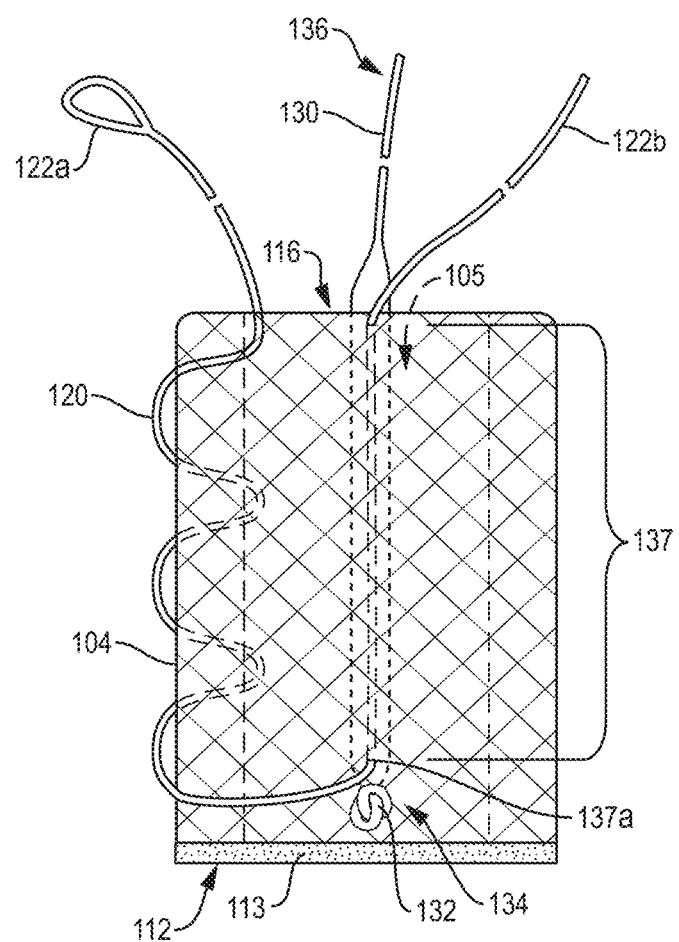
FIG. 2A schematically shows another knotlessly locking soft anchor construct of this disclosure, in an undeployed configuration, in accordance with this disclosure.
Figure 2B:
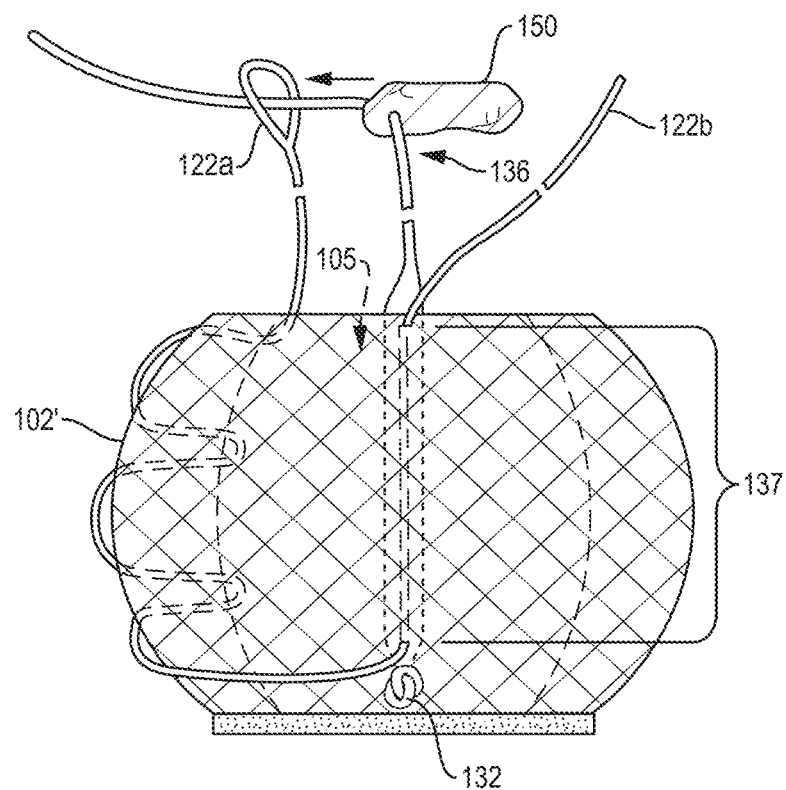
FIG. 2B schematically shows part of a method of placing the knotlessly locking soft anchor construct of this disclosure into a knotlessly locked configuration, in accordance with this disclosure.
Figure 2C:
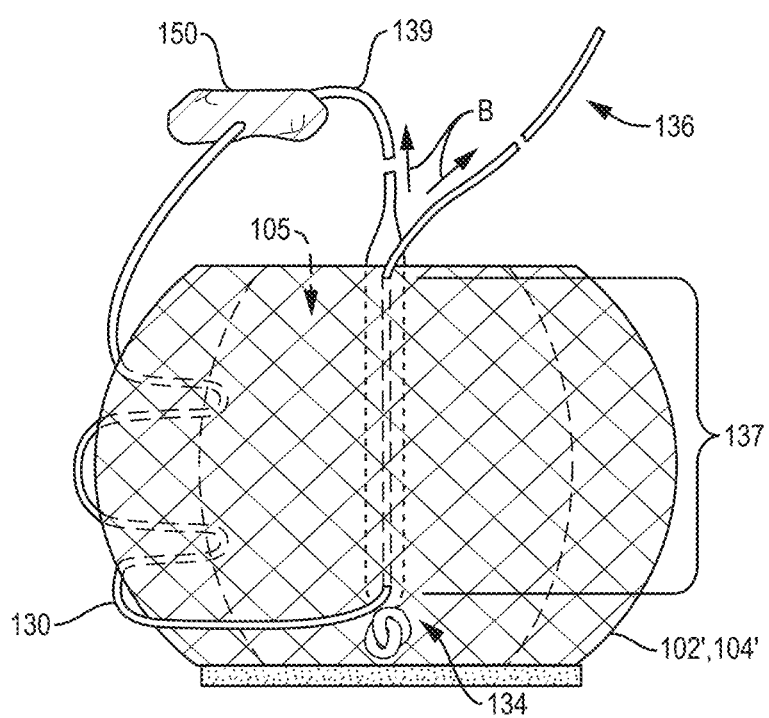
FIG. 2C schematically shows the knotlessly locking soft anchor construct of FIG. 2A in a knotlessly locked configuration, in accordance with this disclosure.

FIG. 2A-2C illustrates various aspects of another soft anchor knotless construct 200 and method of use. Like components are given the same identifier. Construct 200 includes a soft anchor 102, that may be similar to the Q-fix ◊ offered for sale by Smith and Nephew. In this embodiment, the first suture 120 is routed through a cannulation of the second suture 130 within and along the anchor lumen 105. FIGS. 2A-2C illustrate a partial or simplified cross section view of anchor 102 to illustrate this internal routing. FIG. 2A schematically shows the construct 200 as obtained, in elongate form, that may be housed within a distal end bore of an inserter instrument. A first suture 120 is repeatedly interwoven through a first side of a longitudinal axis 106 of anchor 102 from an external surface of the anchor 102 to the lumen 105, similar to the routing in construct 100. Towards anchor distal end 112, first suture 120 may extend through the braided strands of the anchor wall and into the anchor lumen 105 and may remain within lumen 105, until exiting the proximal end of anchor lumen 105 that may be an open proximal end. The first suture 120 may not extend across to the opposing side of the anchor longitudinal axis 106. In other embodiments, the suture 120 may extend over the anchor distal edge 113 and then enter lumen 105 from the other side of the tubular wall (not shown). This may improve even deployment on both sides of the longitudinal axis of the anchor 102.

First suture 120 extends proximally along lumen 105 and also, simultaneously within a cannulation or passage 137 of the second suture 130. Therefore, first suture 120 extends within both the cannulation 137 and anchor lumen 105 coextensively. First suture 120 enters cannulation 137 at entrance aperture 137a and exits at aperture 137b. Apertures 137a, 137b may not be pre-formed, and may be locations through which the first suture 120 extends between strands of the second suture 130. Distance between apertures 137a, 137b defines a locking passage axial length. Second suture 130 includes cannulation 137 for receiving first suture 120 therein. Second suture 130 may be formed without strands along its core, along its entire length and therefore defines a cannulated or hollow suture. First suture 120 may include strands along its core, as this may allow the first suture 120 to maintain the strength requirements (to deploy the anchor 102) and yet have a smaller outer diameter for routing through the second suture 130. In some embodiments, second suture 130 may have distal end 134 on an external portion of anchor 102, similar to that shown in FIG. 1A and first suture 120 may enter cannulation 137 of the second suture 130 at a location external to the anchor 102. Stated another way, entrance 137a of first suture 120 into cannulation 137 may be external to anchor 102.

Second suture distal end may be fixedly coupled to anchor 102 to preclude it from moving proximally relative to anchor 102, in a similar fashion to those described in system 100. Second suture 130 may extend along and within lumen 105 of anchor 102. Second suture 130 may extend from an open proximal end of lumen 105 at the anchor proximal end 116. Second suture 130 may fixedly couple at a location along the tubular body 104, that may be adjacent distal end 112. Second suture 130 may extend between strands of the anchor 102 and may include a knot 132 to couple second suture 130 to the tubular body 104. Knot 132 may be at terminal end 134 of second suture 130. Knot 132 may loop around and between strands 110 or may be a large enough knot that won't fit back through between the braids 110. Knot 132 may extend through and beyond distal end 116 and knot may be disposed external to the tubular body 104 and distal from the entire tubular body 104. In other embodiments, terminal end 134 may be fixedly coupled with adhesives or heat sealing. In some embodiments the terminal end 134 could be coextensive with distal end 112 and could be fixedly coupled while forming the closed sealed linear edge 113 at distal end 112. Terminal end 134 would be sealed within sealed linear edge 113. A proximal end 135 of second suture 130 may extend from anchor proximal end 116.

The anchor 102 may be provided in this first configuration that is elongate as illustrated in FIG. 2A, housed within an insertion and deployment device, similar to device disclosed in at least U.S. Pat. No. 9,962,149, titled "Tissue Repair Assembly"; commonly owned and herein incorporated by reference in its entirety. Upon insertion of the anchor 102 into the target tissue, tension on at least one of the first or second sutures (120, 130) may deploy the anchor 102, as illustrated in FIG. 2B. As explained herein, it may be preferable to tension all three proximally extending limbs (122a, 122b and 136) to apply the high deploying loads. First and/or second suture (120, 130) may therefore act as a deploying member. In some embodiments tension may be applied to all proximally extending limbs (122a, 122b, 136) to deploy the anchor 102. This bunches up the anchor 102 and anchors it with the target tissue. The second suture 130 may then act as a repair suture and be operatively coupled to tissue 150 before being threaded through snare loop at limb end 122a. The second suture 130 may be passed through loop at limb end 122a outside of the patient body. Drawing on end 122b of first suture 120 may then slide first suture 120 through deployed anchor 102' and remove first suture 120 from the anchor 102 and replace it with a portion of the second suture 130. First suture 120 therefore may be defined as both a deploying member and a transfer member. Withdrawing suture end 122b may transfer the repair suture 130 into and along the deployed anchor 102', so that the repair suture 130 traces the same path defined by the first suture 130, as initially obtained (FIG. 2A). The resulting configuration is a second suture 130 that is fixedly coupled at one end 134, coupled to a repair tissue 150 and woven around and through the deployed anchor 102', as illustrated in FIG. 2C. The second suture 130 is also woven through itself along cannulation 137 (also called a splice). Tension (arrows B) on the second suture 130 either from suture end 136 or from resulting loop portion 139 may act to shrink the diameter of cannulation 137 and cinch the second suture 130 around itself, in a similar fashion to a Chinese finger trap. This may further lock the construct 200. The configuration shown in FIG. 2C may be defined as a deployed knotlessly locked configuration. The tortuous path that the second suture 130 takes both through the deployed anchor 102' that is bunched up in its deployed state and through itself along at least cannulation 137 may provide sufficient friction to lock the second suture 130 in place and prevent it from sliding or loosening. The deployed anchor 102' is also knotlessly locked in the deployed configuration. The construct 200 is also coupled to a repair tissue 150, that is prevented from moving.

The length of locking passage may be sufficient to knotlessly lock the system 200. In other embodiments, second end of first suture 122b may also include a loop such that the repair loop is reversed. In this alternative reverse loop, second suture may be coupled to second end 122b and first end 122a may be withdrawn, which would route the second suture 130 through the cannulation 137 and anchor lumen 105 first before it weaves through the deployed anchor 102'.

Figure 3A:
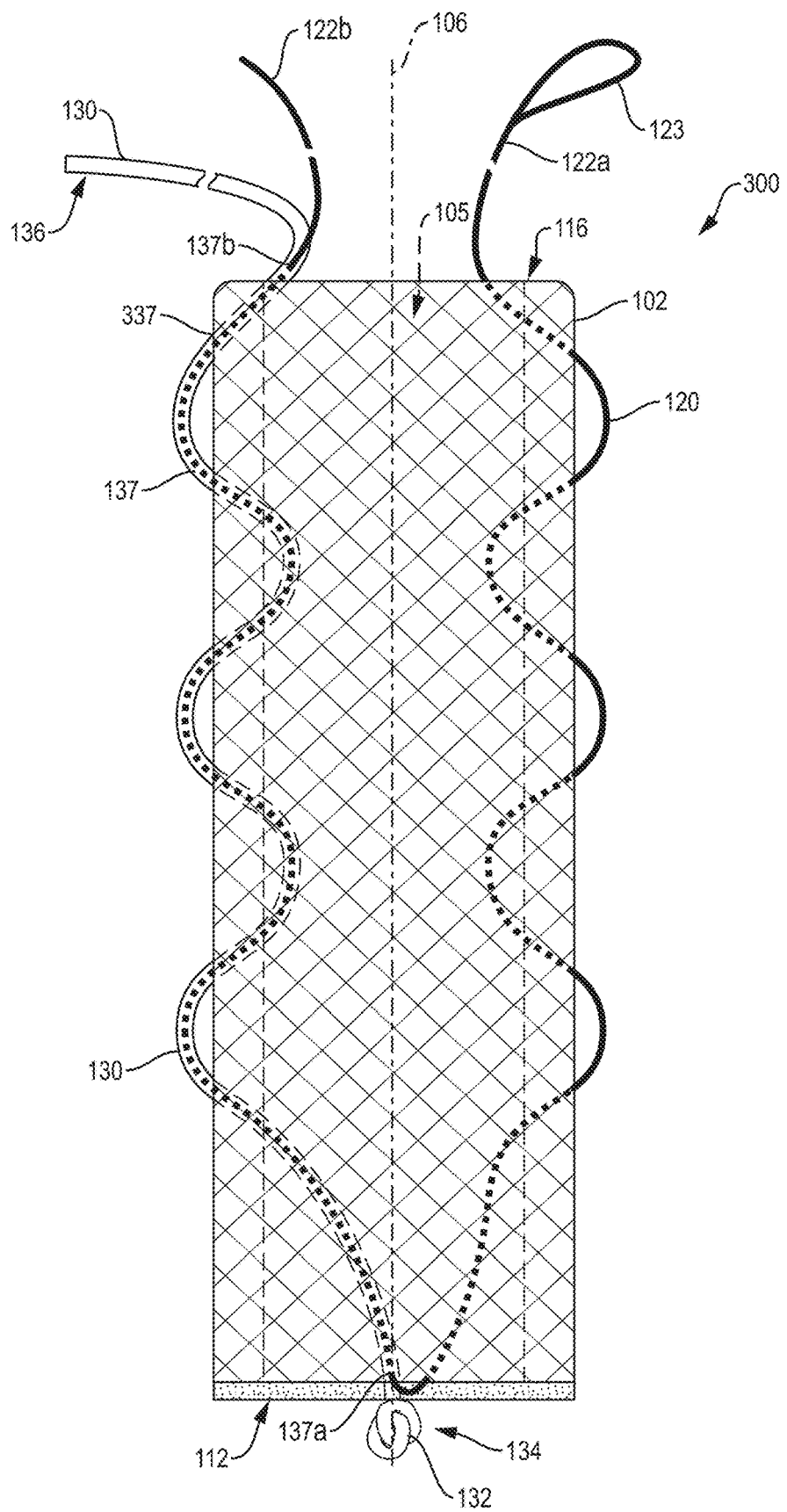
FIG. 3A schematically shows another knotlessly locking soft anchor construct, in accordance with this disclosure.

FIG. 3A illustrates various aspects of another knotlessly locking soft anchor construct 300. Like components to construct 100 and 200 are given the same identifier. Construct 300 may include a locking passage similar to construct 200. FIG. 3A depicts the construct 300 as obtained. In this configuration, the anchor 102 is elongate and may be housed within a tube of an insertion instrument. In this configuration, the first suture 120 may be routed through a cannulation 137 of the second suture 130, to define and form the suture locking passage portion 337 of the construct 300 during later operation of said construct 300. Locking passage portion 337 may extend along the anchor 102, and also interweave repeatedly between the braided strands 110 of the anchor wall, braided strands 110 seen best in FIG. 1A. Having the repair suture 130 interweave along the anchor wall rather than extend within the anchor lumen 105 (as depicted in construct 200) may improve overall anchor fixation strength relative to construct 200. Having repair suture 130 interweave along the anchor wall in conjunction with the deploying suture interwoven through both sides of the anchor 102 may more evenly deploy anchor 102 between each side (of the longitudinal axis) and thereby improve anchor fixation strength. The locking passage portion 337 may interweave between an external-most surface of the sidewall of the anchor 102 and the anchor lumen 105. Passage portion 337 may extend from a proximal most edge of the anchor 102 when in the elongate configuration as shown in FIG. 3A up and a distal most edge of the anchor 102. FIG. 3A illustrates a simplified schematic of the construct 300, to illustrate the routing of sutures 120, 130 through each other and through the anchor 102. Anchor 102 defines a tubular body 104 and a first suture 120 is repeatedly interwoven through an entire width of a first sidewall of the tubular body 104, the first sidewall extending along a first side of longitudinal axis 106 of anchor 102. The first suture 130 interweaves back and forth between the external surface of the anchor 102 and lumen 105, and as shown is interwoven three times as it extends along the anchor 102. Towards the distal end 112, first suture 120 may extend through the anchor wall and into the anchor body lumen 105 and then into the second suture cannulation 137 at entrance 137a

First suture 120 may extend along the anchor 102 and weave through the opposing sidewall of the longitudinal axis, while being simultaneously disposed within the second suture cannulation 137. First suture 120 enters cannulation 137 at entrance aperture 137a and exits at aperture 137b. Apertures 137a, 137b may not be pre-formed, and may be locations through which the first suture 120 extends between strands of the suture 130. Aperture 137a may be within anchor lumen 105 at distal end 116. An axial distance between apertures 137a, 137b defines a locking passage length. First suture 120 may include braids along its core, as this may allow the first suture 120 to maintain a high strength and yet have a smaller diameter for routing through the second suture 130. In some embodiments, first suture 120 may enter cannulation 137 of the second suture 130 at a location external to the anchor 102. Stated another way, entrance 137a of first suture 120 into cannulation 137 may be external to anchor 102.

Second suture distal end 134 may be fixedly coupled to anchor 102 to preclude it from moving proximally relative to the anchor 102. Second suture 130 may extend through an open proximal end of lumen 105 at the anchor proximal end 116. Second suture 130 may fixedly couple at a location along the anchor 102, that may be adjacent distal end 112. Distal end 112 may be sealed closed, and therefore second suture 130 may extend between braided strands 110 of the anchor 102 and include a knot 132 external to the anchor 102, to fix second suture 130 relative to anchor 102. Knot 132 may be at terminal end 134 of second suture 130. Knot 132 may be formed with two half hitch knots, or a stopper knot such as the Ashley stopper knot or a square knot. If two half hitch knots are used, it may be preferable that the second half hitch axially overlaps the first half hitch knot, to reduce an axial length of the overall knot 132. Knot 132 preferably is large enough to prevent the second suture 130 from disconnecting from the anchor 102. Knot 132 may be disposed distal to the anchor distal end 112. In other embodiments, terminal end 134 may be fixedly coupled with adhesives or heat sealing instead of or supplemental to knot 132.

The knotlessly locking soft anchor system 300 may be provided in this first configuration as illustrated in FIG. 3A, housed within an insertion and deployment device, similar to device disclosed in at least U.S. Pat. No. 9,962,149, titled "Tissue Repair Assembly"; commonly owned and herein incorporated by reference in its entirety. Upon insertion of the anchor 102 into or through the target tissue, tension on at least one of the first or second suture (120, 130) may deploy the anchor 102. First and/or second suture (120, 130) may therefore act as a deploying member. In some embodiments tension may be applied to all proximally extending limbs (122a, 122b, 136) to deploy the anchor 102, which may provide advantages, as explained previously herein.

Figure 3B:
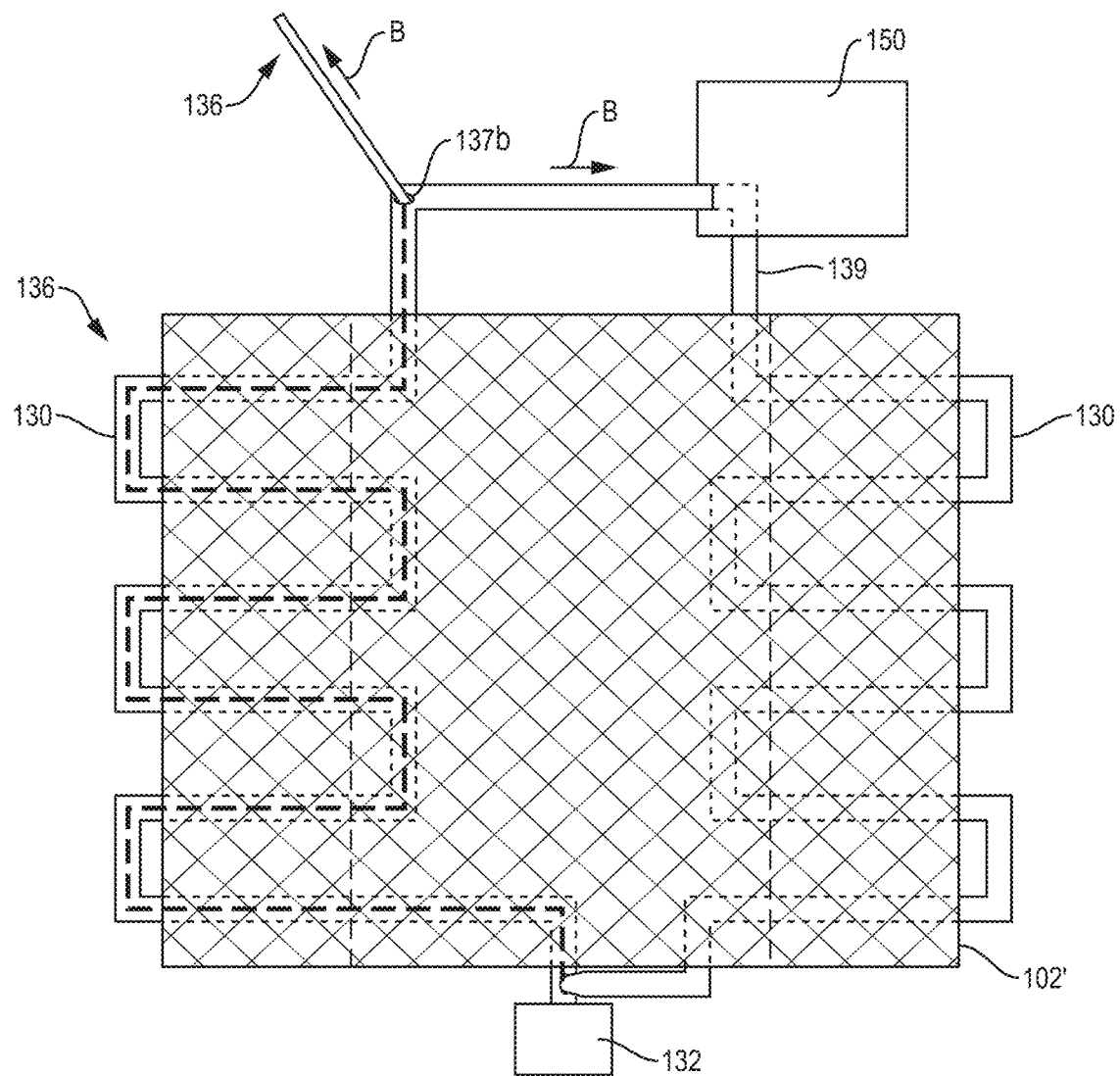
FIG. 3B schematically shows the knotlessly locking soft anchor construct of FIG. 3A in a deployed and locked configuration, in accordance with this disclosure.

The second suture 130 may then act as a repair suture and be operatively coupled to tissue 150 before being threaded through snare loop at limb end 122a. The second suture 130 may be passed through loop 123 at limb end 122a outside of the patient body. Drawing on end 122b of first suture 120 may then slide the first suture 120 through the anchor 102 and remove first suture 120 from the anchor 102 and replace it with the second suture 130. First suture 120 therefore may be defined as a deploying member/suture and a transfer member/suture. Withdrawing suture end 122b may transfer the repair suture 130 into and along the deployed anchor 102', so that the repair suture 130 traces the same path defined by the first suture 130 when first obtained. The resulting configuration is a second suture 130 that is fixedly coupled at one end 134, coupled to a repair tissue 150 and woven around and through the deployed anchor 102', as schematically shown in FIG. 3B. Tension (arrows B) on the second suture 130 either from suture end 136 or from resulting loop portion 139 may act to shrink the diameter of cannulation 137 and cinch the second suture 130 around itself, in a similar fashion to a Chinese finger trap. This may further lock the construct 300. The configuration shown in FIG. 3B may be defined as a deployed knotlessly locked configuration. FIG. 3B illustrates a simplified more circuit like illustration of the system 300 for simplicity of understanding. The tortuous path that the second suture 130 takes both through the deployed anchor 102' and through itself along at least cannulation 137 provides sufficient friction to lock the second suture 130 in place and prevent it from sliding or loosening. The deployed anchor 102' is also knotlessly locked in the deployed configuration.

Deploying the anchor 102 may move the locking passage 337 from being entirely within the anchor 102 to protruding proximally therefrom, such that exit 137b may be proximally spaced from anchor 102. Some of the suture ends (either suture 120 and/or 130) may be tapered in diameter to reduce the force required to draw the suture into and along the anchor and second suture 130 (explained in more detail hereinafter). Further sutures may be operatively coupled the anchor 102. For example, a third suture may operatively couple to anchor 102, along a path that is circumferentially offset from the sutures shown. Another knotless construct (with another repair suture and transfer suture) may also thread through anchor 102, at a circumferentially offset location.

FIGS. 4A-4D illustrate a method of constructing the knotlessly locking soft anchor construct 300. A repair suture 130 may first be prepared. Preparation includes obtaining a suture 130 that includes at least a portion with a hollow core (cannulation 137). Suture 130 may be trimmed to approximately 24 inches in length and a stopping knot 132 may be formed at a first terminal end 134. Forming the stopping knot 132 may include forming a first half hitch and then forming a second half hitch that axially overlaps the first half hitch. Suture 130 may then be lined up next to anchor 102, with knot 132 at a distal end 112 of anchor 102, and a mark 411 may be made on the suture 130 that aligns with the proximal end 116 of anchor 102. This mark may correlate with passage exit 137b. Anchor 102 may be in a relaxed, and possible slightly stretched or elongate form during construction. The axial distance along second suture 130 between knot 132 and mark 411 may define a locking passage linear length, which may approximate an axial length of anchor 102, in the relaxed or elongate configuration. Suture locking passage (337) may have a linear length of 15 mm, sufficient to form a strong enough knotless lock with itself. In other embodiments the length may be less than the axial length of anchor 102. Having a locking passage linear length that is shorter than the total axial length of the anchor 102 may be advantageous for application in smaller bones or softer bones. Given that the anchor 102 tends to axially shorten during deployment, deployment may result in the locking passage protruding slightly from the anchor proximal end 116. This may be concerning to the surgeon. This may be problematic for smaller bones with thinner cortical layers, as there may not be sufficient space for the protruding passage portion. Therefore, an alternative method of construction may include placing the mark 411 at a location along the anchor body axial length, at location 411a for example.

Figure 4A:
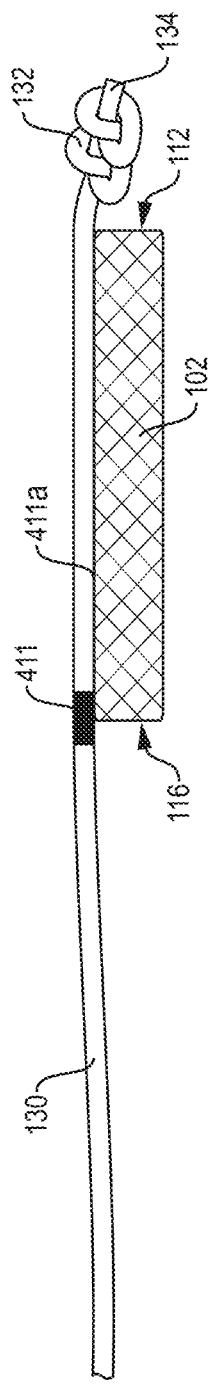
FIGS. 4A-4D illustrates a method of constructing the knotlessly locking construct of FIG. 3A.
Figure 4B:
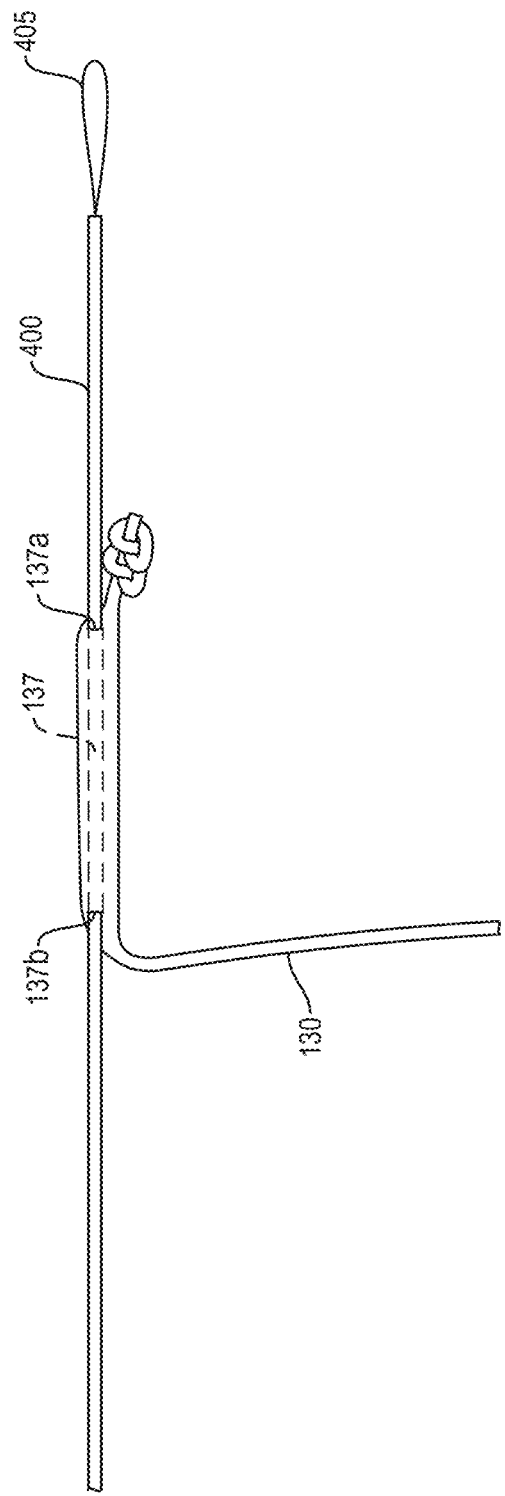
Figure 4C:
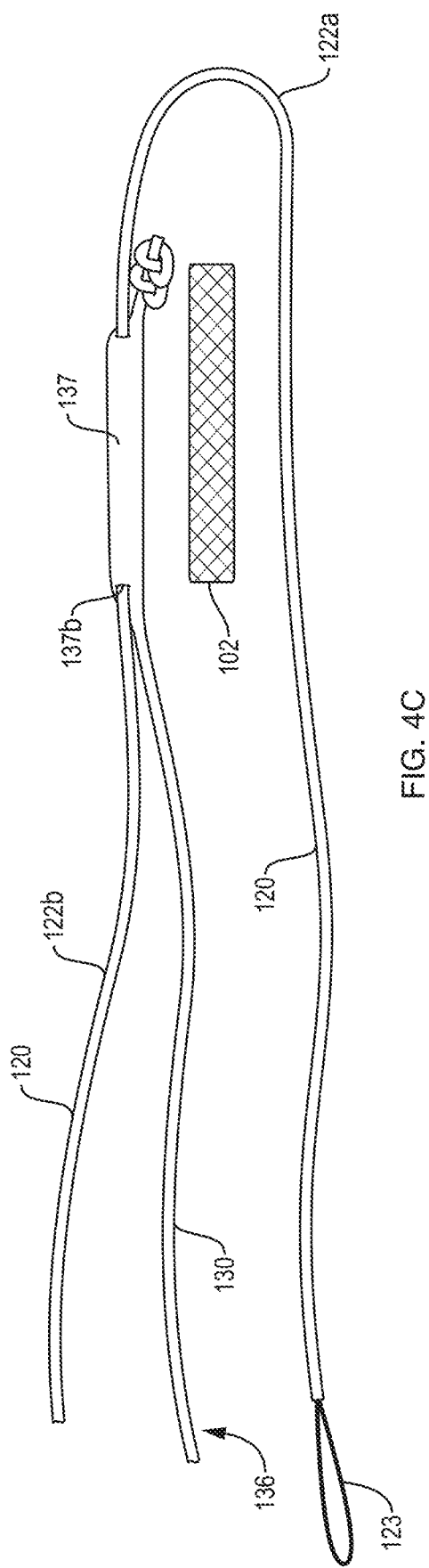

Turning to FIG. 4B, a snaring tool 400 with a looped end 405 may be obtained and may be threaded through repair suture 130, between its braided strands and into and along the cannulation 137. Snaring tool 400 may exit the cannulation 137 between the braided strands of suture 130 directly adjacent knot 132. Snaring tool 400 may define entrance 137a and exit 137b.

Another suture may then be obtained, the other suture may be the first suture 120. First suture 120 may be smaller in diameter (or cross-sectional dimension) than repair suture 130. First suture 120 may be obtained or trimmed to a maximum length that is approximately twice that of the second/repair suture 130. First suture 120 may include a looped end 123, as obtained or looped end 123 may first be prepared. The looped end 123 may be configured to engage or snare a repair suture end 136. The snaring tool 400 may then be operatively coupled to the first suture 120 and withdrawn, so as to assemble the first suture 120 through cannulation 137, shown in FIG. 4C. First suture 120 may be drawn and threaded through the cannulation 137, such that a first suture first end 122a extends from exit 137a and first suture second end 122b extends from exit 137b, also shown in FIG. 4C.

Figure 4D:
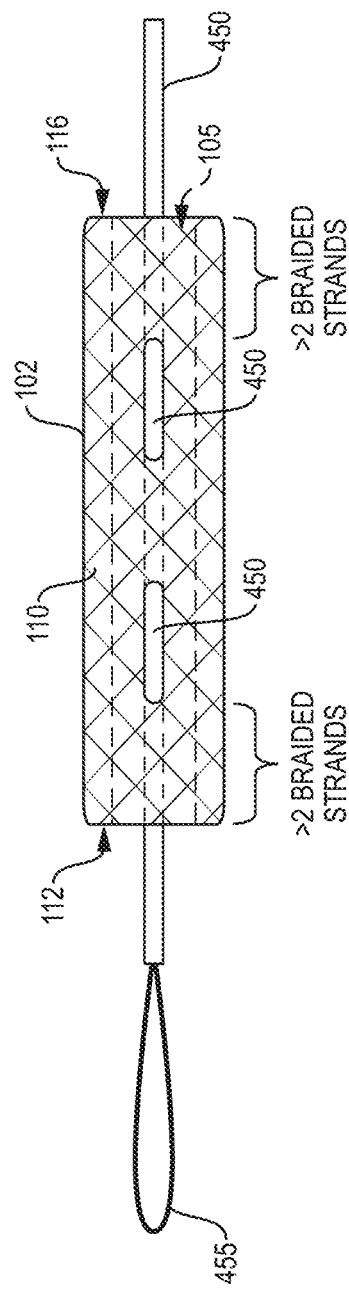

Turning now to FIG. 4D, path through anchor 102 may be formed using a needle tool 450, that may be like snare tool 400. Needle tool 450 may interweave between braided strands 110 of the anchor 102, as shown in FIG. 4D. Needle tool 450 may include a looped end 455. Both ends of needle tool 450 may extend directly from lumen 105 of anchor 102. In some embodiments distal end 116 may be a heat-sealed linear edge that is closed and while inserting the needle tool 450, a small opening through the closed end may be formed. It is preferable that the spacing between each entrance or exit between the braids 110 and through the anchor sidewall be approximately equal to each other, to improve consistent and even deformation of the anchor 102 during deployment. The needle tool 450 preferably extends first though the lumen 105 and then pass through the sidewall of the anchor 102 at least 2 braided strands 110 in from a proximal most or distal most end edge of the anchor 102, to reduce the possibility of undoing the braiding.

Looped end 455 of needle 450 may snare suture end 122b and suture end 136 simultaneously to draw the two sutures (130, 120) through the anchor 102 along the path defined by the needle path through anchor 102. Ends 122b and 136 may then be used to draw the cannulation 137 (locking passage 337) into and along anchor 102 up until knot 132 abuts distal end 112 of external surface of anchor 102. Needle 450 may then repeat this action along the opposing side of anchor longitudinal axis 106 to thread only suture end 122a (and also loop 123) along and through anchor 102. The sutures may then be threaded through a shaft of an insertion instrument and ends (122a, 122b, 136) operatively coupled to a deploying actuation means of the insertion instrument. The anchor 102 may be placed within or at an instrument shaft distal end.

Figure 5A:
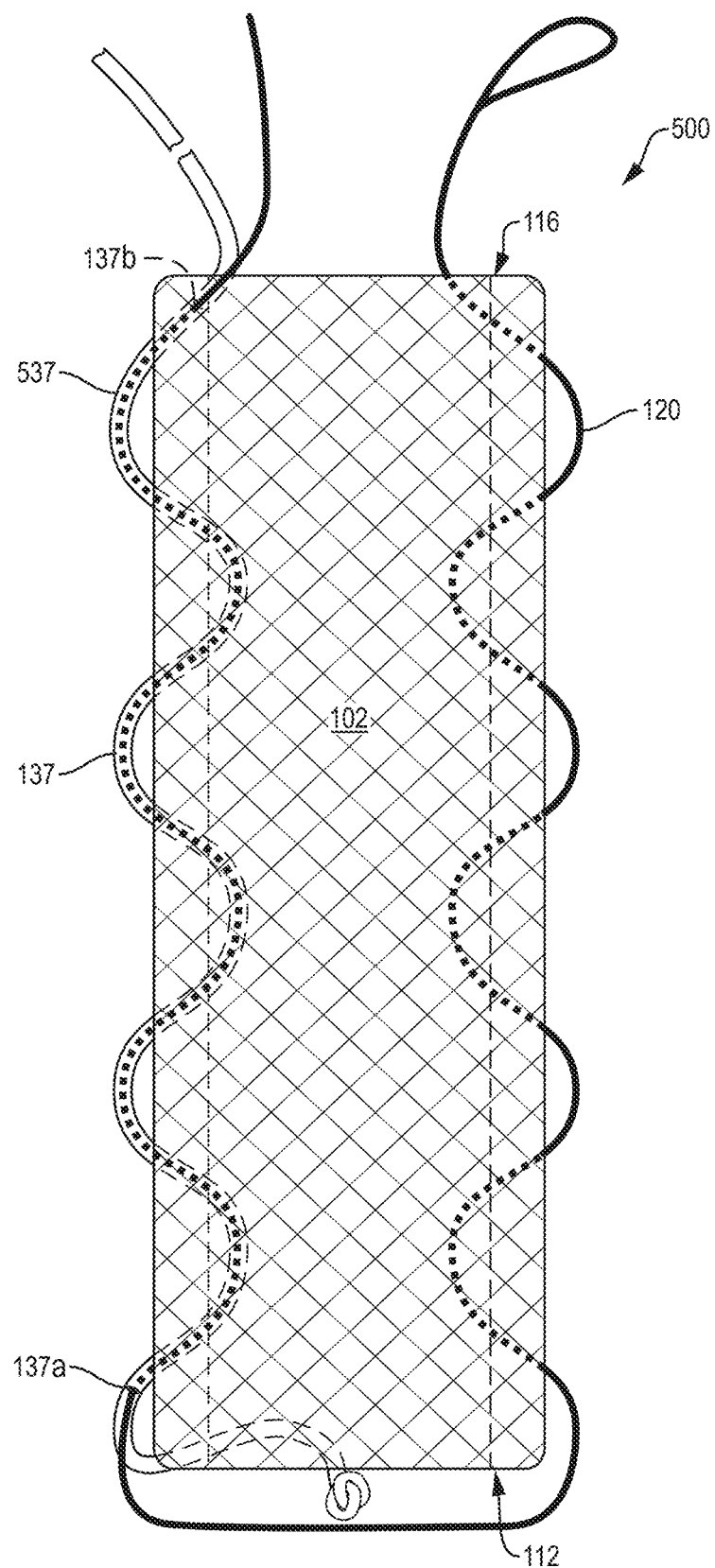
FIGS. 5A-5E schematically shows other embodiments of knotlessly locking constructs, in an undeployed and unlocked configuration, in accordance with this disclosure.

FIG. 5A illustrates another knotlessly locking soft anchor construct 500. Construct 500 is like construct 300 except where noted. Of note, entrance 137a and exit 137b to cannulation 137 may be spaced from anchor distal end 112 and anchor proximal end 116 respectively. Suture locking passage 537 may be shorter than the anchor axial length in its elongate configuration, such that upon deployment the locking passage 537 is less likely to protrude proximally from the deployed anchor 102', as discussed herein. In addition, entrance 137a may be external to anchor body 102. As such transfer suture 120 may interweave along anchor 102 along a first sidewall (right sidewall as shown in FIG. 5A) and around an external surface of anchor distal end 112, so that it remains external to anchor 102 at the anchor distal end 112, entering cannulation entrance 137a before returning back into the anchor 102. Having the transfer suture 120 wrapped around anchor distal end 112 may improve deployment and fixation strength. Having a locking passage 537 that is shorter than the anchor maximum axial length may reduce any length of the locking passage 537 that extends from the anchor proximal end 114, once the anchor 102 has been deployed (which may shorten an axial length of the anchor 102)

Figure 5B:
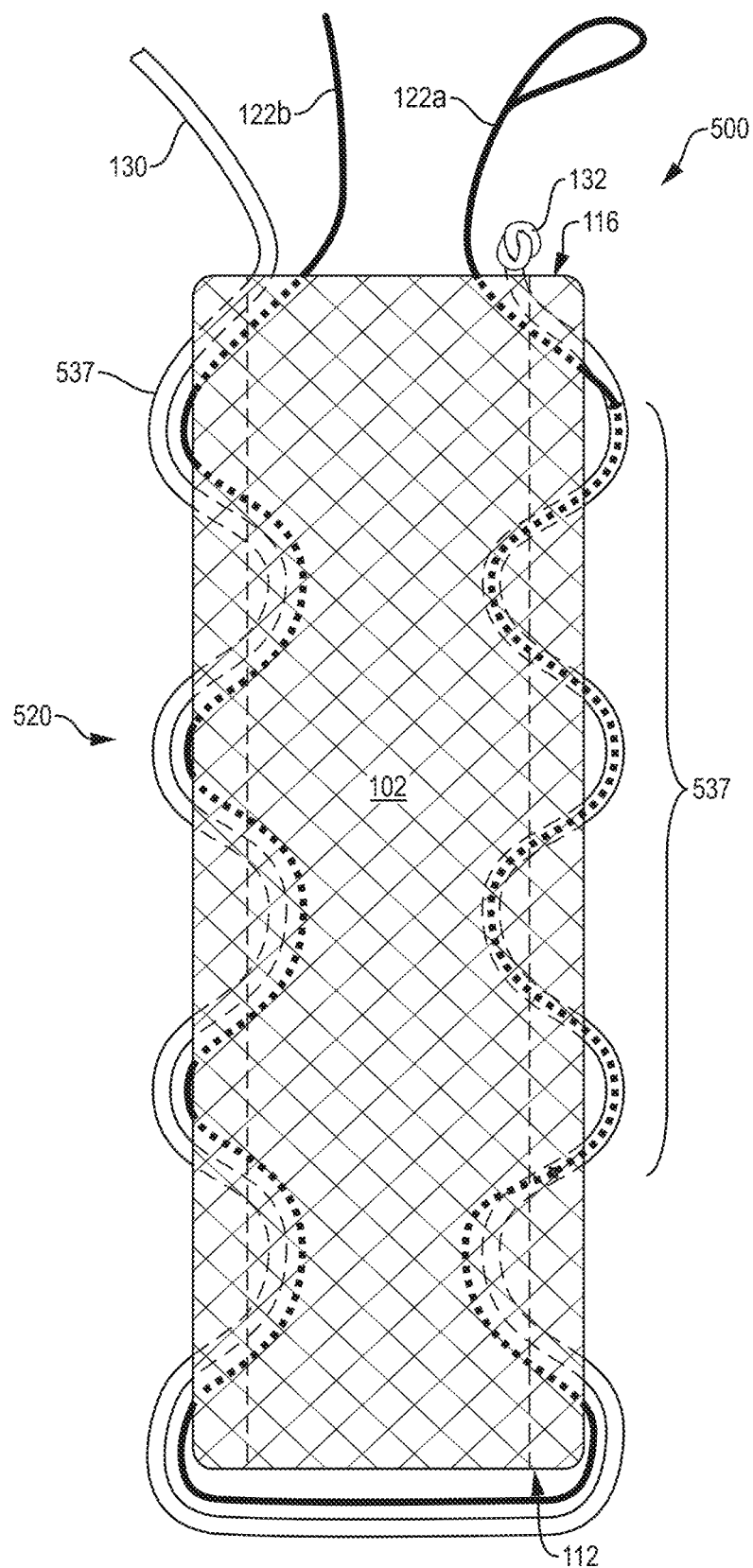

FIG. 5B illustrates another knotlessly locking soft anchor construct 820, in its pre-deployed form. Construct 520 is like construct 300 except where noted. Construct 520 includes a knot 132 on the proximal end 116. Suture locking passage 537 may shorter than a total axial length of the anchor 102 but may still interweave between the braided strands 110. In this embodiment the repair suture 130 enters the locking passage 537 at the proximal end thereof and extends distally through the locking passage 537 before interweaving around and along the anchor 102.

Figure 5C:
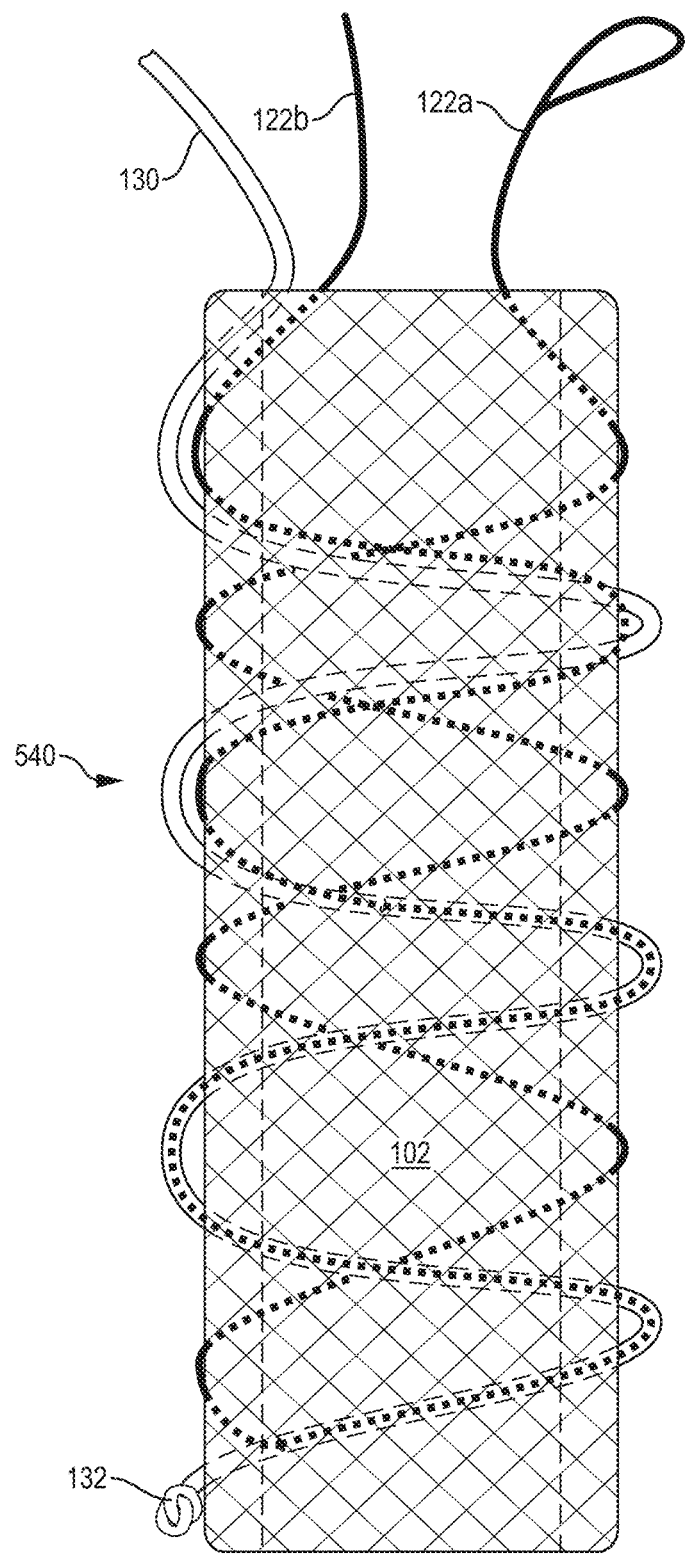

FIG. 5C illustrates another knotlessly locking soft anchor construct 840, in its pre-deployed form. Construct 550 is like construct 300 except where noted. Construct 540 includes unlocking passage 537 that zigzags back and forth through an entire cross section anchor 102. This may allow locking passage 537 to be sufficiently long for adequate knotless locking, but this routing may limit the locking passage 537 protruding from an anchor proximal end 116 after the anchor 102 has been deployed.

Figure 5D:
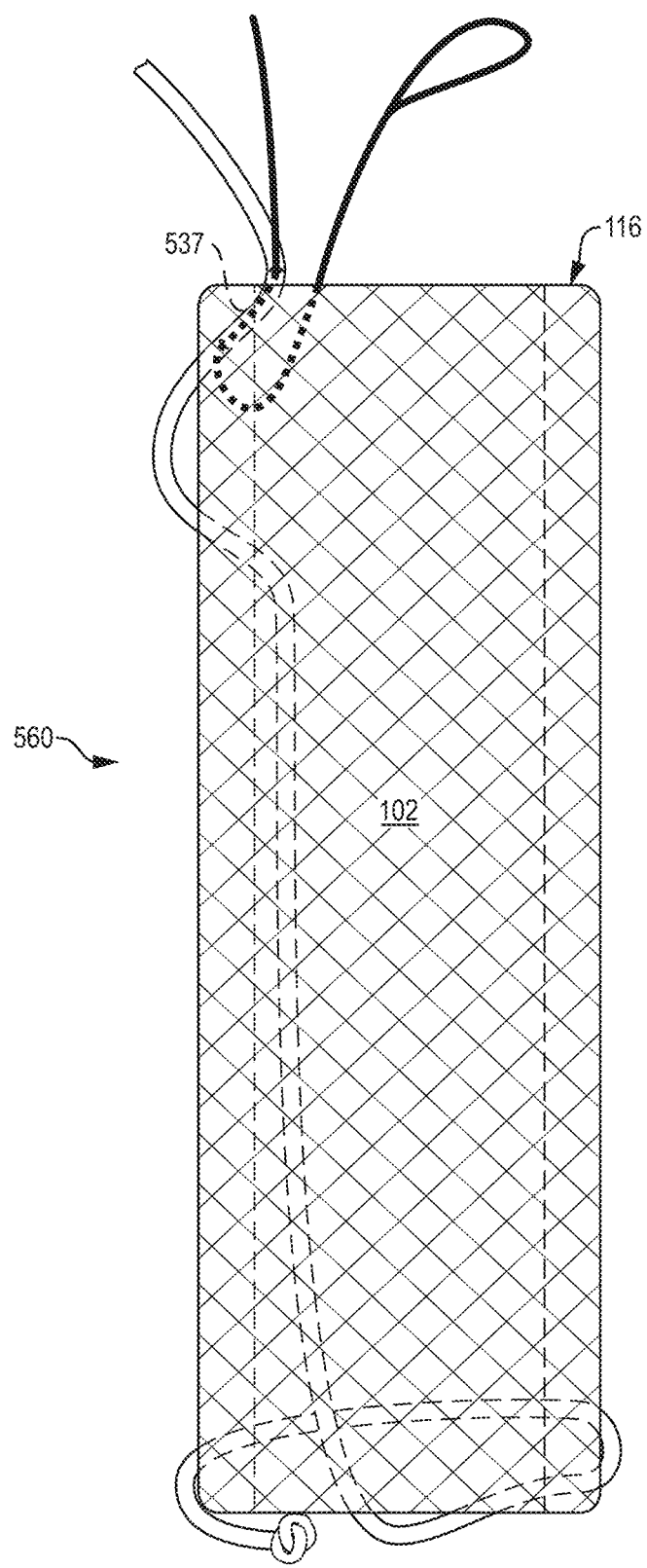

FIG. 5D illustrates another knotlessly locking soft anchor construct 560 in its pre-deployed form. Construct 560 is like construct 300 except where noted. Construct 560 includes a locking passage 537 that is at a proximal end 116 of anchor 102. This may reduce the forces to pass the repair suture 130 through locking passage 537. However, the locking passage 537 will protrude from the proximal end 116.

Figure 5E:
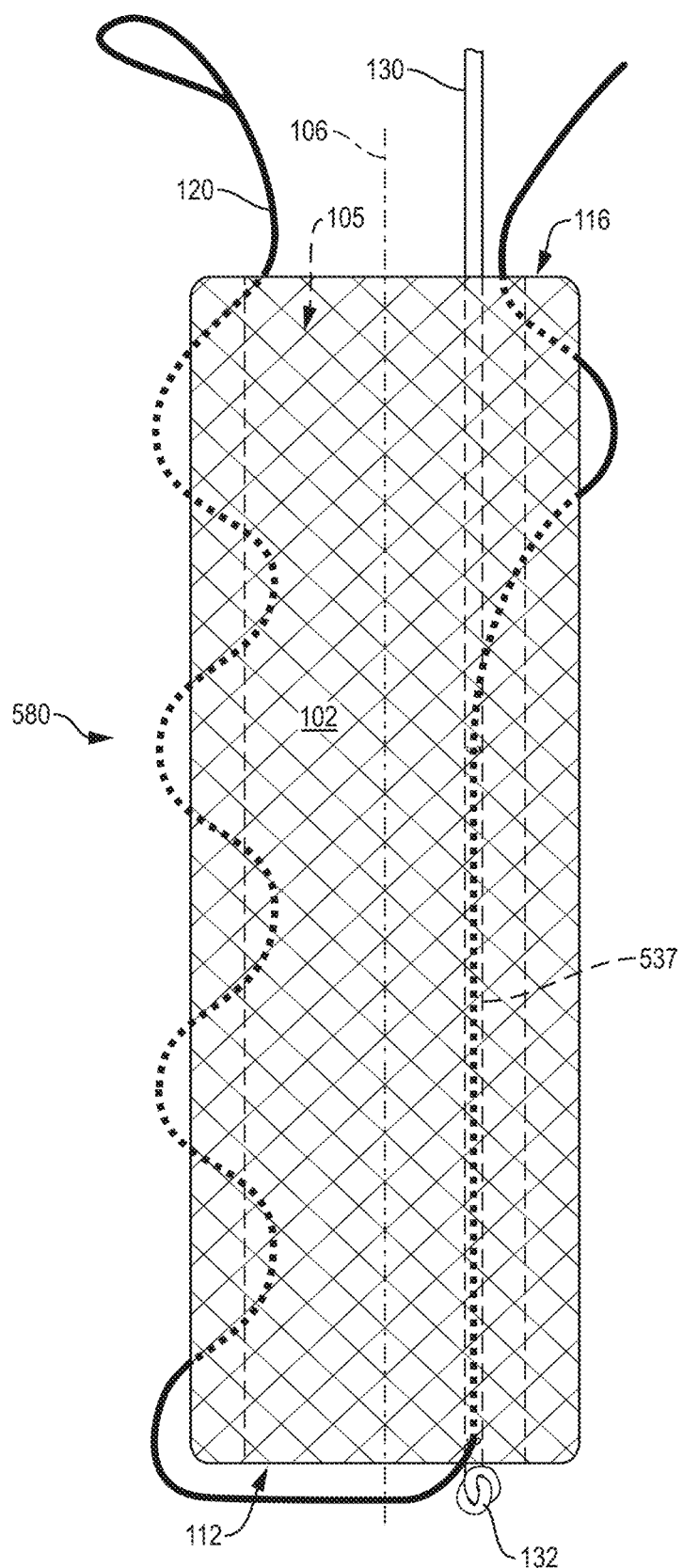

FIG. 5E illustrates another knotlessly locking soft anchor construct 580 in its pre-deployed form. Construct 580 includes a locking passage 537 that extends along lumen 105, locking passage 537 shorter than a maximum axial length of anchor 102. Locking passage 537 may be disposed towards a distal end 112 of anchor 102, to maintain it distally and limit it from protruding from anchor proximal end 116 after anchor deployment. Furthermore, to maintain position of the locking passage 537, it extends directly from a knot 132 and suture 120 may extend from locking passage 537 and directly interweaves through a proximal portion of anchor 102. During deployment limbs of suture 120 and the proximally extending limb of suture 130 are tensioned. After deployment, suture 120 acts as a transfer suture in a similar manner to described herein, drawing the repair suture 130 though the anchor, repeatedly interweaving through the anchor wall on a first side of longitudinal axis 106, into locking passage 537 and then interweaving again through the anchor wall on the opposing side of the longitudinal axis.

Figure 6A:
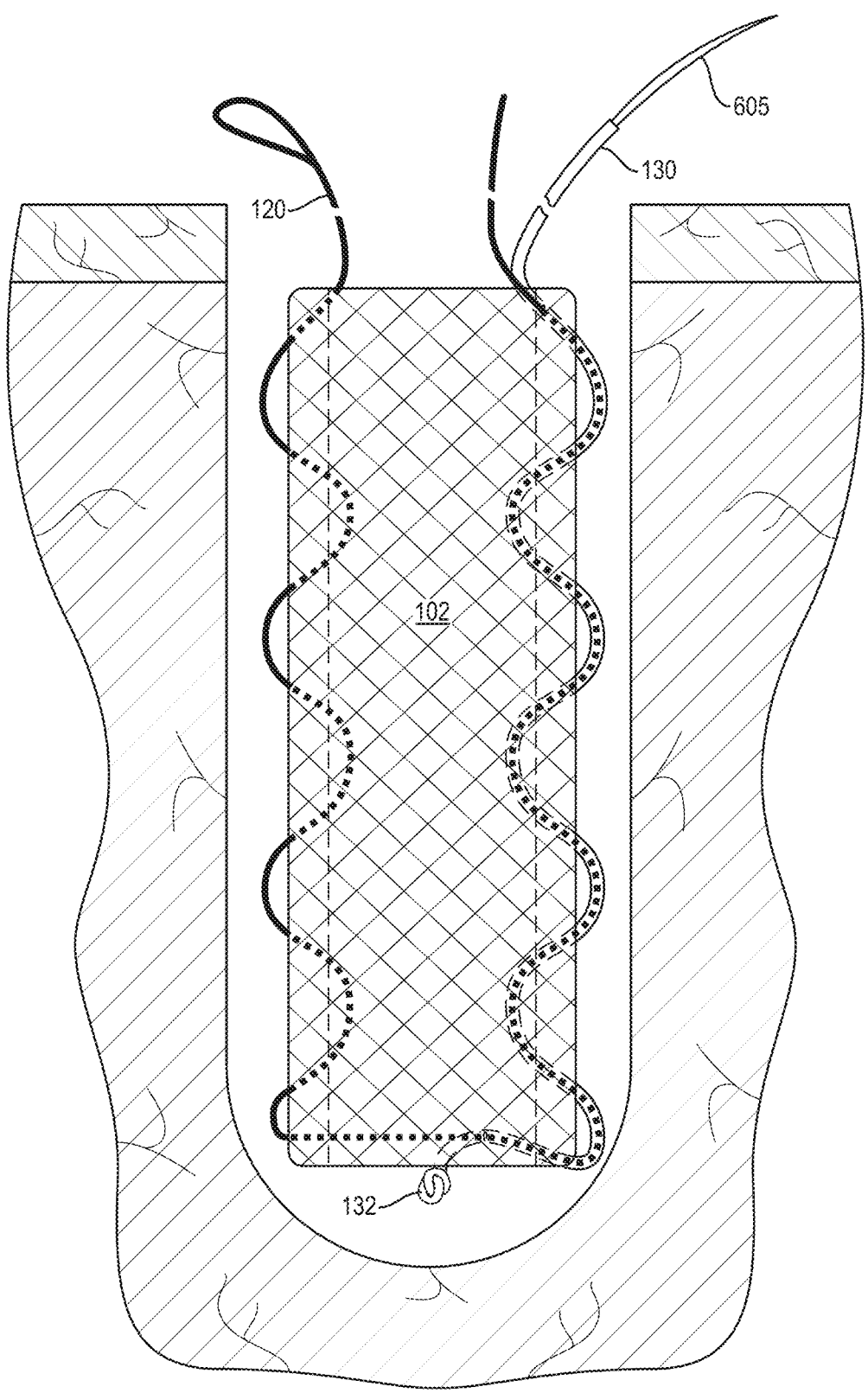
FIG. 6A illustrates a knotless construct with needles, inserted into a bone, in accordance with this disclosure.

FIG. 6A illustrates an example knotless construct inserted into bone. In this example, the repair suture 130 may include a needle 605 pre-attached to end 136. Any of the knotless constructs disclosed herein may include at least one suture with a needle pre-attached, including constructs 100, 200, 300, 500, 520, 540, 560 and 580. Construct 300 is shown in FIG. 6A with needle 605 pre-attached. This allows the surgeon to couple the repair tissue to the repair suture 130, without the step of attaching a needle during the procedure. Repair suture 130 may extend along an open slot along an instrument shaft 642, as needle 605 may generally be too large to fit down a shaft bore. Needle 605 may be housed within a handle of the insertion instrument 650 as shown in FIGS. 6B and 6C.

In some embodiments, the repair suture 130 may be operatively free of the instrument deployment mechanism, such that the deploying suture 120 only is tensioned to deploy anchor 102. In other embodiments a third suture may be operatively coupled to anchor 102 to bolster deployment and then after the anchor 102 is deployed to the target high force load, the third suture may be removed.

Figure 6B:
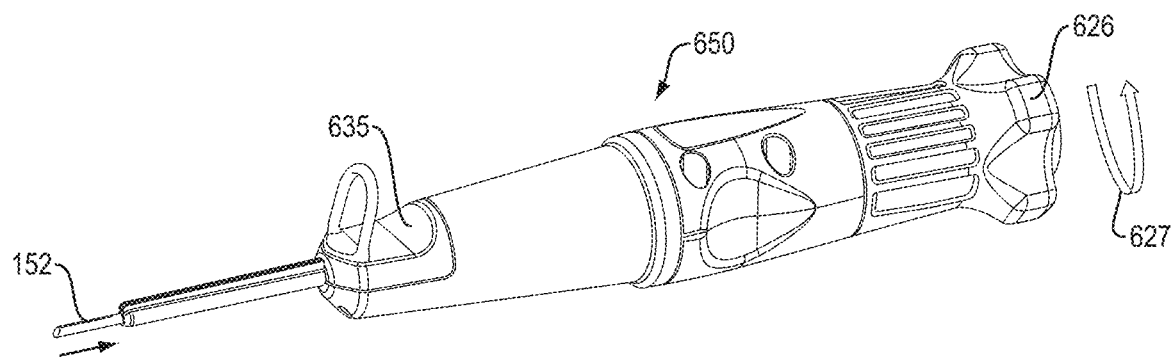
FIGS. 6B and 6C illustrates various views of an insertion instrument for inserting a knotless construct, in accordance with this disclosure.
Figure 6C:
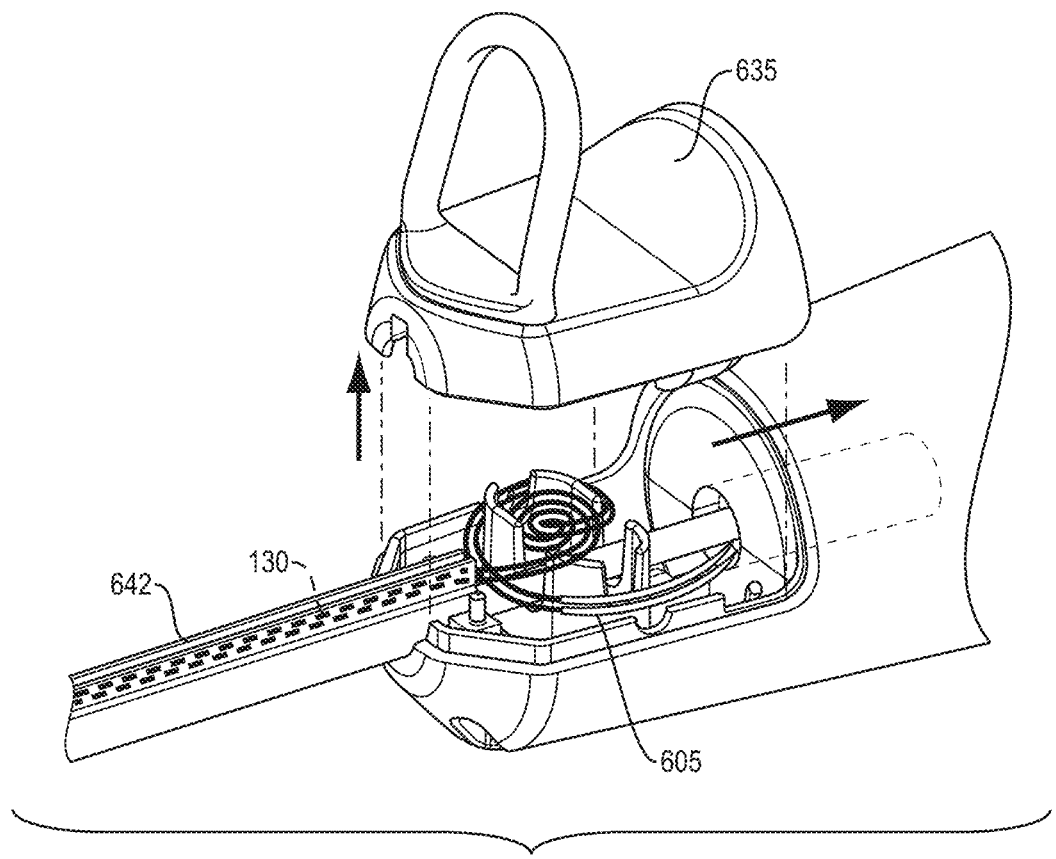

Shown in FIG. 6B, deployment of anchor 102 via actuation knob 626 may simultaneously tension ends of any suture operatively coupled thereto and also release a housing cover 635. Instrument 650 and system may operate similarly to system disclosed in Patent application number PCT/US21/34590, titled "Tissue Repair System", filed May 27, 2021, this patent application commonly owned and herein incorporated by reference in its entirety. In other embodiments, the repair suture 130 may be routed along the instrument 650, operatively coupled to the deployment actuation mechanism at a first location. Repair suture 130 may be pre-attached to needle 605 at a second location spaced away from the first location. For example, the second location may be at a terminal end of repair suture second end 136, and the first location may be spaced between the anchor 102 and second location.

A method of use may therefore include inserting the knotless construct (100, 200, 300, 500, 520, 540, 560 and 580) into a target tissue with instrument 650 and actuating the knob 626 to deploy the anchor 102. Actuating the knob 626 may apply a tension to at least a first suture 120 of the knotless construct (100, 200, 300, 500, 520, 540, 560 and 580). Actuating the knob 626 may apply a tension to an end of a repair suture 130, at a location along the repair suture 130 spaced away from a pre-attached needle. Actuating (627) the knob 626 may release or unlock a housing cover 635 of the instrument 650 to expose the pre-attached needle 605. Once the anchor 102 is deployed within the target tissue, the repair suture 130 and pre-attached needle 605 may be removed from the instrument 650. Using the needle 605, the repair suture 130 may be coupled to a repair tissue 150. The first suture 120 may also be removed from the instrument 650. After the repair suture 130 has been coupled to the repair tissue 150, the needle 605 may be removed, and the repair suture end 136 coupled to a first end of the first suture 120. Drawing on a second end of the suture 120 may then slide the suture 130 through deployed anchor 102', while removing the suture 120 from the deployed anchor 102'. This may place the repair suture 130 along a tortuous path through the anchor 102', as disclosed herein that may form a knotlessly locking configuration.

Snaring/Transfer Loop Embodiments

Figure 7B:
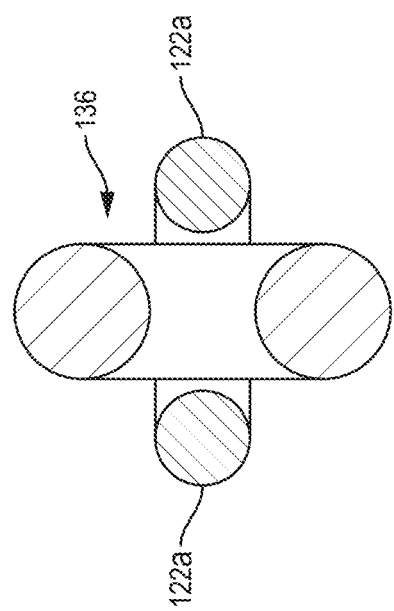
FIG. 7B illustrates a cross section of the suture loop snare in FIG. 7A.
Figure 7A:
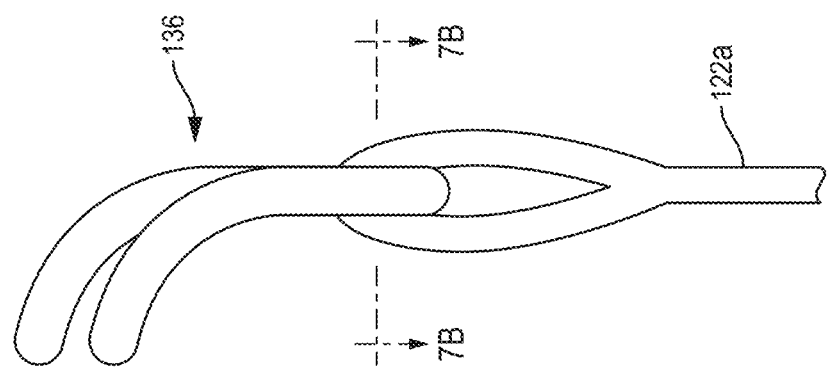
FIG. 7A illustrates a suture loop snare.

The specification now turns to embodiments for coupling the first suture 120 to the second suture 130. FIG. 7A schematically shows a close-up view of a first construct, for snaring two sutures, such as first suture limb 122a with second suture limb 136. This may be called a looped snaring construct. With this construct, when drawing the suture end 136 through the soft anchor 102, between the braids and in at least the example constructs 200, 300 though itself also, considerable pull forces may be required. The second suture 130 has been doubled over the loop 122a, forming a cross section (FIG. 7B) including four (4) suture cross sections. Consider that upon tension to withdraw all these suture cross sections through the knotless locking constructs disclosed herein, the link may include up to four suture cross sections, as depicted in FIG. 7B. Keeping in mind that the knotless locking construct is general minimized in size to reduce the overall profile of the construct, drawing the four cross sections of suture has been found to require relatively high pull forces. The bulk of the four cross sections of suture may also deform or loosen the locking passage (337, 537) frustrating or damaging formation of a strong knotless lock therealong.

Figure 8:
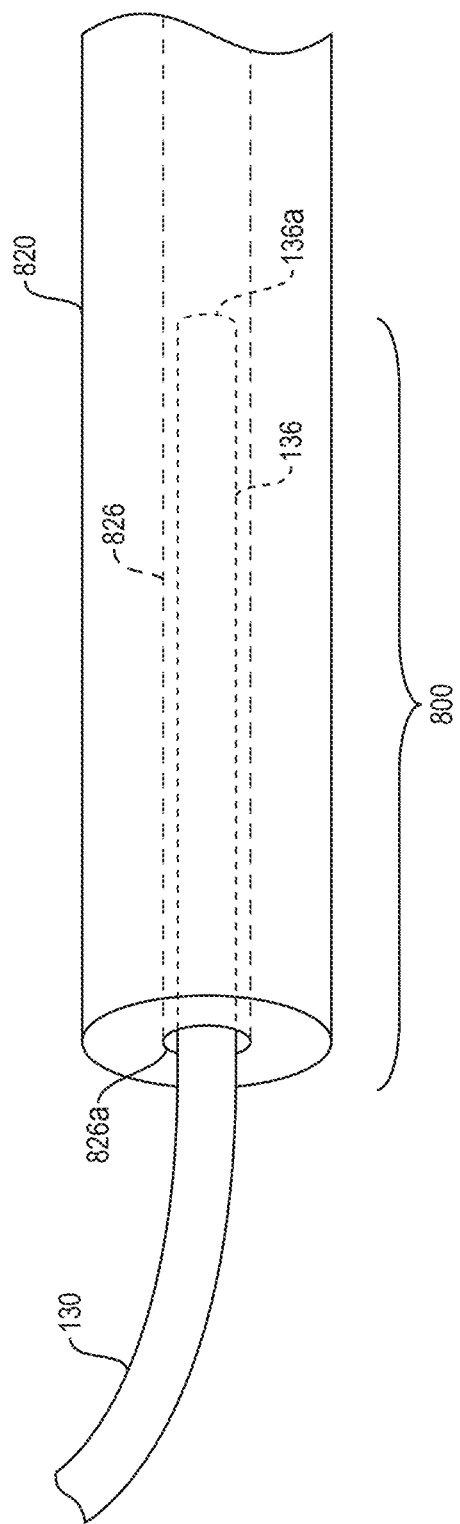
FIG. 8 illustrates a suture snare construct with a reduced profile, in accordance with this disclosure.

A first improved connecting or snaring construct 800 is illustrated in FIGS. 8, in accordance with this disclosure. Coupling construct 800 coaxially couples two suture ends, defining an outer suture 820 and an inner suture that may be repair suture 130. Outer suture 820 may function similarly to suture 120 as disclosed herein, except suture 820 may be absent a looped end (122a) and may include a cannulated portion 826, with an open cannulated end 826a. Like the locking passages disclosed herein, tension on the outer suture 820 may reduce the cannulation 826 opening size and lock the two sutures (820, 130) together. More specifically open cannulated end 826*a* may receive suture end 136 including terminal end 136*a* therein and locking around suture end 136. Thus, compared to the construct shown in FIGS. 7A and 7B, this connecting construct 800 is now achieved with two coaxial lengths of suture (130, 820).

Figure 9A:
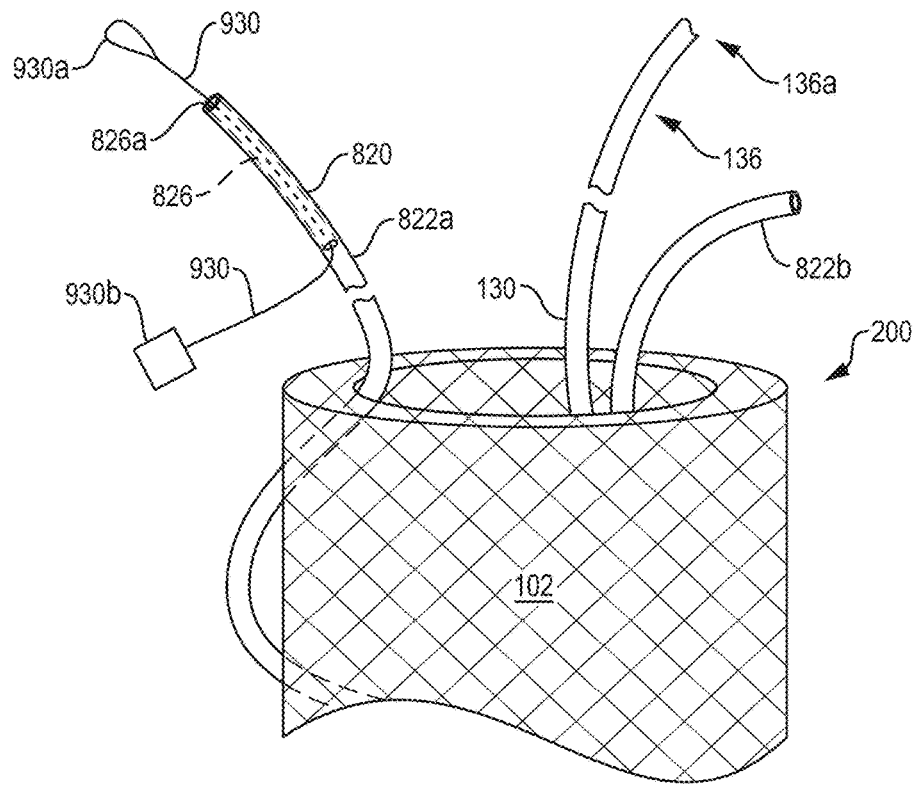
FIGS. 9A-9C illustrate a method of snaring a suture with a suture snare construct 800, in accordance with this disclosure
Figure 9B:
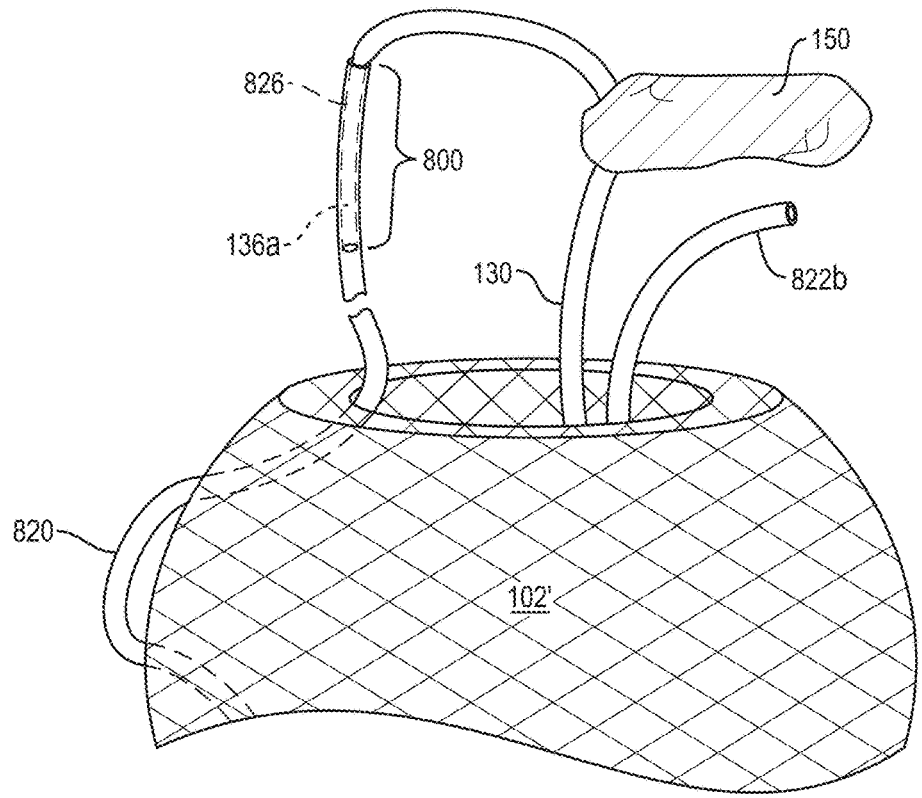
Figure 9C:
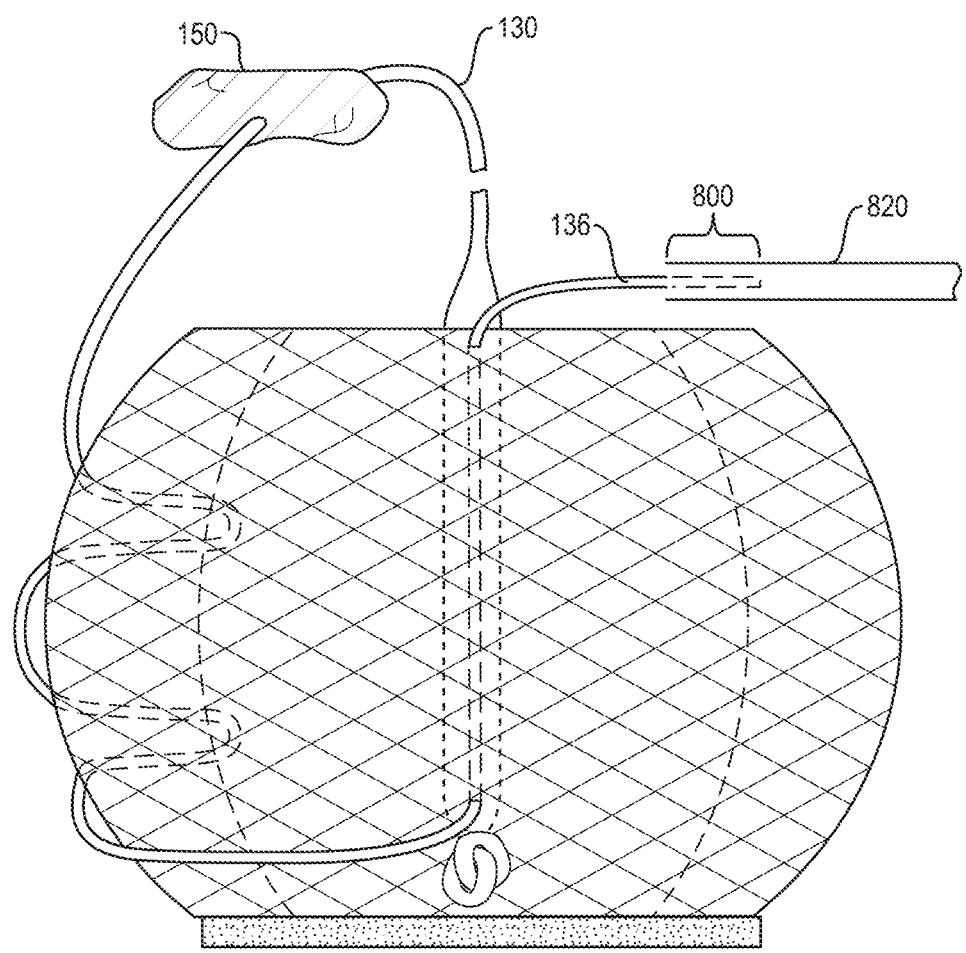

FIG. 9A illustrates a proximal end of a knotless locking soft anchor construct 200 with suture 820 that snaringly couples to repair suture 130 by forming connecting construct 800. A method is depicted in FIGS. 9A-9C. The method and construct 800 and may be employed with any of the knotless locking soft anchor constructs disclosed herein (100, 300 . . . ). The method may include obtaining a knotless construct except that in this embodiment, the first suture 820 is cannulated 826 and absent a looped end (122*a*). First suture 820 may be provided routed through anchor 102 along a similar path to paths disclosed herein. First suture 820 may be provided with a snaring tool 930 extending therealong. Snaring tool 930 may extend from open cannulation end 826*a*. Snaring tool 930 may be assembled to an inserter instrument (not shown). Snaring tool 930 may extend along cannulation 826 for a length that defines a strong enough connecting portion like connecting portion 800, for snaring and drawing a second suture (such as second/repair suture 130) through the knotless construct. In some embodiments, snaring tool 930 may repeatedly weave in and out of cannulation 826, forming several serial connecting portions.

Once anchor 102 is deployed, via tension on at least one end of suture 820 and/or second suture 130, and second suture 130 is coupled to tissue 150, (FIGS. 1D, 2B, 3B) and connecting portion 800 may then be formed (FIG. 9B). Second suture 130 may be snared with looped end 930*a* of snaring tool 930. Drawing on handle end 930*b* of snaring tool 930 may draw second suture 130 through open cannulation end 826*a* and along cannulation 826. In some embodiment, second suture 130 may enter through side walls of the first suture 820, rather than directly into the open cannulation end 826*a*, but this may add bulk to the resulting connecting portion 800 and therefore be less preferable.

Snare loop 930*a* may be deformable or reduced in opening size before drawing the second suture 130 into the cannulation 826. Snare tool 930 may release the terminal end 136*a* of second suture such that the terminal end 136*a* is completely enclosed within the cannulation 826. In other embodiments, the snaring step may be performed outside the body, and so the terminal end 136*a* may be drawn between braids of the first suture walls (820) and out of the first suture 820 to release the snaring loop 930*a* from the terminal end 136*a*, and then the second suture 130 may be slightly withdrawn to return the terminal end 136*a* back inside the cannulation 826. Having the terminal end 136*a* completely enclosed within the cannulation 826 provides a smooth continuous outer surface of connecting portion 800 that is less likely to snag while being drawn through the anchor construct (100, 200, 300). Drawing on first suture end 822*b* may lock the connecting portion 800. Drawing on first suture end 822*b* may draw the second suture 130 along the path defined by first suture 820 to replace first suture 820 and form a knotless locking construct, like those described herein. Once connecting portion 800 has been drawn all the way through anchor construct (100, 200, 300) second suture 130 may be trimmed to remove the connecting portion 800 from the construct (100, 200, 300). FIG. 9C represents the circuit or path of the anchor construct 300 with the connecting portion 800 having drawn the second suture 130 through the deployed anchor 102', before being detached. This connecting portion 800 may be used to snare and draw repair suture through any of the constructs disclosed herein.

The mechanical connection between the first and second suture has a relatively lower profile (cross section) than a doubled over suture and loop. The finger frap mechanism is effectively two cross sections of suture while the doubled over suture loop is effectively four cross sections of suture. The reduced cross section of suture makes pulling the suture for the invention through the implant construct relatively easier. In other embodiments the connecting portion could be reversed, such that the first suture extends into and along a cannulation of the second suture.

Returning to constructs that include looped ends, FIG. 10A illustrates a prior art suture snare construct 1100 that may be provided threaded through a representative surgical device opening 1111, such as between braided walls of an anchor 102, and/or through a cannulation 137 as disclosed herein. Surgical device 1110 is shown in representative or simplified form, including a representative opening only with other features or portions of the device omitted for simplification of understanding. Prior art suture construct 1100 may include at least one loop 1105 (that may be looped end 122*a*), formed by looping suture end around and tying a knot 1106. Knot 106 may be known in the art and may be a sliding or non-sliding knot, therefore providing either a corresponding adjustable or static loop. Knot 1106 inherently locally increases the construct cross section, indicated as cross section D2. In addition, while a single length of suture may have a cross section D3, when the loop 1105 is collapsed to transfer it through the opening 1111, it may inherently double in cross section, as explained herein with respect to FIGS. 7A and 7B. Consider now circumstances where suture construct 1100 including loop 1105 and knot 1106 are drawn through an opening 1111 of device 1110, opening 1111 having an opening size D1. This occurs while drawing the looped end 122*a* through the deployed anchor 102' and cannulation 137 in the knotless soft anchor constructs disclosed herein. While opening 1111 may readily slidingly receive suture construct length portion limited to a single cross section D3 only, with little to no resistance, suture end 1108 may require a supplemental pull force (F) from the user to draw the knot 1106 and loop 1105 therethrough. As surgical devices evolve to include smaller profiles with smaller opening sizes (D1), maintaining acceptable limits of this supplemental pull force may become challenging. Too high a pull force may damage the construct 1100, the local tissues or device 1110. Too high a pull force may become uncomfortable in the user's hand. It may also tear a glove, causing issues with sterilization of the field. Too high a pull force may require a tool to impart this force, with additional costs or tool processing.

FIG. 10B illustrates another prior art suture snare loop construct 1120 that may be provided, the suture threaded through a representative surgical device opening 1111. Again, surgical device 1110 shown is a representative or simplified form, including an opening only with other features omitted for simplification of understanding. Suture construct 1120 may include a hollow passage, cannulation or lumen or an anchor or suture and may have a cross section D4. Suture construct 1120 may include at least one loop 1125, formed by looping suture end 1126 around and extending a portion of the suture end 1126 into and along the hollow lumen, forming a splice 1150. Splice 1150 inherently locally dilates the construct cross section, dilating the cross section from cross section D4 as provided to cross section D5. In addition, while a single length of suture may have a cross section D4, collapsing of loop 1125 to pass it through opening 1111 may inherently double this cross section, similar to loop 1105. Returning to example circumstances where suture construct 1120 including loop 1125 and splice 1150 are drawn through an opening 1111 of device 1110, opening 1111 having an opening size D1. While opening 1111 may readily slidingly receive suture construct length portion limited to a single cross section D4 only, with little to no resistance, suture end 1128 may require a supplemental pull force (F) from the user to draw the dilated area including splice 1150 with a cross section D5 and loop 1125 therethrough. Similar to the previous prior art device disclosed, these increased pull forces may cause similar problems in use, as listed above.

While the splice 1150 may define a smoother or tapered transition in cross section relative to a knot 1106, inventors have found that this transition in cross section (D4 to D5) still presents a challenging force for working openings. This transition defines a discontinuity or bulge that may demand unacceptable increases in pull forces in some surgical devices. More specifically inventors have found that the initial introduction of the discontinuity or bulge into the aperture 1111 requires the highest pull force and that once within the opening entrance (assuming opening 1111 has a constant opening size therealong) the pull force may be high, but less than during the initial introduction. Reducing suture sizes, in other words cross sections (D3, D4) to address these shortcomings may cause other issues. For example, smaller cross sections may be more uncomfortable in the user's hand upon pulling, may tear through repair tissues, or may break under operating loads. During operation of the knotless soft anchor constructs, high loads may be preferable to deploy the soft anchors and gain a strong fixation with the bone tissue. These higher loads may require larger cross section sutures.

Figure 11A:
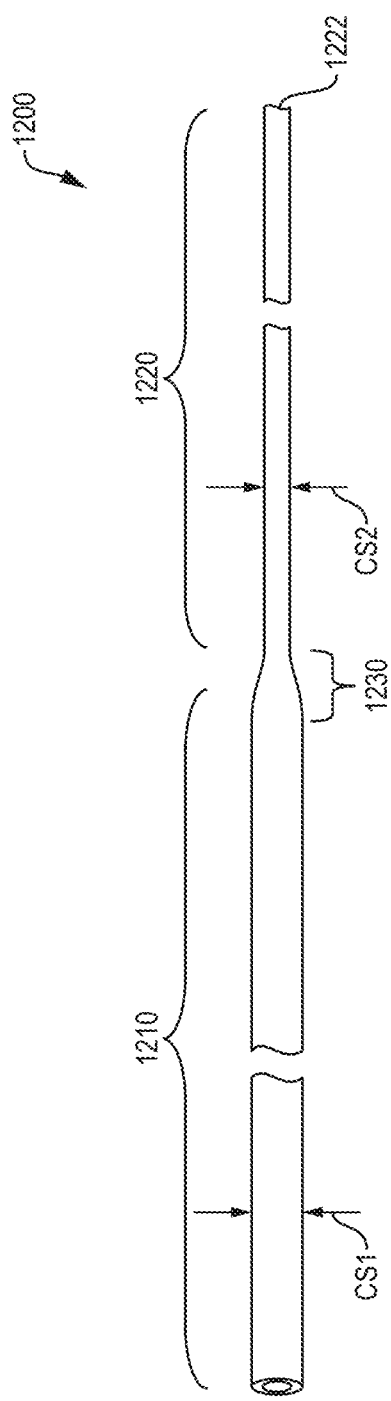
Figure 11B:
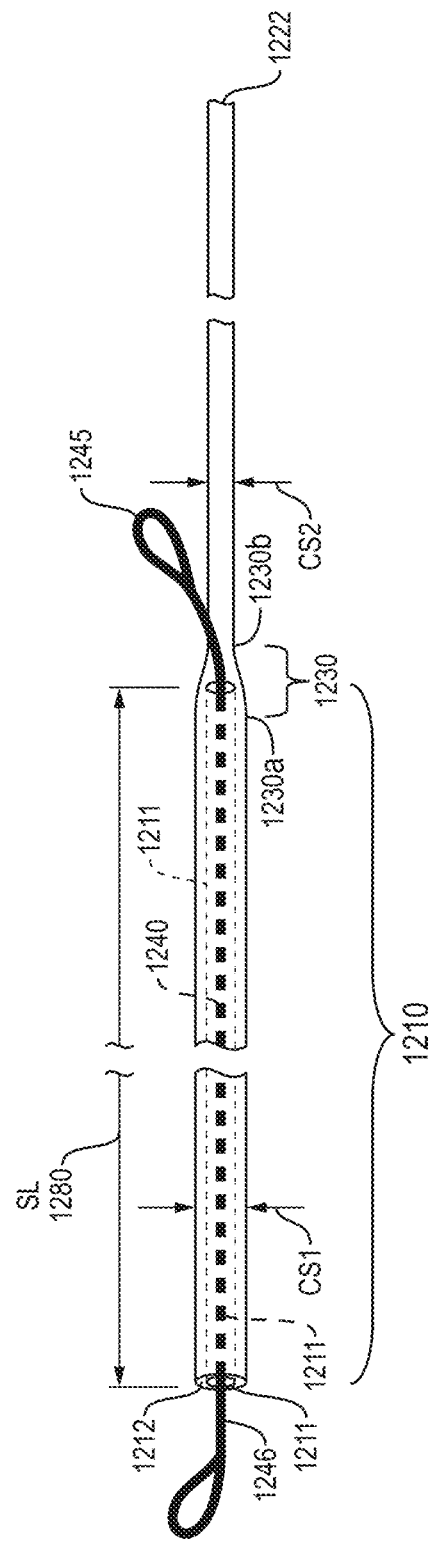

An embodiment of a transferring member construct 1200 that addresses these shortcomings of construct 1100 and 1120 is illustrated in FIG. 11A-11C, illustrated by way of showing construction thereof. Construct 1200 may begin with a length of suture, defining a braided body that may be include two length portions 1210 and 1220 that may be different from each other. First length portion 1210 may be cannulated (hollow lumen or longitudinal passage) and may define a first cross section CS1 substantially therealong. First length portion 1210 may be formed with a first number of braided strands, that may be between 8-32 braided strands. Second length portion 1220 may be smaller in cross section (CS2) substantially therealong and may include strands braided through its core and therefore may not have a longitudinal passage therealong. Second length portion 1220 may be formed with a second number of braided strands, that may be between 8-32. First length portion 1210 may have a greater number of braided strands than the second length portion 1220. In some embodiments, first length portion 1210 may include 16 strands and second length portion 1220 may include 8 strands. First cross section CS1 may be larger than second cross section CS2. First length portion 1210 may be similar to size #2 suture, while second length portion 1220 may be similar to size 2.0 suture. A transition portion 1230 between the first and second length portions (1210, 1220) may be tapered, having a transition portion first end 1230a extending directly from first length portion 1210 and a transition portion second end 1230b extending directly from second length portion 1220. First and second length portions may share the same braids such that some braided strands are in both portions and are continuously braided between the two portions.

Shown in FIG. 11B, construction of the loop (such as looped end 122a) may employ a snare 1240 that is threaded into the longitudinal passage 1211 along the longitudinal passage and may also extend along the transition length 1230. Snare 1240 may be a thin flexible nitinol wire with a loop 1245 at a working end thereof. Snare 1240 is configured to operatively couple to second length portion 1220 and draw end 1222 of second length portion 1220 into and along the longitudinal passage 1211. Snare 1240 may include a snaring loop 1245 at one end and a snare second end 1246 may extend directly from an open passage end 1212 of the longitudinal passage 1211. Other means of construction may include pushing second length portion 1220 along a path as shown by snare 1240.

Snare 1240 is used to form a spliced loop 1270 (FIG. 11C), such that the splice portion 1280 extends along the first length portion 1210 defining a loop 1270 for coupling to a repair suture (130), and a splice 1280 having a splice working length hereinafter "SL". SL is a predetermined length that is defined by the surgical device and its working openings through which the transferring member construct 1200 is extended through. SL may be an entire length of the first length portion 1210 (as shown) extending from the transition portion 1230 to the open lumen end 1212 of the second length portion. In this example the first length portion 1210 therefore is the predetermined length defined by the surgical device and its working openings through which the transferring member construct 1200 is extended through. In other examples (shown hereinafter) the second length portion end 1222 may terminate within the first length portion longitudinal passage axially spaced from end 1212. In other words, SL may be axially shorter than first length portion axial length, but still have the predetermined length as discussed herein.

Construct 1200 is configured to avoid a challenging increase in force that may be experienced when transferring a transferring construct with a loop through working opening(s) (as defined herein). Avoiding this force increase is achieved via a plurality of features, that individually may contribute a portion towards reducing or mitigating this higher transfer force. For example, the splice 1280 is formed with the reduced cross section (CS2) of the second length portion 1220 coaxially disposed within the longitudinally passage of the first length portion 1210, such that dilation or bulging of the splice 1280 is limited. Preferably no part of the first length portion 1210 extends along itself along the longitudinal passage 1211. Secondly, splice loop 1270 preferably includes the second length portion 1220 only, smaller in diameter than first length portion 1210. This reduces the resulting collapsed cross section of the loop 1270 as it is drawn through any working opening(s). More specifically, snare 1240 (and thereby second length portion 1220) may preferably extend between the braided strands at a location 1271 directly adjacent to transition portion 1230. Preferably, snare 1240 and thereby second length portion 1220 may extend between the braided strands at a location 1271 closer to the second end 1230b of the transition length 1230 than the first end 1230a. This may avoid or reduce any bulges in the cross section along the transition portion 1230. This forms a splice loop 1270 formed entirely from the second length portion 1220, which is smaller in cross section CS2 than the corresponding first length portion cross section CS1. In some embodiments, SL may include a substantial portion or all the transition portion 1230. In some embodiments, SL may include all the transition length 1230 and may extend between the braided strands slightly spaced along the second length portion 1220 to ensure the loop 1270 is formed entirely from the second length portion 1220.

Furthermore, the spliced working length SL is configured to be sufficiently long relative to the path through any working openings of the surgical device such that no splice end 1282 is introduced or drawn into any entrances of any working openings during operation of the surgical device. An example of this is illustrated in FIG. 11D, where the splice length is assembled to an example surgical device 1110, surgical device 1110 having an opening 1111, as relied upon in previous figures. As assembled, opening 1111 is axially closer along the construct 1200 to loop 1270 than end 1282 of splice 1280. Upon application of a force to pull loop 1270 into opening 1111, no bulge or discontinuity associated with the splice end 1282 is introduced into opening 1111. Since introduction or entrance of any suture cross section discontinuity associated with the splice has been found to require the highest load, splice length SL need only be slightly longer than distance 1290. Stated in another way, at least a portion of the splice 1280 is preferably disposed within all working opening(s) as defined herein of the surgical device.

Turning now to the other end, splice length SL may extend all the way along the entire first length portion 1210. In other embodiments (shown later) snare end 1246 may extend between braided strands at a location axially spaced both from transition portion 1230 and also axially spaced from end 1212. Splice length SL may therefore be an axial segment of the first length portion 1210. The end edge 1222 of second length portion 1220 preferably remains entirely enclosed within the longitudinal passage 1211 of the first length portion 1210.

In some embodiment, transferring member construct 1200 forms a static loop 1270 in that it is fixed in perimeter length under normal loads of operation. Splice 1280 may have a length that is sufficiently long to frictionally resist sliding thereof to resist change in size of the loop 1270 under normal loads of operation.

Figure 12A:
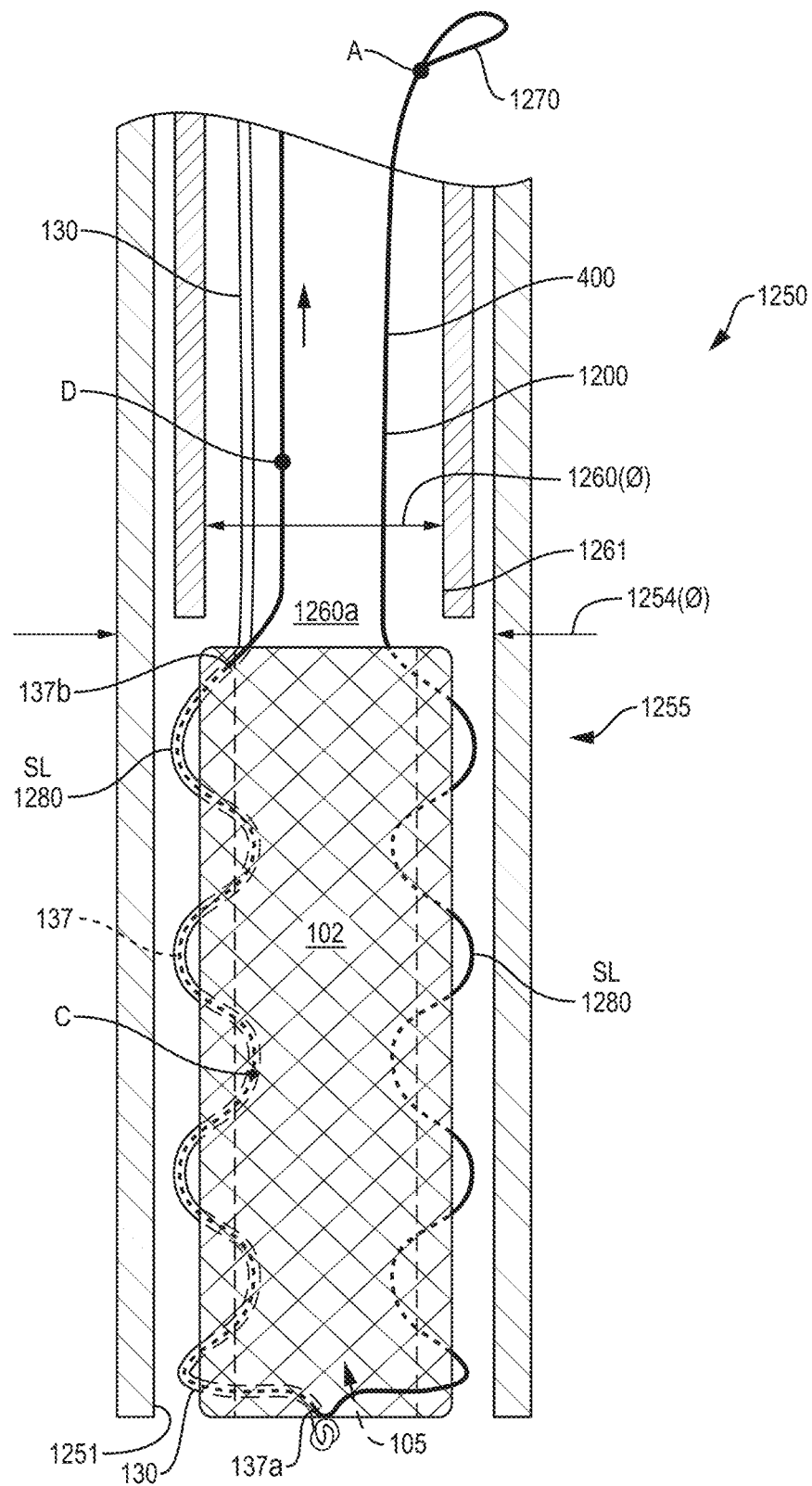
FIG. 12A illustrates the transferring member construct assembled to an example knotless soft anchor construct within a distal end of an insertion instrument, in accordance with this disclosure.
Figure 12B:
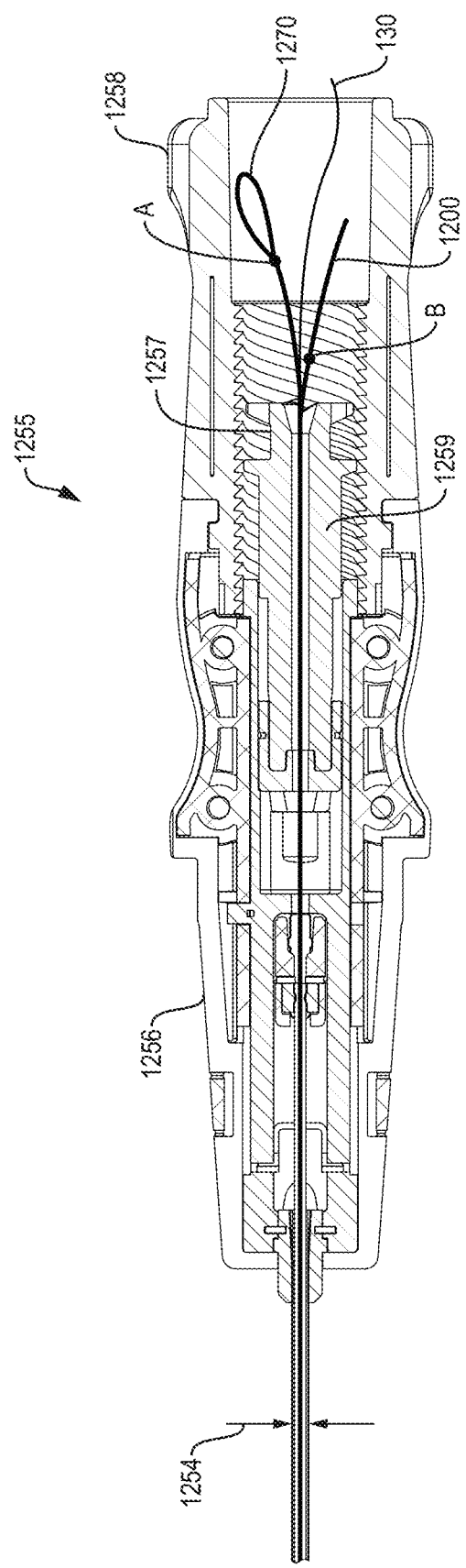
FIG. 12B illustrates the transferring member construct and repair suture of an example knotless soft anchor construct assembled within a proximal end of an insertion instrument, in accordance with this disclosure.

An example system that may include transferring member construct 1200 is shown in FIG. 12A and FIG. 12B, which shows a tissue repair system 1250 with a plurality of example working openings. Tissue repair system 1250 may include a knotlessly locking soft anchor construct similar to construct 300, although this is an example construct and any of the constructs disclosed herein may benefit from the splice loop transferring construct 1200 using a similar philosophy. System 1250 may include insertion instrument 1255 for inserting a tissue anchor 102 into a target bone. Tissue anchor 102 may include a repair suture 130 that includes a cannulation 137 and a deploying/transfer suture construct 1200 that extends through the anchor 102 and cannulation 137.

Insertion instrument 1255 may define at least one shaft having an elongate bore 1260 therealong that may define a first working opening as defined herein. Tissue anchor 102 may define a tubular shaped body that may include a lumen 105 that may define a second working opening as defined herein. In this example construct 1200 may be repeatedly interwoven between braids 110 of a braided wall of anchor 102, the gaps between the braids therefore may also define working openings of the system. Furthermore, repair suture 130 may define a braided body with a cannulation 137 and transferring construct 1200 may extend into and along the repair suture 130 cannulation, for a knotless locking repair, the cannulation also potentially defining a working opening.

Turning briefly now to the plurality of working openings listed in this example, it is important to distinguish between all openings of the system that the construct 1200 may slide through versus working openings. In operation, some openings (tunnels, bores, apertures) of the system 1250 may slidingly receive the suture construct 1200 including the loop 1270 therethrough and may be sized to present minimal to no resistance to a discontinuity or bulge portion thereof. For example, bore 1254 may be an opening as described, and may therefore not be a working opening as defined herein. Furthermore, openings as formed may not define working openings, but may become working openings in operation or as an assembly. For example, inner bore 1260 may also house repair suture 130, reducing the available opening size which may adjust the bore 1260 to a working opening while the repair suture 130 is also disposed therealong. Furthermore, openings may change to become working openings during operation of the system 1250. For example, when soft anchor 102 is in a first configuration, that may be the elongate configuration as shown in FIG. 3A, the gaps between the braids 110 may be loose or large enough to provide little to no resistance to a bulge formed by a splice 1280 and splice loop 1270; however, upon deployment of anchor, the deployed anchor 102' may change configuration and bunch up and anchor braids 110 may change in orientation, defining a smaller tighter opening and therefore become a working opening as defined herein.

Turning now to FIGS. 12A and 12B, transfer construct 1200 may extend through anchor 102 (FIG. 12A), along bore 1260 (FIG. 12A) through handle 1256 (FIG. 12B) and may be wrapped around hub 1257 (FIG. 12B). FIG. 12B is a cross section of the handle end of an insertion instrument 1255 that may have an internally threaded shaft tensioning mechanism. A rotatable knob 1258 is mounted on the back or proximal end of the handle 1256. A threaded block 1259 may be mounted axially along the handle 1256 and is threadingly coupled to a cavity within knob 1258. The knob 1258 includes internal female threads for receiving the threaded block 1259. Shown here, the suture construct 1200 and repair suture 130 extend proximally from hub 1257, however as obtained, repair suture 130 and construct 1200 (or any other deploying member 120) may extend along bore 1260 and be wrapped around hub 1257. Rotation of knob 1258 therefore retracts block 1259 and applies tension on suture construct 1200, and second suture 130 to deploy the anchor 102.

During the procedure, after anchor deployment, the repair suture 130 may be disconnected from hub 1257 and coupled to a tissue 150 (FIG. 3B) and then drawn through itself using transferring construct 1200. This may include first deploying the anchor 102 within a target tissue with the insertion instrument 1255 before withdrawing the repair suture 130 and construct 1200 including loop 1270 through inner bore 1260 and out of distal opening 1251. If shaft bore 1260 defines a working opening, (either with or without repair suture present) it may be preferable that the splice length (SL) have a length that extends from splice loop (point A) along construct 1200 along the shaft bore 1260, along and through the anchor 102, including through cannulation 137 and back through to bore 1260, such that splice end 1222 is at least at point B. This defines a splice working length SL that avoids drawing the splice end 1222 into an entrance 1260 of bore 1260.

Continuing on with another example, repair suture 130 may define at least one cannulation 137 that defines a locking passage, for a knotless locking repair. Cannulation 137 may include an entrance 137b, defined by the end that the loop 1270 enters during operation of the system 1250, or more specifically while drawing the repair suture 130 through the cannulation 137. In some example systems, bore 1260 may not be a working opening, and therefore splice working length SL may extend along the cannulation 137 and at least beyond entrance 137b. In this example SL preferably extends from point A (FIG. 12B) to at least point C (FIG. 12A). Of note, a splice length SL up to point D would also work in this example.

In some tissue repair systems, the transferring member construct 1200 may extend between braided strands 110 of a tissue anchor. For example, as shown in FIG. 12A, transferring member construct 1200 may interweave between the braided strands of anchor 102, along the anchor side, and the openings between the braided strands 110 may define working openings.

There may be another advantage to the splice length extending all the way through the anchor system and up to point B. The inventors have also found that forming a splice along a suture advantageously may increase an ultimate tensile strength of the suture, without increasing a suture diameter, if the two differing diameters (or equivalent) are employed. Because the second length portion 1220 is smaller in diameter (or equivalent), the splice may not dilate the OD of the first length portion 1210 significantly. For a system where the transferring member construct 1200 is also a deploying member, this may allow higher tension loads to be placed on the deploying member and therefore a deployed soft anchor 102' may have a stronger pull-out force. For example, anchoring of soft anchor 102 relies upon applying some tension to deploying members that are threaded through and along the anchor 102. These deploying members act somewhat like a drawstring and in combination with the back stop 1261, tensioning these deploying members bunches the anchor 102 up into an expanded deployed state. The higher the tension on the deploying members, the tighter the bunched up deployed state the anchor is, that can correlate with stronger anchoring within the target tissue (higher pull-out force). This tension may be limited by an ultimate tensile strength of the deploying members, the flexible members limited in size to fit through the anchor and device. In this system, transferring member construct 1200 may also act as the tensioning or deploying members. The inventors have found that the splice may increase the ultimate tensile strength of the suture, such that provided the splice extends along the entire length that tension is applied, then increased tension may be applied to deploy the anchor 102 without breaking the deploying member/transferring member construct 1200. Therefore, the anchor 102 may be more strongly anchored within the target tissue. In the example system, assuming tension is actuated at or adjacent points A and B along the construct, when the suture construct 1200 is wrapped around hub 1257, the splice length SL preferably extends continuously with no interruption from point A through the anchor and to point B.

A method of tissue repair may therefore include obtaining system 1250, with a transferring member construct 1200 having a splice 1280 with a splice working length SL that extends through all of the working opening(s) as defined herein. Anchor 102 may be inserted into a first tissue, that may be bone. Tension on ends of construct 1200 in a proximal direction may deploy anchor 102 within first tissue. Tension may be applied along an uninterrupted length of the spliced working length SL so that greater tension may be applied, which in combination with back stop 1261 may increase a pull-out strength of deployed anchor 102'. For example, tension up to 200N may be applied. Tension may also be applied to repair suture 130 concomitantly, to deploy anchor 102 within first tissue. Repair suture 130 and construct 1200 may then be removed from anchor insertion instrument, including drawing the loop 1270 distally through a bore 1260 of instrument. Bore 1260 may define a working opening, and splice length SL may be disposed along bore 1260 as obtained. Splice 1280 may extend along bore 1260 twice, extending towards and through anchor 102, and also extending proximally back along bore 1260.

With the instrument removed, repair suture end 130 may then be operatively coupled to a repair tissue 150 and then through spliced loop 1270. Loop 1270 coupled to end 136 may then be drawn through deployed anchor 102' and at least one cannulation 137 of repair suture 130. Deployed anchor 102' may include a working opening. Splice 1280, as obtained may extend through cannulation 137, as obtained. Splice length SL is sufficiently long such that while drawing the loop 1270 though the working openings, the splice 1280 is not introduced into any working opening, as defined. Splice length SL is sufficiently long such that while drawing loop 1270 through the repair suture cannulation 137, the splice 1280 is moved from a first position wherein the splice 1280 is coaxially disposed within cannulation 137 to a second position wherein the splice 1280 is removed from the cannulation and therefore while drawing the repair suture 130 through itself the splice in not firstly introduced therein. In some embodiments, SL preferably extends through all repair suture cannulations 137, in their entirety as obtained.

Splice length SL is a function of the surgical device through which the splice 1280 is passed during operation thereof. For an arthroscopic device that may place anchor such as anchor 102 within a bone in a shoulder for example, inserter instruments 1255 may be between 5 and 10 inches long and the splice 1280 may be at least 10 inches long so as to extend along the inserter shaft bore 1260 and through the anchor 102 and cannulation 137. Splice 1280 may be closer to 20 inches long; sufficiently long to extend along the shaft bore twice, such that both ends of the splice are at a proximal end of the inserter instrument.

Figure 13:
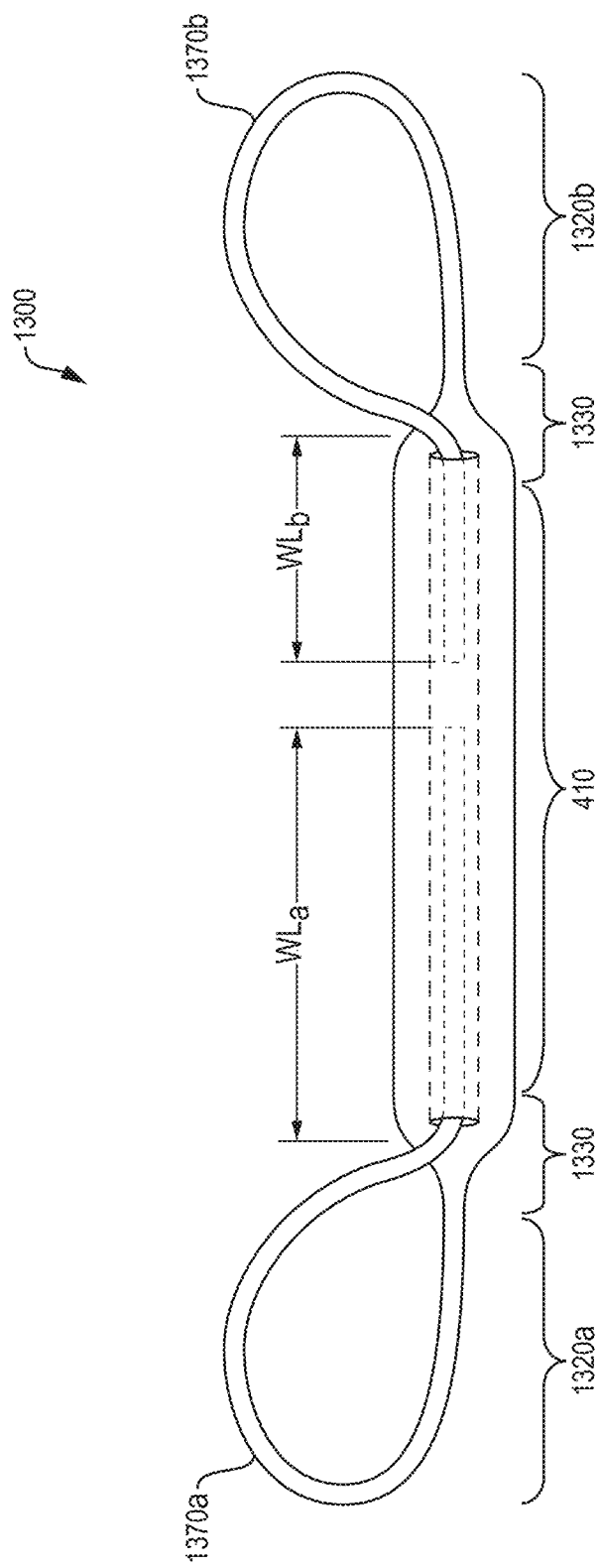
FIG. 13 illustrates a transferring member construct with two looped ends, in accordance with this disclosure.

FIG. 13 illustrates another suture construct 1300, including a first length portion 1310, similar to portion 1210. Suture construct 1200 includes two splice loops 1370a, 1370b, formed from second length portions 1320a, 1320b, which may be similar to second length portion 1220. In short, construct 1300 is similar to construct 1200, with a second similar or mirror image splice loop at the opposing end of construct. Construct 1300 includes a first splice 1380a, 1380b, which have corresponding splice working lengths WLa and WLb. Each working length may be the same as each other or differing lengths. Returning to the example system 1250, loop 1370a may be configured to couple to a repair suture 130 and draw repair suture 130 though a cannulation 137, and therefore first spliced working length WLa may be sufficiently long to extend, as assembled, through all entrances to all working openings as defined herein. First spliced working length WLa may have a length similar to spliced working length SL of construct 1200. Second spliced working length WLb may be configured to be drawn through shaft bore 1260 only and therefore may have a length, shorter than first length WLa and sufficiently long to extend, as obtained, through and through bore 1260.

Having two loops 1370a, 1370b may cause confusion during operation of a system similar to 300. Distinguishing the loops from each other may be important to ensure that repair suture 130 is drawn through the anchor 102 in a target direction. Each loop 1370a, 1370b may therefore have differing markings or color indicators thereon. In some example embodiments transfer loop 1370a, configured to couple to and draw the repair suture end 130 into the anchor and cannulation 137 may have the same markings, indicators and/or colors as the markings, indicators or colors along repair suture 130. In some embodiments loop 1370b may be operatively coupled to a tensioning handle or tool (not shown) to help draw the construct 1200 through the system. Tensioning handle may include markings, indicators and/or colors that correspond to markings, indicators and/or colors of the second loop 1370*b*.

Figure 14:
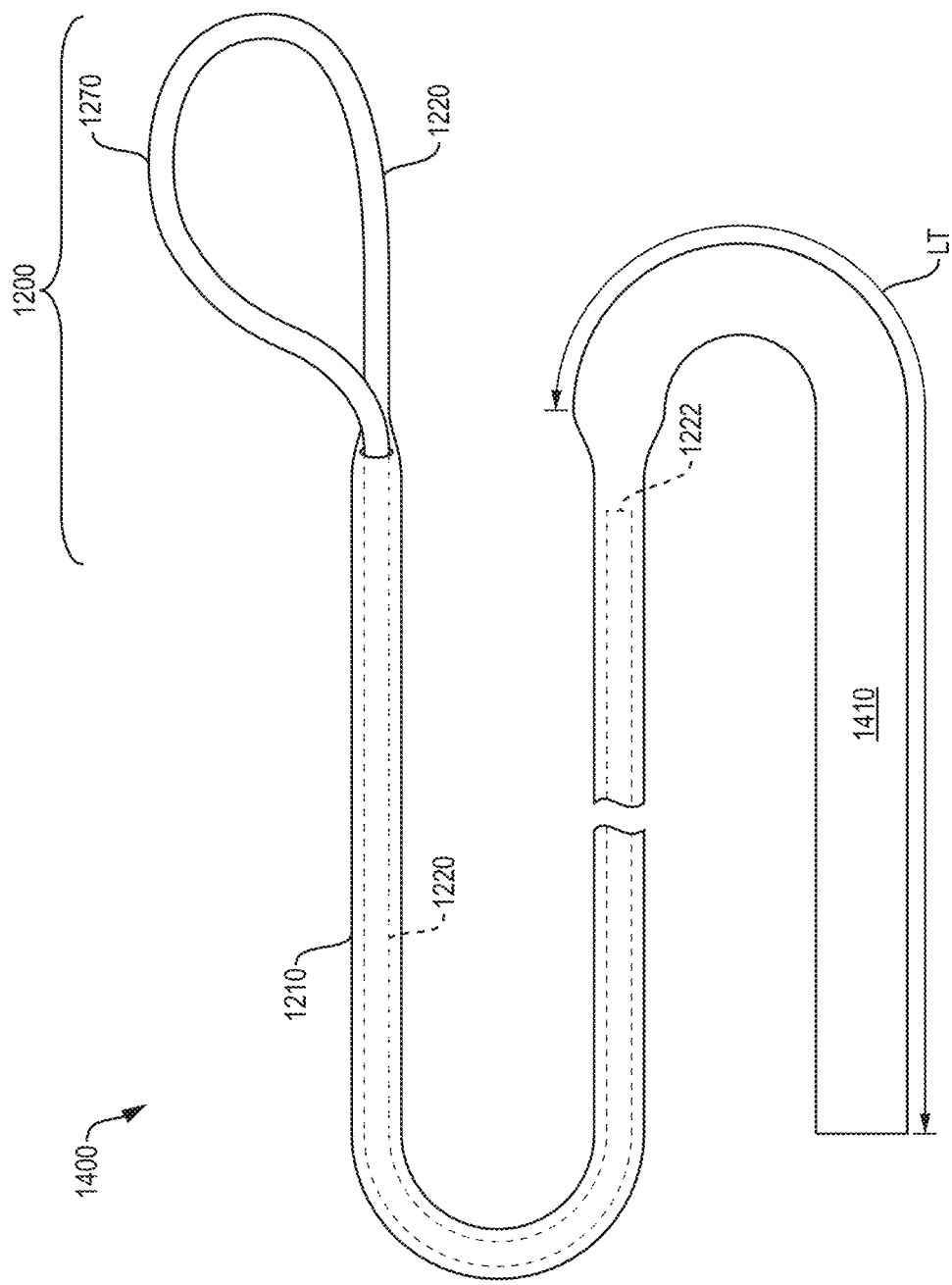
FIG. 14 illustrates a transferring member construct with a handle cross-section, in accordance with this disclosure.

Turning now to FIG. 14, another approach to managing the forces required to apply tension along a flexible member is disclosed. In general, the approach includes adding a length of flexible material to an end of the flexible member that defines a handle cross section portion. This may be advantageous instead of or in addition to construct 1200 for example. This may be added to any tensioning member (a member that in operation is intended to be tensioned). Managing the loads on an operator's hand while applying tension via a small diameter flexible member may oftentimes be managed by wrapping the flexible member around a surgical tool or handle to reduce any pressure concentrations on the operator's hands. Tension on the flexible member may for example, deploy a device, reduce a suture loop perimeter of the suture, or transfer another device or suture through the device or assembly. This requires the use, sterilization and/or purchase of another component. The approach illustrated in FIG. 14 includes the addition of a length of flexible member that has a handle cross section 1410. This additional flexible member may be continuous with the rest of the flexible member and may be a continuously braided portion of the flexible member.

FIG. 14 illustrates a transferring member construct 1400, that may be like construct 1200 at a first end with the addition of the additional handle cross section 1410. Handle cross section may be a third cross section 1410 of the construct 1200 that is larger than the first and second sections 1210, 1220. Third cross section 1410 portion may be a length of suture that is suture tape. As disclosed herein, the forces to withdraw a transferring member (120, 1200) through the knotless construct can be uncomfortable high. These forces may be applied by hand. The transferring member (120, 1200) may therefore have a working cross section configured for handling this operation and interaction with the device or assembly. The transferring member (120, 1200) may have a variable cross section that includes an end 1410 with a length (LT) that has a larger or broader cross section defining a handle cross section. The handle cross section may be a broad flat shape such as suture tape and is sized and shaped to be a more ergonomic portion of a member that, in operation, tension is intended to be applied therealong. The handle cross section may be sufficiently long (LT) to sit within or wrap around an operator's hand and reduce discomfort during the tensioning operation, ranging from 4 inches –10 inches. The handle cross section may include a cross section dimension between 0.25-1 inch. The suture varying cross sections may be a continuously braided suture rather than separate suture cross sections attached after formation thereof. The handle cross section is disposed external to the anchor 102 and is drawn away from the anchor 102.

As shown in FIG. 14 a transferring member construct 1400 may include a first end that is formed in a snaring loop 1270 for selectively coupling to a second suture, a splice working length WL that extends through a tissue anchor and a handle cross section portion at an opposing end to the first end. Tension on the transferring member construct 1200 via the handle cross section 1410 may draw/transfer the second suture through the tissue anchor. The handle cross section 1410 may remain external to the anchor 102 and may be removed from the anchor after use. The handle cross section 1410 preferably remains external to the anchor 102 and cannulations. The transferring member (120, 1200) and therefore the handle cross section 1410 may be completely removed from the tissue repair system, in its final knotlessly locked and repaired configuration.

Disclosed herein is a varying cross section flexible member that may shuttle a repair suture through an opening of a surgical device, that may include an anchor or a cannulation or a suture. The flexible member may include a first end including a loop for selectively coupling to the repair suture. The flexible member may include a second end. The flexible member may have a length between he first and second end configured to extend through and operatively coupled to a surgical device. The first end, second end and the length therebetween may all be formed as a continuous braid. Tension on the second end may shuttle the first end and thereby the repair suture through the surgical device. The second end may define a cross section larger than a corresponding cross section of the length, defining an ergonomic or handle cross section, ergonomic being defined as a length of the second end that has a cross section that reduces pressure concentrations on a user's hand.

Disclosed herein is a suture construct that includes a first end, a second end and a working length of suture extending between the first and second end, the working length configured to extend through a surgical device. The first end, second end and the working length form a continuous braid. The second end defines an ergonomic cross section that is larger than a corresponding cross section of the working length, the second end configured to be grasped as a handle to apply tension to the suture construct, the ergonomic cross section configured to limit a handle pressure concentration on a user's hand.

Anchor Opening

In some embodiments, when it comes to shuttling flexible members through openings with a reasonable force, it may be also beneficial to control a working opening size. For example, referring to FIG. 3A, one working opening may be proximal lumen 105, through which suture 120 may extend. Construct 1200 may alternatively extend therethrough. During preparation of the anchor body 102, being a braided body, the axial length may be trimmed, and heat sealed. This may inhibit the braids from fraying. proposed approach describes a tubular soft anchor with a working opening that is formed and sealed in the open shape. During the step shown in at least FIG. 4D. the ends may be at least partially reopened by the needle tool 450 to draw the transferring construct (120, 1200) and repair suture therethrough. This may tend to form a small opening that may result in an unnecessary supplementary load to shuttle the sutures and/or constructs therethrough (120, 130, 1200).

In some embodiments therefore, the braided body of the anchor 102 may be trimmed and heat sealed to form an opening rather than heat sealed to form a closed linear end edge. This may be formed at one or both ends (112, 116) of the anchor body 102. This may preferably be formed at the proximal end 116 at least.

Figure 15A:
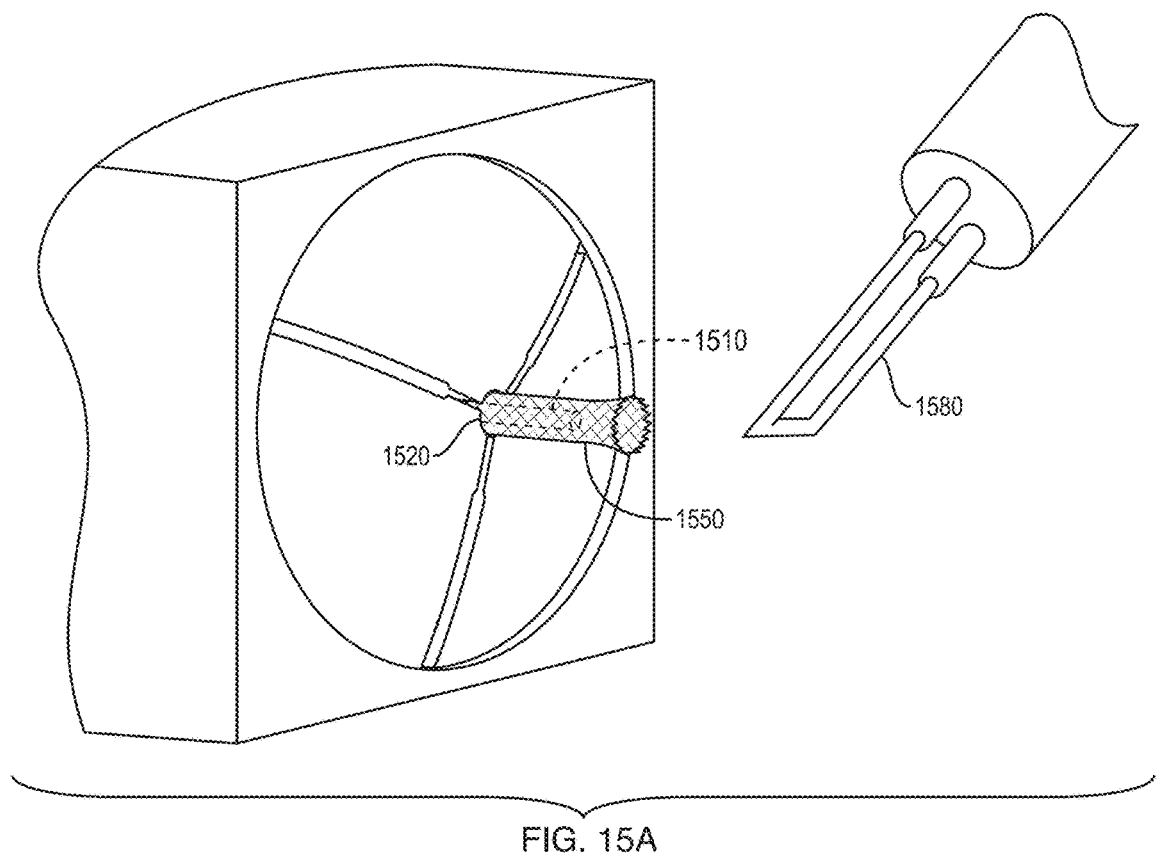
FIGS. 15A-15B illustrate a method of making an anchor with an annular sealed end, in accordance with this disclosure.
Figure 15B:
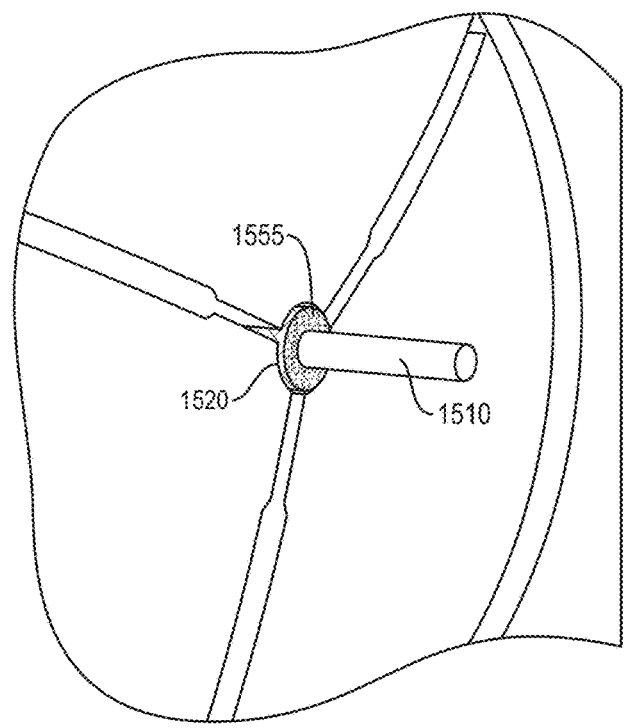

The method in shown in FIGS. 15A and 15B and may include obtaining a braided body 1550 and inserting a gauge pin 1510 in the central lumen 1505 of the braided body 1550, the braided body 1550 being prepared to become an anchor 102 with lumen 105. The pin 1510 is configured to maintain the lumen 1505 open. The gauge pin 1510 is therefore sized to fit within and support the lumen 1505. The outer circumferential surface of the braided body 1550 is then held with a collet 1520 to constrain the OD of the braided body 1550. Without the collet 1520 (with only the gauge pin) the fibers may splay outwards in an uncontrolled manner, which could cause issues when loading in an insertion instrument bore. A heat knife 1580 may then move around the braided body 1550 to both heat seal the strand/fiber ends and also trim the braided body to define an open end of an anchor 102. FIG. 15B illustrates the open annular sealed anchor end 1555 with the pin 1510 still inserted. The braided body 1550 with the trimmed and sealed end may then be flipped and the process repeated to trim an opposing end of the body and form the anchor 102.

Figure 15C:
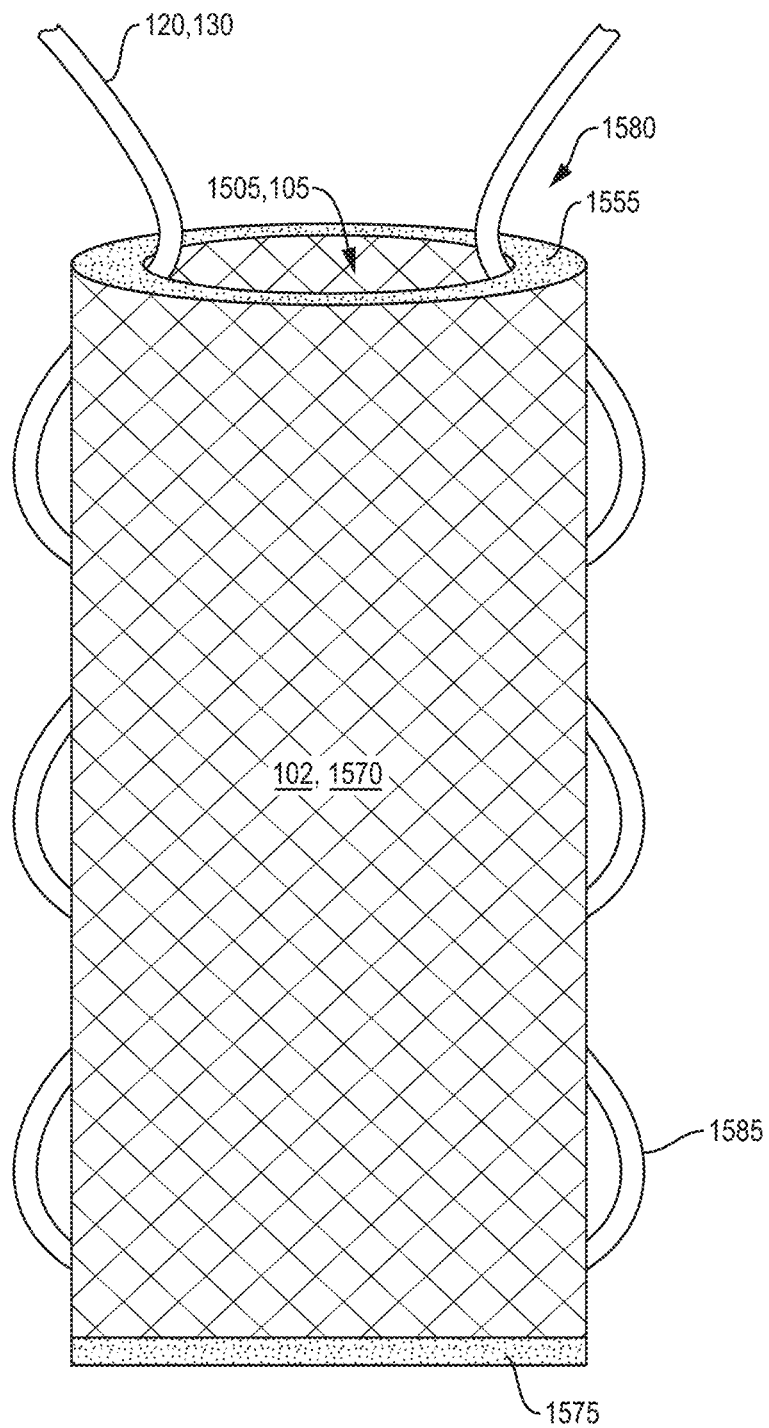
FIG. 15C illustrates a soft anchor with a linear sealed distal end and an annular sealed open proximal end, in accordance with this disclosure.

FIG. 15C illustrates an anchor 1570 that may be similar to anchor 102, with a distal end that is a heat-sealed closed end 1575 to form a linear distal edge and may have a proximal open end 1580, heat sealed to define an open proximal end of lumen 105 (1505), with example suture ends 120/130 extending therethrough.

Disclosed herein is an anchor for securing tissue to a bone or tissue to tissue, comprising, the anchor defining a soft anchoring implant 102 that is a braided tube including braided threads 110. The soft anchoring implant 102 may have a first configuration for inserting into a hole in bone or tissue of an animal or human, and a second configuration that is a laterally expanded configuration that secured the anchor within the bone or tissue. The braided tube may define a central lumen 105 that terminates at a closed distal end 1575 and an open proximal end 1580 of the tube, the open proximal end defining a working opening with an annular sealed edge 1555. The annular sealed edge 1555 may define a working opening sized to slidingly receive a transfer suture construct (120, 1200) with a plurality of cross sections therethrough without excessive transfer force to slide the suture construct therethrough.

A method of manufacture of an all-suture anchor is also disclosed including obtaining a tubular body formed of braided threads or fibers, inserting a gauge pin into a central lumen of the tubular body, engaging a circumferential outer surface of the tubular body with a collar, at a location along the tubular body that axially overlaps the gauge pin; and cutting the tubular body adjacent an end of the collar to form a free open end of the tubular body, the cutting including a means to form an annular sealed edge of the free open end, the sealed edge configured to resists fraying of the fibers.

Figure 16A:
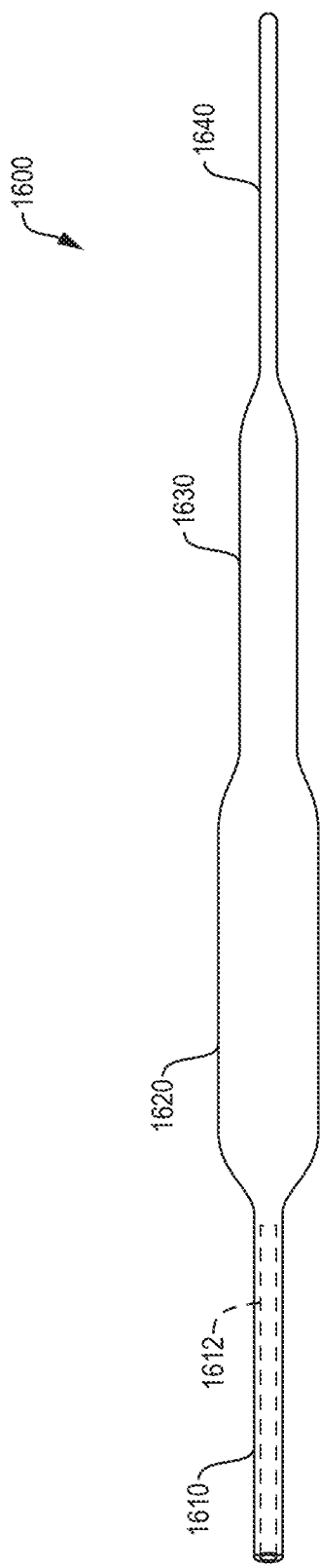
FIG. 16A illustrates a variable cross section repair suture for a knotless soft anchor construct, in accordance with this disclosure.

An embodiment of the repair suture 1600 with a plurality of segments with different cross sections is illustrates in FIG. 16A. Each segment (1610, 1620, 1630 and 1640) may be formed according to the function of that segment. Segment 1610 may be a flexible member with a cannulation 1612, for forming a locking passage, similar to cannulation 137 in repair suture 130. Continuously braided with segment 1610 may be a larger cross-section segment 1620 that may be tape or mini tape. The number of strands may be the same, between segment 1610 and 1620, only the shape may be different. This segment 1620 may engage the repair tissue with a large footprint and avoid cheese-wiring the repair (failure). A third segment 1630 may extend from tape segment 1620. In some embodiments segment 1630 may be a flexible member with a hollow lumen, similar to segment 1610, and may define a transition portion of repair suture 1600. In some embodiments, third segment may have a braided core. Segment 1640 may be the smallest segment of the repair suture 1600, configured to be snared by a transferring construct loop (122a, 1270). As such segment 1610 is sufficiently long to be easily snared without with accidently withdrawn from the loop 122a, 1270.

Figure 16B:
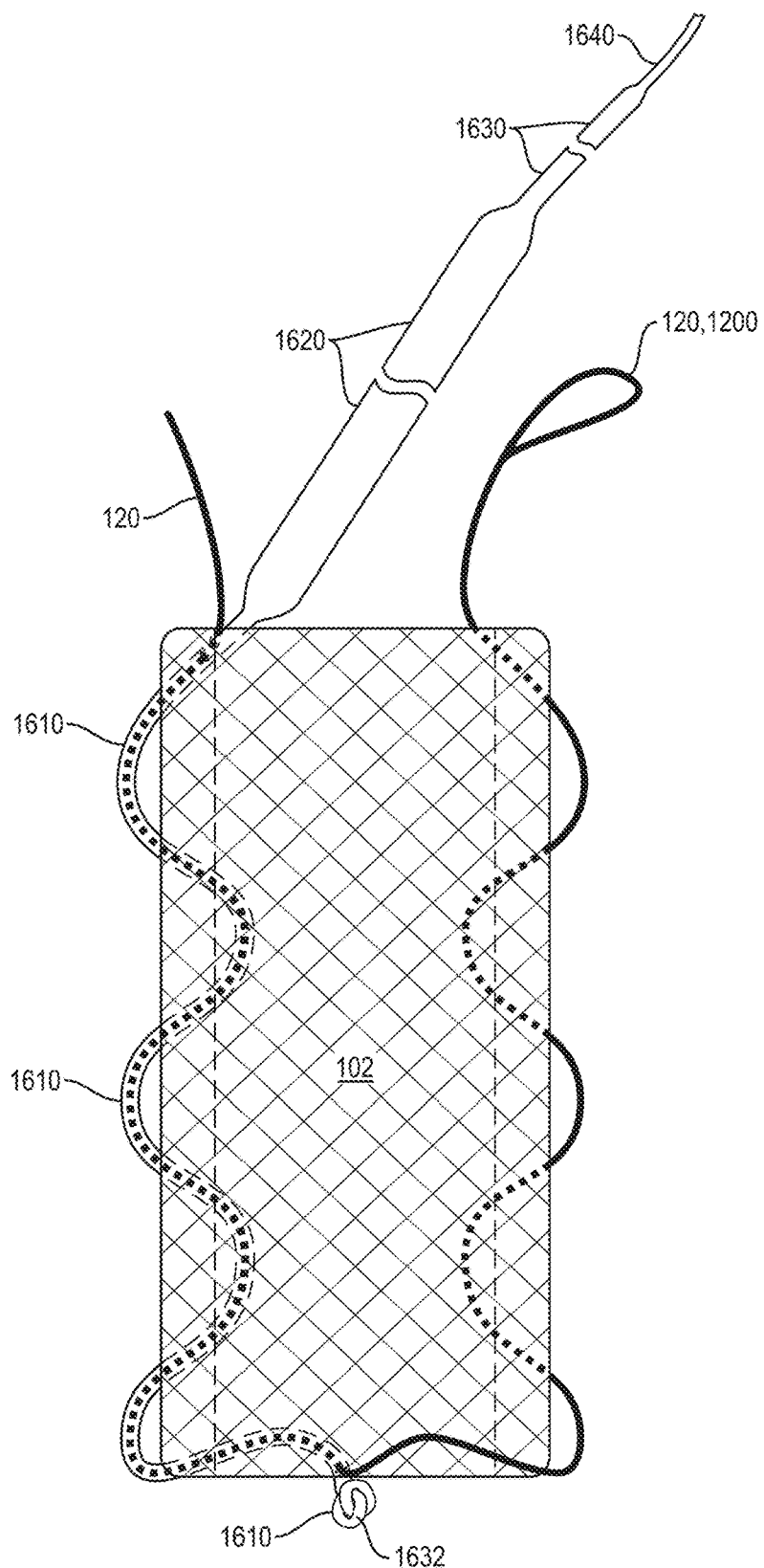
FIG. 16B illustrates a variable cross section repair suture assembled to a knotless soft anchor construct, as obtained, in accordance with this disclosure.
Figure 16C:
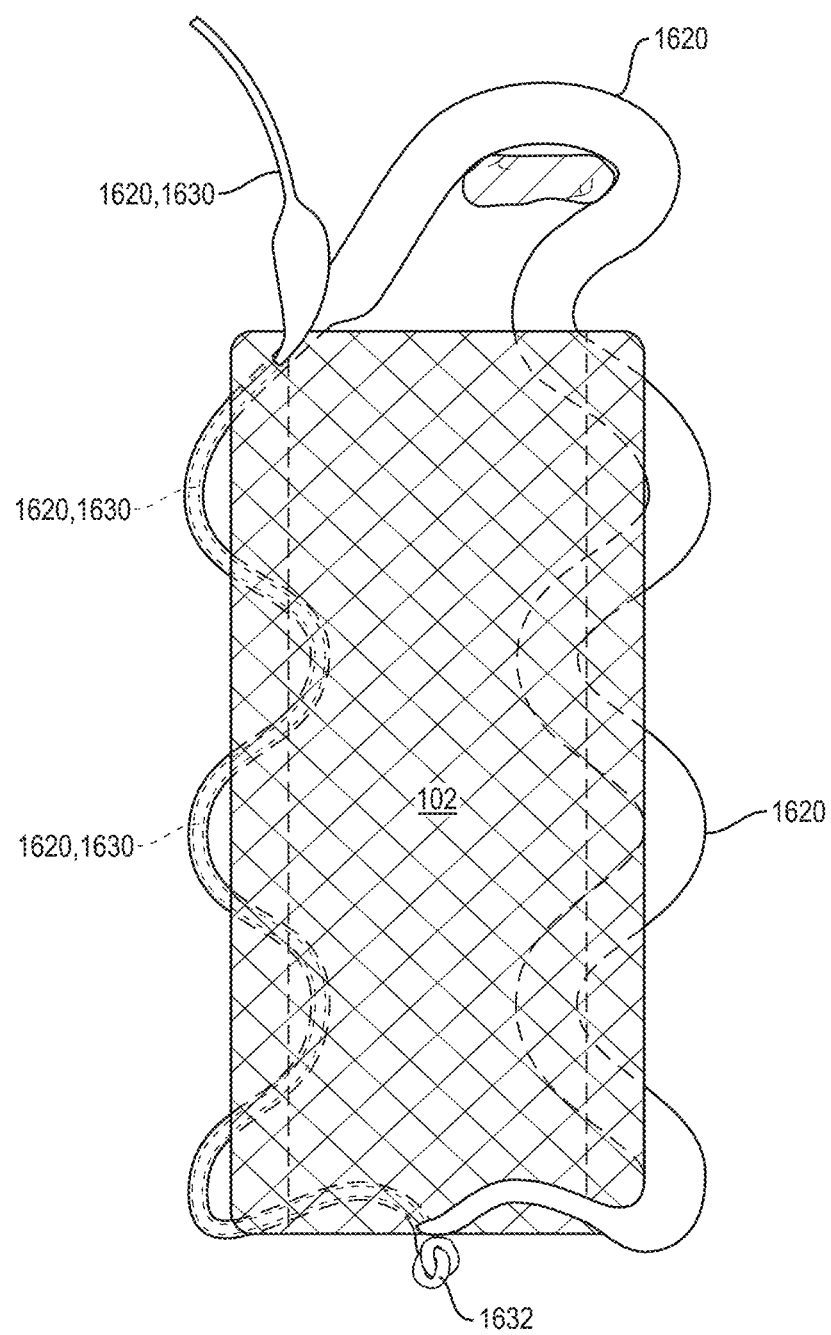
FIG. 16C illustrates a variable cross section repair suture assembled to a knotless soft anchor construct, in a repaired configuration, in accordance with this disclosure.

Referencing FIG. 16B, first segment 1610 may be sufficiently long to extend through an anchor 102 and form a stopping knot 1632 and may be between 3-5 inches long. Segment 1610 may be a #2 suture, with between 16-32 braided strands therealong around a hollow core. Segment 1620 may be tape with a width up to 0.25 inches wide and is sufficiently long to extend around a target tissue, for the targeted procedure. Segment 1620 may be continuously braided with segment 1630, which may also be #2 suture, with between 16-32 braided strands therealong. Once in the repaired configuration, either the tape segment 1620 or third segment 1630 may extend through anchor 102 and through cannulation 137. Final tapering segment may have a reduced number of strands relative to the rest of the repair suture 1600, and it may have a diameter equivalent to a 2.0 suture. Tapered segment 1640 is preferable not disposed along the cannulation 137 in the knotless locked configuration, as this reduced diameter may not effective knotless lock within the cannulation 137.

One example method may include employing a knotless soft anchor construct for meniscal root repair that may be all inside. The knotless suture anchor construct 100, 200, 300 may be implanted into a tibia, at the insertion location for the meniscal root. The repair suture 130 may then be passed in as a mattress stitch through the meniscal tissue. The repair suture 130 may then be coupled to the transfer suture 120. Repair suture 130 may then be drawn through the construct 100, 200, 300, via the transfer suture 120 or construct 1200, removing the transfer suture 120 or construct 1200 from the construct 100, 200, 300. Tension on the repair suture 130 may pull the meniscus (or ligament) to the bone surface. This approach is compatible with curved guides and drills, making access to the implant site easier than the current approach with externally drilled tunnels and buttons. Finally, as the construct 100, 200, 300 is soft and formed of suture, therefore if the trajectory of the tunnel perforates the tibial cortex, there is low likelihood for complications, compared with a rigid anchor. Another example method disclosed herein is a method of MPFL reconstruction, wherein the constructs 100, 200, 300 may couple a graft to the patella. Repair suture 130 may be coupled to graft tissue.

One skilled in the art will realize the disclosure may be embodied in other specific forms without departing from the spirit or essential characteristics thereof. The foregoing examples are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

What is claimed is:

1. A knotless tissue repair construct comprising:
   an anchor body formed of a soft material, the anchor body having a proximal end, a distal end, and a longitudinal axis;
   a repair suture having a first end, a second end and a cannulated length, the first end fixedly coupled to the anchor body, the cannulated length interwoven along and through a first sidewall of the anchor body and the second end extending proximally from the anchor body proximal end; and
   a deploying suture interwoven repeatedly through and along the anchor body and also within the cannulated length of the repair suture that is interwoven along and through the first sidewall of the anchor body;
   wherein tension on the deploying suture is configured to change the anchor body to a deployed configuration; and
   wherein while in the deployed configuration the deploying suture is configured to operatively couple to the repair suture second end and draw the repair suture second end back through the anchor body and through the cannulated length, forming a repair loop, and wherein tension on the repair suture second end is configured to knotlessly lock the repair loop.

2. The knotless tissue repair construct of claim 1 wherein the repair suture is fixedly coupled to the anchor body with two axially overlapping knots formed by the repair suture first end, the two axially overlapping knots external to the anchor body.

3. The knotless tissue repair construct of claim 1 wherein tension on both the repair suture second end and the deploying suture are configured to change the anchor body to the deployed configuration.

4. The knotless tissue repair construct of claim 1 wherein the anchor body defines a tubular braided body with an inner lumen, the inner lumen having an open proximal end, and wherein the repair suture and deploying suture are both interwoven through the anchor body, and both extend directly from the open proximal end of the inner lumen.

5. The knotless tissue repair construct of claim 1 wherein the repair suture includes a tape length segment extending from the cannulated length, the tape length segment disposed externally to the anchor body.

6. The knotless tissue repair construct of claim 5 wherein the tape length segment defines a length that when the repair suture is formed in a repair loop, the tape length segment configured to extend around a repair tissue and back through the anchor body.

7. The knotless tissue repair construct of claim 1 wherein the deploying suture includes a spliced loop at a first end of the deploying suture, the spliced loop configured to couple to the repair suture second end, the spliced loop having a splice length that extends through the entire anchor body and through the repair suture cannulated length.

8. The knotless tissue repair construct of claim 7 wherein the splice length extends through the entire anchor body including the cannulated length and is operatively coupled to a tensioning actuation means of the knotless tissue repair construct, such that tensioning the deploying suture applies tension to a continuous uninterrupted length of the deploying suture splice length.

9. The knotless tissue repair construct of claim 7 wherein the deploying suture includes a first length segment that is cannulated and a second length segment that is smaller in diameter than the first length segment and wherein the spliced loop includes the second length segment, and the splice length includes both the first and second length segment coaxially disposed.

10. A knotless tissue repair construct comprising:
an anchor body formed of a soft material having a proximal end, a distal end, and a longitudinal axis extending therebetween, the anchor body formed with braided strands;
a repair suture having a first end, a second end and a cannulated length therebetween, the first end fixed to the anchor body, the cannulated length interweaving along and through a first sidewall of the anchor body and the second end extending proximally from the anchor body proximal end; and
a deploying suture interwoven repeatedly between the braided strands, through and along a second sidewall of the anchor body and also within the cannulated length of the repair suture that is interwoven along and through the first sidewall;
wherein tension on the deploying suture and repair suture second end is configured to change the anchor body to a deployed configuration;
wherein with the anchor body is in the deployed configuration, the deploying suture is configured to operatively couple to the repair suture second end and draw the repair suture second end back through the anchor body, and also through the cannulated length interwoven through the first sidewall, defining a knotlessly locked configuration.

11. The knotless tissue repair construct of claim 10 wherein the repair suture includes a tape length segment extending from the cannulated length, at a location along the repair suture external to the anchor body and wherein the tape length segment defines a length configured to extend around a repair tissue and then back through the anchor body when in the knotlessly locked configuration.

12. The knotless tissue repair construct of claim 10 wherein the deploying suture includes a spliced loop at a first end of the deploying suture, the spliced loop defining a static loop and having a splice length that extends through the anchor body and the cannulated length.

13. The knotless tissue repair construct of claim 12 wherein the splice length extends through the anchor body and is operatively coupled to a tensioning actuation means of the knotless tissue repair construct, such that tensioning the deploying suture applies tension to a continuous uninterrupted length of the deploying member splice length.

14. A knotless tissue repair construct comprising:
an anchor body formed of a soft material, the anchor body having a proximal end, a distal end, and a longitudinal axis;
a repair suture having a first end, a second end and a cannulated length, the first end fixedly coupled to the anchor body, the cannulated length interwoven along and through a first sidewall of the anchor body and the second end extending proximally from the anchor body proximal end; and
a deploying suture interwoven repeatedly through and along the anchor body and also within the cannulated length of the repair suture that is interwoven along and through the first sidewall of the anchor body, the deploying suture includes a spliced loop at a first end of the deploying suture, the spliced loop having a splice length that extends through the anchor body and through the repair suture cannulated length;
wherein tension on the deploying suture is configured to change the anchor body to a deployed configuration; and
wherein while in the deployed configuration the deploying suture is configured to operatively couple to the repair suture second end and draw the repair suture second end back through the anchor body and through the cannulated length, forming a repair loop, and wherein tension on the repair suture second end is configured to knotlessly lock the repair loop.

15. The knotless tissue repair construct of claim 14 wherein the repair suture is fixedly coupled to the anchor body with two axially overlapping knots formed by the repair suture first end, the two axially overlapping knots external to the anchor body.

16. The knotless tissue repair construct of claim 14 wherein tension on both the repair suture second end and the deploying suture are configured to change the anchor body to the deployed configuration.

17. The knotless tissue repair construct of claim 14 wherein the splice length is operatively coupled to a tensioning actuation means of the knotless tissue repair construct, such that tensioning the deploying suture applies tension to a continuous uninterrupted length of the deploying suture splice length.

18. The knotless tissue repair construct of claim 14 wherein the deploying suture includes a first length segment that is cannulated and a second length segment that is smaller in diameter than the first length segment and wherein the spliced loop includes the second length segment, and the splice length includes both the first and second length segment coaxially disposed.

* * * * *